(12) United States Patent
Uehara et al.

(10) Patent No.: US 8,379,178 B2
(45) Date of Patent: Feb. 19, 2013

(54) IMAGE DISPLAY DEVICE WITH PIXEL SECTIONS ARRAYED IN A MATRIX

(75) Inventors: Shin-ichi Uehara, Tokyo (JP); Masao Iriguchi, Tokyo (JP); Naoyasu Ikeda, Tokyo (JP); Nobuaki Takanashi, Tokyo (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 13/102,274

(22) Filed: May 6, 2011

(65) Prior Publication Data

US 2011/0205623 A1    Aug. 25, 2011

Related U.S. Application Data

(62) Division of application No. 11/159,202, filed on Jun. 23, 2005, now Pat. No. 7,965,365.

(30) Foreign Application Priority Data

Sep. 3, 2004   (JP) .................................. 2004-256569

(51) Int. Cl.
*G02F 1/1343* (2006.01)
*G02F 1/1335* (2006.01)
(52) U.S. Cl. .............. 349/146; 349/15; 348/51; 348/59; 359/463
(58) Field of Classification Search .................... 349/15, 349/143, 146; 348/51, 59; 359/463
See application file for complete search history.

(56) References Cited

U.S. PATENT DOCUMENTS

| 5,953,148 A | 9/1999 | Moseley et al. |
| 6,118,584 A * | 9/2000 | Van Berkel et al. .......... 359/463 |
| 6,784,964 B2 | 8/2004 | Nakayoshi et al. |
| 2005/0041188 A1* | 2/2005 | Yamazaki ..................... 349/146 |

FOREIGN PATENT DOCUMENTS

| EP | 0833184 A1 | 4/1998 |
| JP | 04-335616 A | 11/1992 |
| JP | 06-332354 A | 2/1994 |
| JP | 06250220 A * | 9/1994 |
| JP | 10-505689 A | 6/1998 |
| WO | 97/02709 A2 | 1/1997 |

OTHER PUBLICATIONS

Chihiro Masuda, "Three-Dimensional Display", Sangyotosho Co., Ltd.
Nikkei Electronics, Jan. 6, 2003, No. 838, p. 26-27.

* cited by examiner

*Primary Examiner* — Nathanael R Briggs
(74) *Attorney, Agent, or Firm* — Sughrue Mion, PLLC

(57) ABSTRACT

In an image display device where a lenticular lens, a display panel, and a light source are provided in order from a viewer side, when cylindrical lenses of the lenticular lens are arrayed in a horizontal direction, in first-viewpoint pixels and second-viewpoint pixels of the display panel, openings whose sides which intersect with straight lines in the horizontal direction are not parallel to a vertical direction are formed. And, a shape of the openings of a pair of pixels mutually adjacent in the vertical direction is made line-symmetric with respect to edges of the pixels extending in the horizontal direction as an axis.

14 Claims, 44 Drawing Sheets

IMAGE DISPLAY DEVICE WITH PIXEL SECTIONS ARRAYED IN A MATRIX

CROSS REFERENCE TO RELATED APPLICATIONS

This application is a divisional of U.S. application Ser. No. 11/159,202 filed Jun. 23, 2005, claiming priority based on Japanese Patent Application No. 2004-256569 filed Sep. 3, 2004, the contents of all of which are incorporated herein by reference in their entirety.

BACKGROUND OF THE INVENTION

1. Field of the Invention

The present invention relates to an image display device capable of displaying different images at a plurality of viewpoints, a portable terminal equipped with the same, and a display panel and a lens incorporated in the image display device, and in particular, it relates to an image display device capable of displaying a three-dimensional image with an excellent quality, a portable terminal, a display panel, and a lens.

2. Description of the Related Art

Priorly, image display devices capable of displaying different images at a plurality of viewpoints have been investigated. As an example thereof, a three-dimensional image display device on the premise of displaying parallax images as multi-viewpoint images exists. In B.C. 280, the Greek mathematician Euclid considered that "Three-dimensional imaging is a sensation obtained when both right and left eyes simultaneously look at different images of an identical object viewed from different directions" (see authored by Chihiro Masuda, "Three-Dimensional Display," Sangyotosho Co., Ltd., for example.) Namely, by presenting images with parallax to both right and left eyes, a three-dimensional image display device can be realized.

In order to concretely realize this function, numerous three-dimensional image display systems have been investigated so far, and these can be roughly divided into systems using eyeglasses and systems using no eyeglasses. Of these, the systems using eyeglasses include an anaglyph system, a polarizing eyeglass system utilizing polarization and the like, however, with these systems, since the burden of wearing eyeglasses cannot be essentially avoided, no-eyeglass systems using no eyeglasses have been investigated in recent years. The no-eyeglass systems include a parallax barrier system, a lenticular lens system and the like.

First, description is given of the parallax barrier system. The parallax barrier system is a three-dimensional image display system conceived by Berthier in 1896 and verified by Ives in 1903. FIG. 1 is an optical model diagram showing a method that displays three-dimensional image by a parallax barrier system. As shown in FIG. 1, a parallax barrier 105 is a barrier (shading plate) in which a large number of narrow-striped openings, namely, slits 105a have been formed. In the vicinity of one of the surfaces of this parallax barrier 105, a display panel 102 is arranged. In the display panel 102, right-eye pixels 123 and left-eye pixels 124 have been arrayed in a direction orthogonal to the longitudinal direction of the slits 105a. In addition, in the vicinity of the other surface of the parallax barrier 105, namely, on the opposite side of the display panel 102, a light source 108 is arranged.

Light emitted from the light source 108 is blocked in part by the parallax barrier 105. On the other hand, light that has passed through the slits 105a without being blocked by the parallax barrier 105 becomes light fluxes 181 through the right-eye pixels 123 or becomes light fluxes 182 through the left-eye pixels 124. At this time, the position of a viewer where recognition of a three-dimensional image becomes possible is determined based on a positional relationship between the parallax barrier 105 and pixels. Namely, it is necessary that a right eye 141 of a viewer 104 is within a passing-area of all light fluxes 181 corresponding to a plurality of right-eye pixels 123, and also, a left eye 142 of the viewer is within a passing-area of all light fluxes 182. This is a case where a middle point 143 between the viewer's right eye 141 and left eye 142 is positioned within a quadrangular three-dimensional visible area 107 shown in FIG. 1.

Of line segments extending in the array direction of the right-eye pixels 123 and left-eye pixels 124 in the three-dimensional visible area 107, a line segment that passes through an intersection point 107a between diagonal lines of the three-dimensional visible area 107 is the longest. Therefore, when the middle point 143 is positioned at the intersection point 107a, since a tolerance when the viewer's position is deviated in the left-and-right direction is maximized, this is optimal as an viewing position. Accordingly, in this three-dimensional image display method, it is recommended to the viewer to set a distance between the intersection point 107a and display panel 102 to an optimal view distance OD and view at the optimal view distance OD. Here, in the three-dimensional visible area 107, a virtual plane having the optimal view distance OD as a distance from the display panel 102 is referred to as an optimal view plane 107b. Thus, lights from the right-eye pixels 123 and left-eye pixels 124 reach the viewer's right eye 141 and left eye 142, respectively. Therefore, it becomes possible for the viewer to recognize images displayed on the display panel 102 as a three-dimensional image.

In the aforementioned parallax barrier system, since the parallax barrier had been initially arranged between the pixels and eyes when this was devised, this had obstructed the view and there had been a problem of low visibility. However, with the recent realization of liquid crystal display devices, as shown in FIG. 1, it has become possible to arrange the parallax barrier 105 behind the display panel 102, whereby the problem of visibility has been improved. Therefore, three-dimensional image display devices with the parallax barrier system have been currently actively investigated, and three-dimensional image display devices to which the parallax barrier system has been applied have been actually commercialized (see Nikkei Electronics, Jan. 6, 2003, No. 838, p. 26-27.)

For example, in Table 1 of Nikkei Electronics, Jan. 6, 2003, No. 838, p 26-27, a portable telephone equipped with a 3D-compatible liquid crystal panel has been introduced. A liquid crystal display panel of a three-dimensional image display device of this portable telephone has a 2.2-inch diagonal size and a display dot number of 176 dot wide×220 dot high. And, a liquid crystal panel for a switch to turn on/off parallax barrier effects is provided, and this can display a three-dimensional display and a planar display by switching.

Next, description will be given of the lenticular lens system. As described in the aforementioned publication, authored by Chihiro Masuda, "Three-Dimensional Display," Sangyotosho Co., Ltd., Ives et al. invented the lenticular lens system in around 1910. FIG. 2 is a perspective view showing a lenticular lens, and FIG. 3 is an optical model diagram showing a method that displays three-dimensional image by a lenticular lens system. As shown in FIG. 2, a lenticular lens 121 has a flat plane on one of the surfaces, and on the other surface, semicylindrical convexities (cylindrical lenses 122)

extending in one direction have been formed in plurality so that their longitudinal directions become mutually parallel.

And, as shown in FIG. 3, in the three-dimensional image display device by a lenticular lens system, a lenticular lens 121, a display panel 102, and a light source 108 are arranged in order from a viewer side, and on a focal plane of the lenticular lens 121, pixels of the display panel 102 are positioned. In the display panel 102, pixels 123 to display an image for a right eye 141 and pixels 124 to display an image for a left eye 142 are alternatively arrayed. At this time, groups each composed of mutually adjacent pixels 123 and 124 are corresponding to the respective cylindrical lenses (convexities) 122 of the lenticular lens 121. Thereby, when light which has been emitted from the light source 108 and has passed through the respective pixels is sorted by the cylindrical lenses 122 of the lenticular lens 121 in directions toward the right and left eyes, it becomes possible to make the right and left eyes recognize mutually different images, thus the viewer can be made to recognize a three-dimensional image.

The aforementioned parallax barrier system is a system for "blocking" an unnecessary light by a barrier, whereas the lenticular lens system is a system for changing light progressing directions, therefore, in principle, there is no decline in brightness of the display screen owing to provision of a lenticular lens. Therefore, in particular, application to portable apparatuses and the like where a high-luminance display and low-power-consumption performance are regarded as important has been considered dominant.

An example of a three-dimensional image display device developed by the lenticular lens system has been described in the aforementioned Nikkei Electronics, Jan. 6, 2003, No. 838, p. 26-27. A liquid crystal display panel of a three-dimensional image display device of this portable telephone has a 7-inch diagonal size and a display dot number of 800 dot wide×480 dot high. And, by changing the distance between the lenticular lens and liquid crystal display panel by 0.6 mm, switching between a three-dimensional display and a planar display can be made. This three-dimensional image display device has a horizontal viewpoint number of five, and five different images can be viewed by changing angles in the horizontal direction.

In addition, as an another example of an image display device capable of displaying different images at a plurality of viewpoints, a display far simultaneously displaying multiple images has been disclosed (see Japanese Published Unexamined Patent Application No. 332354/1994). The display as set forth in Japanese Published Unexamined Patent Application No. 332354/1994 simultaneously displays different planar images in each of the viewing directions by utilizing an image sorting function by a lenticular lens, whereby making it possible for a plurality of different viewers to simultaneously observe, on a single display, different planar images from different directions, respectively. FIG. 4 is a perspective view showing this display for simultaneously displaying multiple images. As shown in FIG. 4, in this display for simultaneously displaying multiple images, a lenticular lens 121 and a display panel 102 are arranged in order from a viewer 104 side. In the display panel 102, first-viewpoint pixels 125 to display an image for a first viewpoint and second-viewpoint pixels 126 to display an image for a second viewpoint are alternatively arrayed. At this time, groups each composed of mutually adjacent pixels 125 and 126 are corresponding to respective cylindrical lenses (convexities) 122 of the lenticular lens 121. Thereby, since lights from the respective pixels are sorted into different directions by the cylindrical lenses 122 of the lenticular lens 121, it becomes possible to recognize different images at different positions. By using this display for simultaneously displaying multiple images, in comparison with a case where displays for the number of people are prepared, installing space and electricity expenses and the like can be reduced. As such, currently, image display devices that can display different images at a plurality of viewpoints have been actively investigated.

However, the aforementioned prior arts have the following problems. Namely, in display panels used for image display devices, a shading portion is provided between the pixels for respective viewpoints. Since this shading portion has no display function, non-display areas where no display is carried out are formed between images for respective viewpoints. When a viewer had shifted his/her view position from images for respective viewpoints, he/she is to view non-display areas, however, since no display is carried out in the non-display areas as mentioned above, the viewer cannot view an image. Moreover, generally, it is improbable that a viewer views only at an optimal view position, and a shift in the view position can frequently occur. As a result, the viewer is conscious of a situation where viewing an image is impossible. Since no such situation occurs in an ordinal image display device having no optical components for image sorting, the viewer senses that, in an image display device which can display different images at a plurality of viewpoints, display quality is considerably deteriorated in comparison with the ordinal image display device.

Hereinafter, this problem will be described in detail by raising an example of a three-dimensional image display device by a lenticular lens system using a display panel whose pixel opening ratio in an array direction (horizontal direction) of cylindrical lenses is 50%. FIG. 5 is a plan view showing a conventional display panel whose pixel opening ratio in a horizontal direction is 50%, and FIG. 6 is an optical model diagram of a three-dimensional image display device by a lenticular lens system using the display panel shown in FIG. 5. As shown in FIG. 5, since this display panel 102 has a pixel pitch of P and a pixel opening ratio of 50% in a lens array direction (horizontal direction 112), openings 109 whose width is (P/2) are formed at the centers of pixels. Namely, a width of a shading portion 106 in the horizontal direction 112 of each pixel is (P/4). In addition, as shown in FIG. 6, in the three-dimensional image display device using this display panel 102, a lenticular lens 121, the display panel 102, and a light source 108 are arranged in order from a viewer side, and pixels of the display panel 102 are positioned at a focal plane of the lenticular lens 121. And, a distance between an apex of the lenticular lens 121 and pixels of the display panel 102 is provided as H, a refractive index of the lenticular lens 121 is provided as n, a focal distance is provided as f, and a lens pitch is provided as L. In addition, in display pixels of the display panel 102, sets of one each of left-eye pixels 124 and right-eye pixels 123 are arranged, and a pitch of each pixel is provided as P. Accordingly, a display pixel composed of one each of left-eye pixels 124 and right-eye pixels 123 has an array pitch of 2P. To this display pixel composed of two pixels of one each of left-eye pixels 124 and right-eye pixels 123, one cylindrical lens 122 is arranged in a corresponding manner.

In addition, a distance between the lenticular lens 121 and viewer is provided as an view distance OD, enlarged projection widths of pixels at this view distance OD, that is, widths of projection images of the left-eye pixel 124 and right-eye pixel 123 on a virtual plane which is distant from the lens by the view distance OD and is parallel to the lens are provided as e, respectively. Furthermore, a distance from the center of a cylindrical lens 122 positioned at the middle of the lenticular lens 121 to the center of a cylindrical lens 122 at the end of the lenticular lens 121 in the horizontal direction 112 is provided as $W_L$, and a distance between the center of a display pixel composed of a left-eye pixel 124 and a right-eye pixel 123 positioned at the center of the display panel 102 and center of a display pixel positioned at the end of the display panel 102 in the lens array direction 112 is provided as $W_P$. Still furthermore, incident angles and exit angles of light at a cylindrical lens 122 positioned at the middle of the lenticular lens 121 are provided as α and β, respectively, and incident angles and exit angles of light at a cylindrical lens 122 positioned at the end of the lenticular lens 121 in the lens array direction 112 are provided as γ and δ, respectively. Still furthermore, a difference between the distance $W_L$ and distance $W_P$ is provided as C, and a number of pixels contained in a area at the distance $W_P$ is provided as 2 m.

Since the array pitch L of the cylindrical lenses 122 and the array pitch P of the pixels are mutually related, one is to be determined in accordance with the other, however, usually, since a lenticular lens is designed in accordance with a display panel in most cases, the array pitch P of pixels is treated as a constant. In addition, the refractive index n is determined by selecting a material of the lenticular lens 121. In contrast thereto, for the view distance OD between the lens and viewer and enlarged projection widths e of pixels in this view distance OD, desirable values are set. By use of these values, the distance H between the lens apex and pixels and the lens pitch L are determined. By Snell's law and geometric relationships, the following expressions 1 through 6 hold true.

$$n \times \sin α = \sin β \quad \text{(Expression 1)}$$

$$OD \times \tan β = e \quad \text{(Expression 2)}$$

$$H \times \tan α = P \quad \text{(Expression 3)}$$

$$n \times \sin γ = \sin δ \quad \text{(Expression 4)}$$

$$H \times \tan γ = C \quad \text{(Expression 5)}$$

$$OD \times \tan δ = W_L \quad \text{(Expression 6)}$$

In addition, the following expressions 7 through 9 hold true.

$$W_P - W_L = C \quad \text{(Expression 7)}$$

$$W_P = 2 \times m \times P \quad \text{(Expression 8)}$$

$$W_L = m \times L \quad \text{(Expression 9)}$$

And, based on the above-described expressions 1 through 3, the following expressions 10 through 12 hold true, respectively.

$$β = \arctan(e/OD) \quad \text{(Expression 10)}$$

$$α = \arcsin(1/n \times \sin β) \quad \text{(Expression 11)}$$

$$H = (P/\tan α) \quad \text{(Expression 12)}$$

In addition, based on the above-described expressions 6 through 9, the following expression 13 holds true.

$$δ = \arctan(m \times L/OD) \quad \text{(Expression 13)}$$

Furthermore, based on the above-described expressions 7 and 8, the following expression 14 holds true.

$$C = 2 \times m \times P - m \times L \quad \text{(Expression 14)}$$

Still furthermore, based on the above-described expression 5, the following expression 15 holds true.

$$γ = \arctan(C/H) \quad \text{(Expression 15)}$$

Here, as mentioned above, since the distance H between the lenticular lens apex and pixels is usually made equal to the focal distance f of the lenticular lens, the following expression 16 holds true, and where a radius of curvature of the lens is provided as r, the radius of curvature r is obtained by the following expression 17.

$$f = H \quad \text{(Expression 16)}$$

$$r = H \times (n-1)/n \quad \text{(Expression 17)}$$

As shown in FIG. 6, a area where lights from all right-eye pixels 123 reach is provided as a right-eye area 171, and a area where lights from all left-eye pixels 124 reach is provided as a left-eye area 172. A viewer can recognize a three-dimensional image by positioning his/her right eye 141 at the right-eye area 171 and positioning his/her left eye 142 at the left-eye area 172. However, non-display areas 173 exist between the right-eye area 171 and left-eye area 172. For investigating the size of these non-display areas 173, where an incident angle and exit angle of a light beam which is emitted from the left end of an openings of a right-eye pixel of the display panel 102 and passes through the cylindrical lens 122 positioned at the middle of the lenticular lens 121 are provided as $α_1$ and $β_1$, respectively, a distance $e_1$ from a centerline to an enlarged projection position of a centerline-side shading portion at the optimal view distance OD is obtained by the following expressions 18 through 20.

$$n \times \sin α_1 = \sin β_1 \quad \text{(Expression 18)}$$

$$OD \times \tan β_1 = e_1 \quad \text{(Expression 19)}$$

$$H \times \tan α_1 = P/4 \quad \text{(Expression 20)}$$

Similarly, where an incident angle and exit angle of a light beam which is emitted from the right end of an opening and passes through the cylindrical lens 122 positioned at the middle of the lenticular lens 121 are provided as $α_2$ and $β_2$, respectively, a distance e2 from a centerline to an enlarged projection position of an end-side shading portion at the optimal view distance OD is obtained by the following expressions 21 through 23.

$$n \times \sin α_2 = \sin β_2 \quad \text{(Expression 21)}$$

$$OD \times \tan β_2 = e_2 \quad \text{(Expression 22)}$$

$$H \times \tan α_2 = 3 \times P/4 \quad \text{(Expression 23)}$$

As an example, where polymethyl-methacrylate (PMMA) whose refractive index n is 1.49 is used as a material of the lenticular lens 121, and a pixel pitch is provided as 0.24 mm, an optimal view distance OD is provided as 280 mm, an enlarged projection width of pixels as 65 mm, and the number m of display pixels is provided as 60, based on the aforementioned respective expressions, the distance H between the lens plane and pixels becomes 1.57 mm, the focal distance f of the lens becomes 1.57 mm, the lens pitch L becomes 0.4782 mm, and the radius of curvature r of the lens becomes 0.5161 mm. In addition, the distance $e_1$ to an enlarged projection position of a shading portion becomes 16 mm, and $e_2$ becomes 49 mm. These results show that, when the pixel opening ratio in the horizontal direction 112 is 50%, the width of the non-display area on the view plane also becomes 50%. Accordingly, when a viewer is positioned at the non-display area, since the viewer cannot recognize an image, he/she senses that the display quality has been considerably deteriorated.

Similar problems occur in three-dimensional image display devices not only by lens systems but also by parallax barrier systems. Hereinafter, a problem of non-display area in the parallax barrier system will be described in detail. FIG. 7 is an optical model diagram showing a three-dimensional image display device by a conventional parallax barrier system wherein a parallax barrier has been provided at a viewer's side. First, description is given of the sizes of respective portions of a three-dimensional image display device provided with a parallax barrier in which ordinal slit-like opening have been formed and a display panel. Here, for the convenience of description, a slit width of the parallax barrier is considered as being extremely small and disregardable. In addition, the slits in the parallax barrier are supposed to be arrayed in the horizontal direction in large numbers. As shown in FIG. 7, an array pitch of slits 105a in a parallax barrier 105 is provided as L, and a distance between the display panel 102 and parallax barrier 105 is provided as H. In addition, an array pitch of pixels is provided as P. As mentioned above, in the display panel 102, since display pixels are arranged as sets of two pixels, that is, one each of right-eye pixels 123 and left-eye pixels 124, an array pitch thereof becomes 2P. Since the array pitch L of the slits 105a and the array pitch P of the display pixels are mutually related, one is to be determined in accordance with the other, however, usually, since a parallax barrier is designed in accordance with a display panel in most cases, the array pitch P of pixels is treated as a constant.

In addition, a area where lights from all right-eye pixels 123 reach is provided as a right-eye area 171, and a area where lights from all left-eye pixels 124 reach is provided as a left-eye area 172. A viewer can recognize a three-dimensional image by positioning his/her right eye 141 at the right-eye area 171 and positioning his/her left eye 142 at the left-eye area 172. A distance from the display panel 102 to the viewer is provided as an optimal view distance OD. Furthermore, an enlarged projection width of one pixel on the view plane at the optimal view distance OD is provided as e.

Next, by use of the foregoing respective values, the distance H between the parallax barrier 105 and pixels of the display panel 102 is determined. By the geometric relationships shown in FIG. 7, the following expression 24 holds true, thereby, as shown in the following expression 25, the distance H is obtained.

$$P:H=e:(OD-H) \quad \text{(Expression 24)}$$

$$H=OD \times P/(P+e) \quad \text{(Expression 25)}$$

Furthermore, where a distance between the center of a display pixel positioned at the center in a horizontal direction 112 of the display panel 102 and center of a display pixel positioned at the end in the horizontal direction 112 is provided as $W_P$, and a distance between the centers of slits 105a corresponding to these display pixels, respectively, is provided as $W_L$, a difference C between the distance $W_P$ and distance $W_L$ is given by the following expressions 26.

$$W_P - W_L = C \quad \text{(Expression 26)}$$

In addition, in the display panel 102, where a number of pixels contained at the distance $W_P$ is provided as 2m, the following expressions 27 and 28 hold true.

$$W_P = 2 \times m \times P \quad \text{(Expression 27)}$$

$$W_L = m \times L \quad \text{(Expression 28)}$$

Furthermore, since the following expression 29 holds true based on the geometric relationships, the pitch L of the slits 105a in the parallax barrier 105 is given by the following expression 30.

$$W_P : OD = W_L : (OD-H) \quad \text{(Expression 29)}$$

$$L = 2 \times P \times (OD-H)/OD \quad \text{(Expression 30)}$$

When the opening ratio of the pixels is 50%, a distance $e_1$ from a centerline to an enlarged projection position of a centerline-side shading portion at the optimal view distance OD can be obtained by the following expression 31 using the above-described expression 24, since this is a position of a light beam emitted from the left end of an opening of the right-eye pixel 123 of the display panel 102 on an view plane at the optimal view distance OD.

$$e_1 = (P/4) \times (OD-H)/H \quad \text{(Expression 31)}$$

Similarly, a distance $e_2$ from a centerline to an enlarged projection position of an end-side shading portion at the view distance OD can be obtained by the following expression 32, since this is a position of a light beam emitted from the right end of an opening of the right-eye pixel 123 of the display panel 102 on an view plane at the optimal view distance OD.

$$e_2 = (3 \times P/4) \times (OD-H)/H \quad \text{(Expression 32)}$$

Since the above-described expressions 31 and 32 indicate that when the opening ratio in the barrier array direction is 50%, the width of the non-display area on the view plane also becomes 50%. When a viewer is positioned at the non-display area, the viewer cannot recognize an image; he/she senses that display quality has been considerably deteriorated.

Furthermore, a similar problem occurs in a three-dimensional image display device provided with a parallax barrier in the rear of a display panel, as well. Hereinafter, this problem will be described in detail. FIG. 8 is an optical model diagram showing a three-dimensional image display device by a conventional parallax barrier system wherein a parallax barrier has been provided in the rear of a display panel. First, description is given of the sizes of respective portions of a three-dimensional image display device provided with a parallax barrier in which ordinal slit-like openings have been formed and a display panel. Here, for the convenience of description, a slit width of the parallax barrier is considered as being extremely small and disregardable. In addition, the slits in the parallax barrier are supposed to be arrayed in the horizontal direction in large numbers. As shown in FIG. 8, an array pitch of slits 105a in a parallax barrier 105 is provided as L, and a distance between the display panel 102 and parallax barrier 105 is provided as H, in a similar fashion as the case where the parallax barrier 105 is arranged in the front of the above-described display panel 102. In addition, an array pitch of pixels is provided as P. As mentioned above, in the display panel 102, since display pixels are arranged as sets of two pixels, that is, one each of right-eye pixels 123 and left-eye pixels 124, an array pitch thereof becomes 2P. Since the array pitch L of the slits 105a and the array pitch P of the display pixels are mutually related, one is to be determined in accordance with the other, however, usually, since a parallax barrier is designed in accordance with a display panel in most cases, the array pitch P of pixels is treated as a constant.

In addition, a area where lights from all right-eye pixels 123 reach is provided as a right-eye area 171, and a area where lights from all left-eye pixels 124 reach is provided as a left-eye area 172. A viewer can recognize a three-dimensional image by positioning his/her right eye 141 at the right-eye area 171 and positioning his/her left eye 142 at the left-eye area 172. A distance from the display panel 102 to the viewer is provided as an optimal view distance OD. Furthermore, an enlarged projection width of one pixel on the view plane at the optimal view distance OD is provided as e.

Next, by use of the foregoing respective values, the distance H between the parallax barrier 105 and pixels of the display panel 102 is determined. By the geometric relationships shown in FIG. 8, the following expression 33 holds true, thereby, as shown in the following expression 34, the distance H is obtained.

$$P:H=e:(OD+H) \quad \text{(Expression 33)}$$

$$H=OD \times P/(e-P) \quad \text{(Expression 34)}$$

Furthermore, where a distance between the center of a display pixel positioned at the center in a horizontal direction 112 of the display panel 102 and center of a display pixel positioned at the end in the horizontal direction 112 is provided as $W_P$, and a distance between the centers of slits 105a corresponding to these display pixels, respectively, is provided as $W_L$, a difference C between the distance $W_P$ and distance $W_L$ is given by the following expressions 35.

$$W_L - W_P = C \quad \text{(Expression 35)}$$

In addition, in the display panel 102, where a number of pixels contained at the distance $W_P$ is provided as 2m, the following expressions 36 and 37 hold true.

$$W_P = 2 \times m \times P \quad \text{(Expression 36)}$$

$$W_L = m \times L \quad \text{(Expression 37)}$$

Furthermore, since the following expression 38 holds true based on the geometric relationships, the pitch L of the slits 105a in the parallax barrier 105 is given by the following expression 39.

$$W_P : OD = W_L : (OD+H) \quad \text{(Expression 38)}$$

$$L = 2 \times P \times (OD+H)/OD \quad \text{(Expression 39)}$$

When the opening ratio of the pixels is 50%, a distance $e_1$ from a centerline to an enlarged projection position of a centerline-side shading portion at the optimal view distance OD can be obtained by the following expression 40 using the above-described expression 33, since this is a position of a light beam emitted from the left end of an opening portion of the right-eye pixel 123 of the display panel 102 on an view plane at the optimal view distance OD.

$$e_1 = (P/4) \times (OD+H)/H \quad \text{(Expression 40)}$$

Similarly, a distance $e_2$ from a centerline to an enlarged projection position of an end-side shading portion at the optimal view distance OD can be obtained by the following expression 41, since this is a position of a light beam emitted from the right end of an opening of the right-eye pixel 123 of the display panel 102 on an view plane at the optimal view distance OD.

$$e_2 = (3 \times P/4) \times (OD+H)/H \quad \text{(Expression 41)}$$

Since the above-described expressions 40 and 41 indicate that when the opening ratio in the barrier array direction is 50%, the width of the non-display areas on the view plane also becomes 50%. When a viewer is positioned at the non-display area, the viewer cannot recognize an image; he/she senses that display quality has been considerably deteriorated.

Although a description has been given of a deterioration in display quality caused by a shading portion of a display panel while raising the examples of conventional three-dimensional image display devices, this problem is not limited to the three-dimensional image display devices and can similarly occur in image display devices as long as these are provided with optical components such as lenticular lenses and parallax barriers and the like.

SUMMARY OF THE INVENTION

It is an object of the present invention to provide an image display device capable of preventing deterioration in display quality caused by shading portions of a display panel, a portable terminal device equipped with the same, and a display panel incorporated in the image display device.

An image display device according to the present invention comprises: a display panel which has a plurality of pixel sections each of which includes n (n is a natural number equal to or more than two) types of pixels to display images for n viewpoints, the pixel sections being arrayed in a matrix in a first direction and in a second direction orthogonal to the first direction; an optical unit for sorting lights emitted from pixels arrayed in the first direction into mutually different directions along the first direction; and wherein display areas are provided in each of the pixels, and a display area provided in each of the pixels, in which at least two middle points between both ends of the display area in the first direction has different distances from an optical axes of the optical unit, the middle points being apart from each other along the optical axes.

In the present invention, since at least two middle points between both ends of the display area in the first direction has different distances from an optical axes of the optical unit, occurrence of non-display area where no light reaches from pixels can be suppressed. Thereby, deterioration in display quality caused by a shading portion can be suppressed.

In the pixels, the optical axes can be made parallel to the second direction. Thereby, since the position of middle point between both ends of the display area in the first direction varies depending on the position in the second direction where the optical unit has no function to emit light emitted from the pixels into mutually different directions, deterioration in display quality caused by a shading portion can be suppressed.

It is preferable that each display area in a plurality of the pixels arrayed along the second direction intersects with one straight line extending in the second direction. In addition, the display area may be quadrangular, and directions in which sides of these display area which intersect with straight lines extending in the first direction may not be parallel to the second direction. Thereby, since occurrence of non-display area where no light reaches from pixels can be suppressed, deterioration in display quality caused by a shading portion can be suppressed. In this case, sides of each display area in pixels mutually adjacent in the second direction which intersect with straight lines extending in the first direction are tilted in, for example, mutually opposite directions with respect to the second direction, and angles which are created between directions in which these sides extend and the second direction are identical in size. Thereby, since an array direction of the pixels can be made identical to the second direction, deterioration in display quality that occurs as a result of an array direction of pixels being different from the second direction can be prevented.

Alternatively, sides of the display area that intersect with straight lines extending in the first direction are composed of straight lines parallel to the second direction and straight lines vertical to the second direction. Thereby, each opening area of the pixel present on an identical straight line extending in the second direction can be enlarged, and illuminance at the boundary between respective viewpoint images can be improved, therefore, deterioration in display quality caused by a shading portion can further be suppressed.

Alternatively, sides of the display area, which intersect with straight lines extending in said first direction, are composed of curved lines. Thereby, since distribution of brightness on a view plane can be made into an arbitrary shape, setting with a higher degree of freedom according to desirable optical characteristics becomes possible. In addition, since the number of corners of a display area of the pixel can be minimized to four, and also, all corners can be composed of right angles, a decline in the opening ratio caused by the manufacturing method can be suppressed.

Furthermore, it is preferable that a shape of each display area in a pair of pixels mutually adjacent in the second direction is line-symmetric with respect to edges of the pixels extending in the first direction as an axis. Thereby, since an array direction of the pixels can be made identical to the second direction, deterioration in display quality caused by a difference between the array direction of the pixels and second direction can be prevented.

Still furthermore, it is also possible to provide a plurality of display areas in each pixel. Thereby, storage capacitance provided for each of the pixels and wiring to connect the storage capacitance can be arranged between the respective display areas. In this case, the display panel can be provided as a liquid crystal display panel, which can be operated in an In-Plane Switching mode. When the liquid crystal display panel is operated in an In-Plane Switching mode, deterioration in display quality caused by comb electrodes arranged to produce horizontal electric fields can be suppressed.

Still furthermore, it is preferable that a distance between both ends in the second direction of the display areas is fixed irrespective of the position in the first direction. Thereby, distribution of brightness with respect to the viewing position can be fixed, thus deterioration in display quality caused by a shading portion can be completely suppressed.

Still furthermore, wiring may be provided between display areas of a pair of pixels mutually adjacent in the first direction, and position of a middle point between both ends in the first direction of the wiring may vary in the first direction depending on the position in the second direction. Thereby, since an overlapping margin between the wiring and shading portion during assembly can be increased, the yield in manufacturing can be improved.

Still furthermore, when the image display device is a three-dimensional image display device, the first direction is, for example, a horizontal direction. Thereby, since images for a plurality of viewpoints are arranged in a viewer's horizontal direction, when parallax images are displayed as images for a plurality of viewpoints, an excellent three-dimensional image display can be realized.

Alternatively, when the image display device is a planar image display device, the first direction is, for example, a vertical direction. Thereby, viewer can view images for a plurality of viewpoints by only changing angles of the portable terminal device. In particular, when images for a plurality of viewpoints have a relationship to each other, since the respective images can be compared by a simple method of changing viewing angles, convenience is greatly improved. In addition, since images for a plurality of viewpoints are arrayed in the vertical direction, the viewer can always view the images for the respective viewpoints with both eyes; therefore, visibility of images for the respective viewpoints can be improved.

In the image display device of the present invention, the optical units may be a lenticular lens. Thereby, no such black striped pattern caused by a barrier as in a case where a parallax barrier is used occurs, thus light loss is also reduced.

Alternatively, in the image display device of the present invention, the optical unit may be a parallax barrier. Thereby, deterioration in quality of a display image owing to a lens pattern occurs less than that in the case where a lenticular lens is used.

Alternatively, in the image display device of the present invention, the optical unit may be a lenticular lens, and directions in which optical axes of cylindrical lenses of this lenticular lens extend may vary depending on a direction orthogonal to a direction in which the cylindrical lenses are arrayed. Thereby, deterioration in display quality caused by a shading portion can be suppressed.

Another image display device according to the present invention comprises: a display panel which has a plurality of pixel sections each of which includes n (n is a natural number equal to or more than two) types of pixels to display images for n viewpoints, the pixel sections being arrayed in a matrix in a first direction and in a second direction orthogonal to the first direction; an optical unit for sorting lights emitted from pixels arrayed in the first direction into mutually different directions along the first direction; and a display area provided in each of the pixels, in which provided an area where a position of an end of the display area in the first direction varies depending on a position in the second direction.

In the present invention, since an area where a position of an end of the display area in the first direction varies depending on a position in the second direction is provided in the display area, occurrence of non-display area where no light reaches from pixels can be suppressed. Thereby, deterioration in display quality caused by the shading portion can be suppressed.

In this image display device, the position of middle point between both ends of the display area in the first direction and a position of an optical axes of the optical unit can be made relatively invariable in the second direction. In addition, the display areas may be polygonal, and of sides of these display area that intersect with straight lines extending in the first direction, at least one side may not be parallel to the second direction. Furthermore, the display area can each have a pair of sides which intersect with straight lines extending in the first direction, whose extending directions are tilted in mutually opposite directions with respect to the second direction, and angles created between whose extending directions and second direction are identical in size. Still furthermore, the display area may have shapes including trapezoids. Thereby, deterioration in display quality caused by a shading portion can be suppressed.

For the image display device of the present invention, each display area of the pixels mutually adjacent in the second direction can be made line-symmetric with respect to edges of the pixels extending in the first direction as an axis, and each display area of the pixels mutually adjacent in the first direction can be made point-symmetric with respect to a middle point between intersection points between a line segment joining middle points between both ends in the second direction and a line segment joining middle points between both ends portion in the first direction. In addition, a sum of intervals between both ends in the second direction of respective pixels mutually adjacent in the first direction may be fixed irrespective of the position in the first direction. Thereby, since distribution of brightness with respect to viewing position can be fixed, deterioration in display quality caused by a shading portion can be completely eliminated.

In addition, the display panel may have a first substrate on which wiring has been formed and a second substrate which is arranged so as to be opposed to this first substrate and on which a shading portion has been formed, and the shading portion may not be formed between each display area of the pixels mutually adjacent in the first direction. Thereby, since a positional error margin in the first direction can be set great, it becomes possible to realize a high opening ratio.

Furthermore, the display panel has a color filter where an identical color has been successively arranged along the first direction and respective colors have been arranged in stripes along the second direction may be provided. Thereby, since it becomes unnecessary to shade same-color areas of the color filter, it becomes easy to manufacture a color filter, and a reduction in cost can be realized.

Still furthermore, when the image display device is a three-dimensional image display device, the first direction is, for example, a horizontal direction. Thereby, since images for a plurality of viewpoints are arranged in a viewer's horizontal direction, when parallax images are displayed as images for a plurality of viewpoints, an excellent three-dimensional image display can be realized.

Alternatively, when the image display device is a planar image display device, the first direction is, for example, a vertical direction. Thereby, a viewer can view images for a plurality of viewpoints by only changing angles of the portable terminal device. In particular, when images for a plurality of viewpoints have a relationship to each other, since the respective images can be compared by a simple method of changing viewing angles, convenience is greatly improved. In addition, since the images for a plurality of viewpoints are arrayed in the vertical direction, the viewer can always view images for the respective viewpoints with both eyes, therefore, visibility of images for the respective viewpoints can be improved.

In the image display device of the present invention, the optical unit may be a lenticular lens. Thereby, no such black striped pattern caused by a barrier as in a case where a parallax barrier is used occurs, thus light loss is also reduced.

Alternatively, in the image display device of the present invention, the optical unit may be a parallax barrier. Thereby, deterioration in quality of a display image owing to a lens pattern occurs less than that in the case where a lenticular lens is used.

Another image display device according to the present invention comprises: a liquid crystal display panel which has a plurality of pixel sections each of which includes n (n is a natural number equal to or more than two) types of pixels to display images for n viewpoints, the pixel sections being arrayed in a matrix in a first direction and in a second direction orthogonal to the first direction, and which operates in a multi-domained vertical orientation mode; an optical unit for sorting lights emitted from pixels arrayed in said first direction into mutually different directions along the first direction; and a plurality of display areas provided in each of the pixels, where a position of middle points between both ends in the first direction varies depending on a position in the second direction.

In the present invention, since a liquid crystal panel where a plurality of display areas where positions of middle points between both end portions in the first direction vary depending on the position in the second direction are provided in each pixel is operated in a multi-domained vertical orientation mode, deterioration in display quality caused by domain boundary areas which do not sufficiently penetrate light can be suppressed.

A portable terminal device according to the present invention comprises the aforementioned image display devices. In addition, this portable terminal device is, for example, a portable telephone, Personal Digital Assistant, a game machine, a digital camera, or a digital video camera.

A display panel according to the present invention comprises: a plurality of pixel sections arrayed in a matrix in a first direction and in a second direction orthogonal to the first direction, each of which includes n (n is a natural number equal to or more than two) types of pixels to display images for n viewpoints; and a display area provided in each pixel, where a position of middle points between both ends in the first direction varies depending on a position in the second direction.

It is preferable that each display area in a plurality of the pixels arrayed in the second direction intersects with one straight line extending in the second direction. In addition, the display area may be quadrangular, and directions in which sides of the display area which intersect with straight lines extending in the first direction may not be parallel to the second direction. In this case, sides of each display area in pixels mutually adjacent in the second direction which intersect with straight lines extending in the first direction are tilted in, for example, mutually opposite directions with respect to the second direction, and angles which are created between directions in which these sides extend and the second direction are identical in size.

Alternatively, sides of the display area that intersect with straight lines extending in the first direction may be composed of straight lines parallel to the second direction and straight lines vertical to the second direction. Alternatively, sides of the display area that intersect with straight lines extending in the first direction may be composed of curved lines.

In addition, it is preferable that a shape of each display area in a pair of pixels mutually adjacent in the second direction is line-symmetric with respect to edges of the pixels extending in the first direction as an axis. Furthermore, a plurality of display areas may be provided in each pixel, and in this case, it is preferable that the display panel is a liquid crystal panel that operates in an In-Plane switching mode. Still furthermore, an interval between both ends in the second direction of the display area may be fixed irrespective of the position in the first direction. Still furthermore, wiring may be provided between display areas of a pair of pixels mutually adjacent in the first direction, and position of a middle point between both ends in the first direction of the wiring varies in, for example, the first direction depending on the position in the second direction. A display panel of the present invention can be incorporated into an image display device, and by providing the first direction as a lens array direction of a lenticular lens of the image display device or a slit array direction of a parallax barrier, deterioration in display quality caused by a shading portion of the display panel can be prevented.

Another display panel according to the present invention comprises: a plurality of pixel sections arrayed in a matrix in a first direction and in a second direction orthogonal to the first direction, each of which includes n (n is a natural number equal to or more than two) types of pixels to display images for n viewpoints; and a display area provided in each pixel, where a position of middle point between both ends in the first direction is invariable irrespective of a position in the second direction, and also a position of end in the first direction varies depending on a position in the second direction.

The display area may be polygonal, and in this case, it is preferable that, at least one side of said display area, which intersect with straight lines extending in said first direction, is not parallel to said second direction. In addition, in the display area, a pair of sides which intersect with straight lines extending in the first direction, whose extending directions are tilted in mutually opposite directions with respect to the second direction, and angles created between whose extending directions and second direction are identical in size may be provided. Furthermore, the display areas have shapes including trapezoids, for example.

Still furthermore, each display area of the pixels mutually adjacent in the second direction may be line-symmetric with respect to edges of the pixels extending in the first direction as an axis, and each display area of the pixels mutually adjacent in the first direction may be point-symmetric with respect to a middle point between intersection point between a line segment joining middle points between both ends in the second direction and a line segment joining middle points between both ends in the first direction. Still furthermore, a sum of intervals between both ends in the second direction of respective pixels mutually adjacent in the first direction can be fixed irrespective of the position in the first direction. Here, it is unnecessary that the sum of intervals between both ends is strictly fixed, and it may be approximately fixed.

This display panel may have a first substrate on which wiring has been formed and a second substrate which is arranged so as to be opposed to this first substrate and on which a shading portion has been formed, and in this case, it is preferable that the shading portion has not been formed between each display area of the pixels mutually adjacent in the first direction. In addition, a color filter where an identical color has been successively arranged along the first direction and respective colors have been arranged in stripes along the second direction may be provided. A display panel of the present invention can be incorporated into an image display device, and by providing the first direction as a lens array direction of a lenticular lens of the image display device or a slit array direction of a parallax barrier, deterioration in display quality caused by a shading portion of the display panel can be prevented.

According to the present invention, since the position of middle point between both ends in the first direction of each display area in the pixels vary depending on the position in the second direction, occurrence of non-display area where no light reaches from pixels can be suppressed, thus deterioration in display quality caused by a shading portion of the display panel can be prevented.

A lens according to the present invention comprises: a plurality of cylindrical lenses whose directions in which optical axes extend vary depending on a direction orthogonal to an array direction. In the present invention, when this is used as optical unit of an image display device, deterioration in display quality caused by a shading portion of the display panel can be suppressed.

DETAILED DESCRIPTION OF THE PREFERRED EMBODIMENTS

Figure 9:
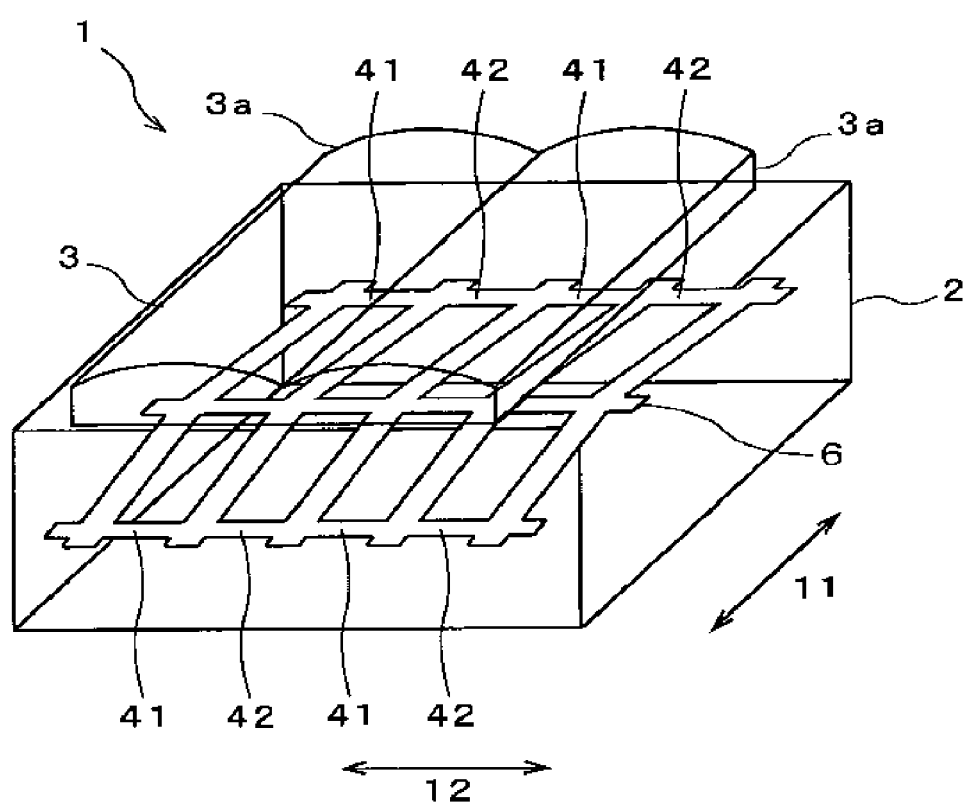
FIG. 9 is a perspective view showing a part of an image display device of a first embodiment of the present invention.
Figure 10:
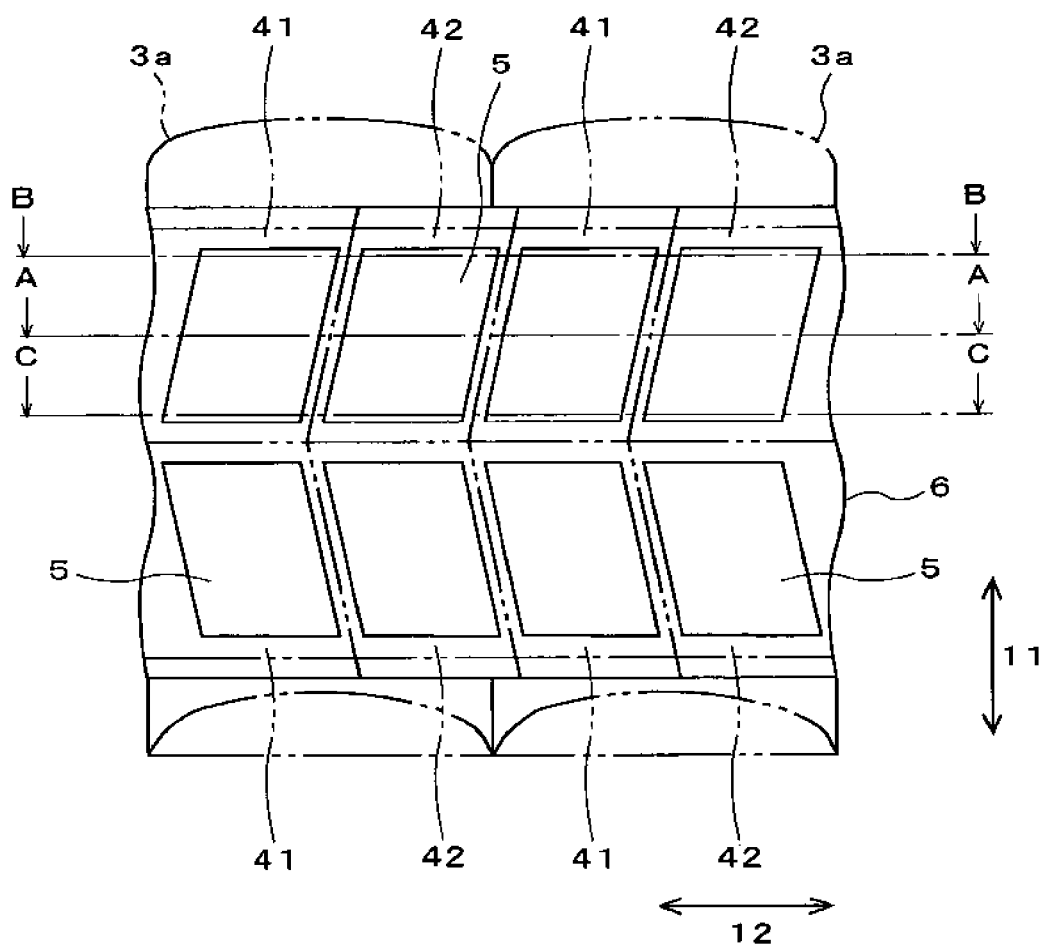
FIG. 10 is a plan view showing a display panel 2 shown in FIG. 9.

Hereinafter, image display devices according to embodiments of the present invention will be described in detail with reference to the accompanying drawings. First, description is given of an image display device according to a first embodiment of the present invention. FIG. 9 is a perspective view showing a part of an image display device of the present embodiment, and FIG. 10 is a plan view showing a display panel thereof. As shown in FIG. 9, in an image display device 1 of the present embodiment, a lenticular lens 3, a display panel 2, and a light source (unillustrated) are provided in order from a viewer side. The display panel 2 is, for example, a transmission liquid crystal panel. This display panel 2 is composed of a large number of display pixels, and each display pixel is composed of a pair of adjacent first viewpoint pixel 41 and second viewpoint pixel 42. Here, in FIG. 9, for the sake of improvement in visibility of the drawing, borders between cylindrical lenses 3a on the display panel are omitted, and the same applies to the following drawings, as well.

In addition, the lenticular lens 3 is provided a plurality of cylindrical lenses 3a parallel to each other. In the following, a longitudinal direction of this cylindrical lens 3a is provided as a vertical direction 11, while an array direction of the cylindrical lenses 3a is provided as a horizontal direction 12. And, the lenticular lens 3 is arranged so that each cylindrical lens 3a corresponds to an array of a pair of adjacent first viewpoint pixel 41 and second viewpoint pixel 42, namely, a display image along the vertical direction 11. In addition, for each pixel of the display panel 2, an opening 5 and a shading portion 6 are provided. This shading portion 6 is for preventing color mixture in an image and for providing wiring to transmit a display signal to the pixel.

As shown in FIG. 10, in the image display device of the present embodiment, quadrangular openings 5 as being display areas are formed in first viewpoint pixel 41 and second viewpoint pixel 42, and directions in which sides mutually opposed in the horizontal direction 12 extend are not parallel to the vertical direction 11 but are tilted with respect to the vertical direction 11. Namely, the openings 5 are in approximately parallelogramic forms in a plan view. Therefore, opening position of this display panel 2 varies depending on the position in the vertical direction 11. Concretely, a section along a line A-A, a section along a line B-B, and a section along C-C shown in FIG. 10 are different in the opening positions from each other. In addition, of the openings 5 of pixels mutually adjacent in the vertical direction 11, sides which are mutually opposed in the horizontal direction 12 are tilted in mutually opposite directions, and angles which are created between the directions in which these sides extend and vertical direction 11 are identical in size. Namely, a shape of the openings 5 of the respective pixels is, in the vertical direction 11, line-symmetric with respect to edges of the pixels extending in the horizontal direction 12 as an axis.

Figure 11:
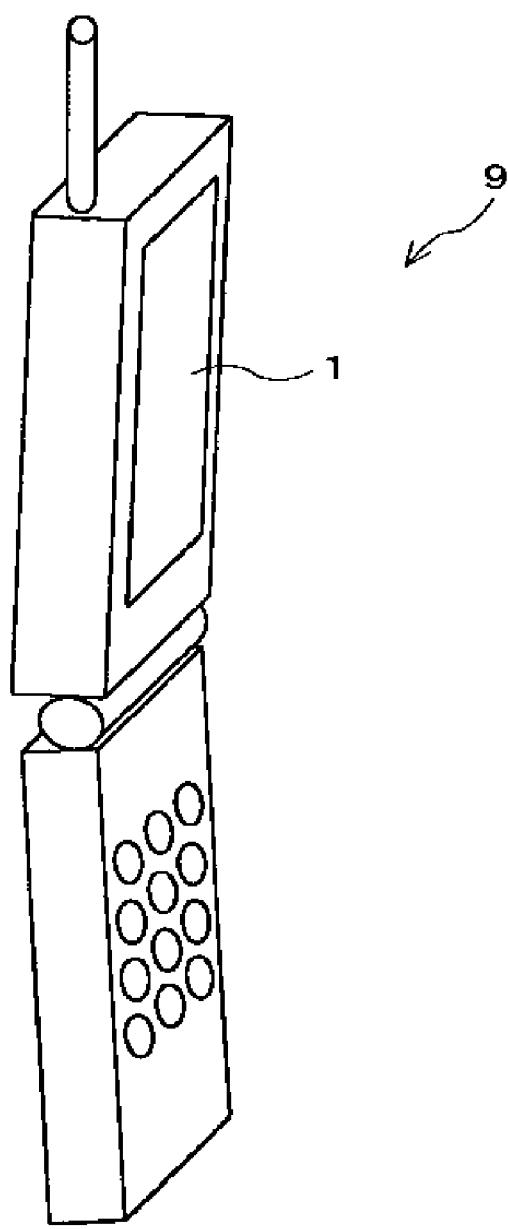
FIG. 11 is a perspective view showing a portable terminal equipped with the image display device according to the first embodiment of the present invention.

FIG. 11 is a perspective view showing a portable terminal equipped with an image display device according to the present embodiment. As shown in FIG. 11, for example this image display device 1 is equipped with a portable telephone 9.

Figure 12:
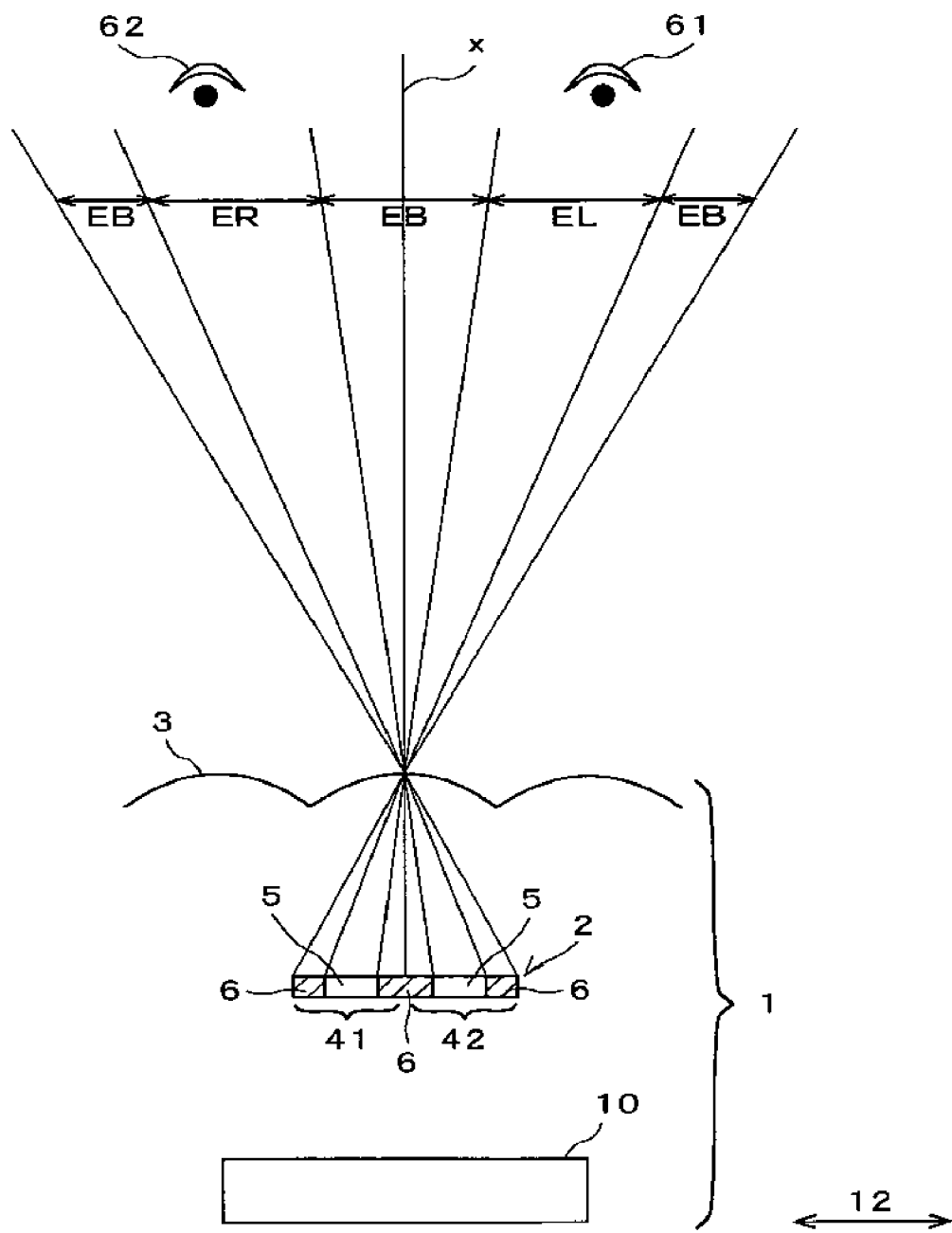
FIG. 12 is an optical model diagram of a section along a line A-A shown in FIG. 10.

Next, description will be given of operations of the image display device 1 constructed as described above, namely, an image display method in the image display device 1. FIG. 12 is an optical model diagram of a section along a line A-A shown in FIG. 10. As shown in FIG. 12, in the image display device 1 of the present embodiment, when a light source 10 is lit, light emitted from the light source 10 is made incident into the display panel 2. In addition, on the other hand, the display panel 2 is driven by a control device (unillustrated), and a first viewpoint image and a second viewpoint image are displayed, respectively, on the first viewpoint pixel 41 and second viewpoint pixel 42 of each display pixel. And, lights made incident into the first viewpoint pixel 41 and second viewpoint pixel 42 of the display panel 2 penetrate through the openings 5 of these pixels, and furthermore, these are refracted by the lenticular lens 3, and are emitted toward areas EL and ER, respectively. At this time, by a viewer positioning his/her left eye 61 at the area EL and his/her right eye 62 at the area ER, the first viewpoint image is inputted into the left eye 61, and also the second viewpoint image is inputted into the right eye 62. For example, when the first viewpoint image and second viewpoint image are parallax images to compose a three-dimensional image, the first viewpoint image is an image for the left eye 61, and the second viewpoint image is an image for the right eye 62, the viewer can recognize a three-dimensional image. However, in a section along the A-A line, non-display areas EB caused by the shading portion 6 occur at both sides of the display areas EL and ER.

Figure 13:
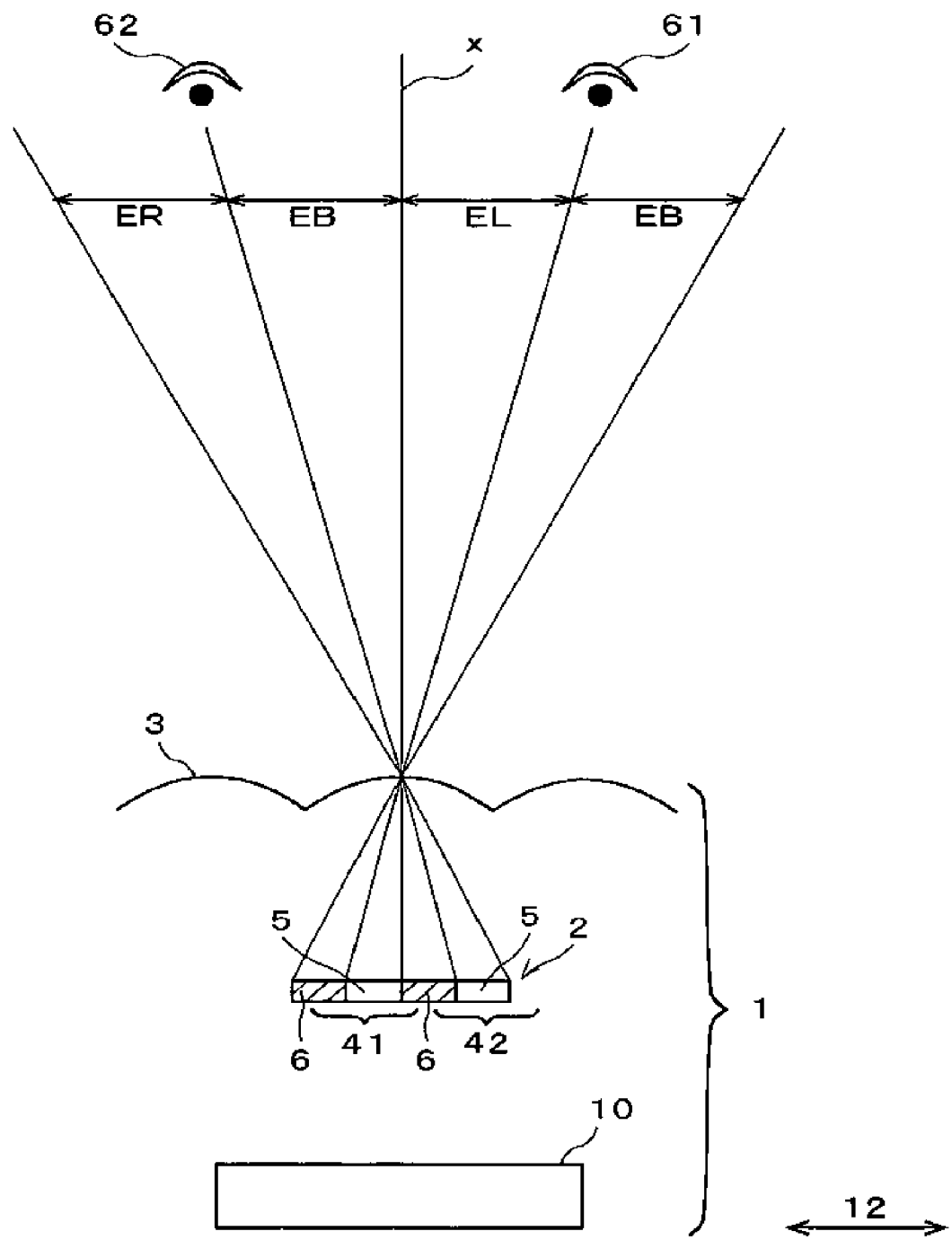
FIG. 13 is an optical model diagram of a section along a line B-B shown in FIG. 10.

In addition, FIG. 13 is an optical model diagram of a section along a line B-B shown in FIG. 10. As shown in FIG. 13, in the section along the line B-B, position of the openings 5 of the first viewpoint pixel 41 and second viewpoint pixel 42 is provided at a more right side in the drawing than in the section along the line A-A shown in FIG. 10. Therefore, in the section along the line B-B, non-display areas EB are one-sided to a right side in the drawing with respect to a centerline x of a view plane. Here, operations other than the above are the same as those with the section along the line A-A as described above.

Figure 14:
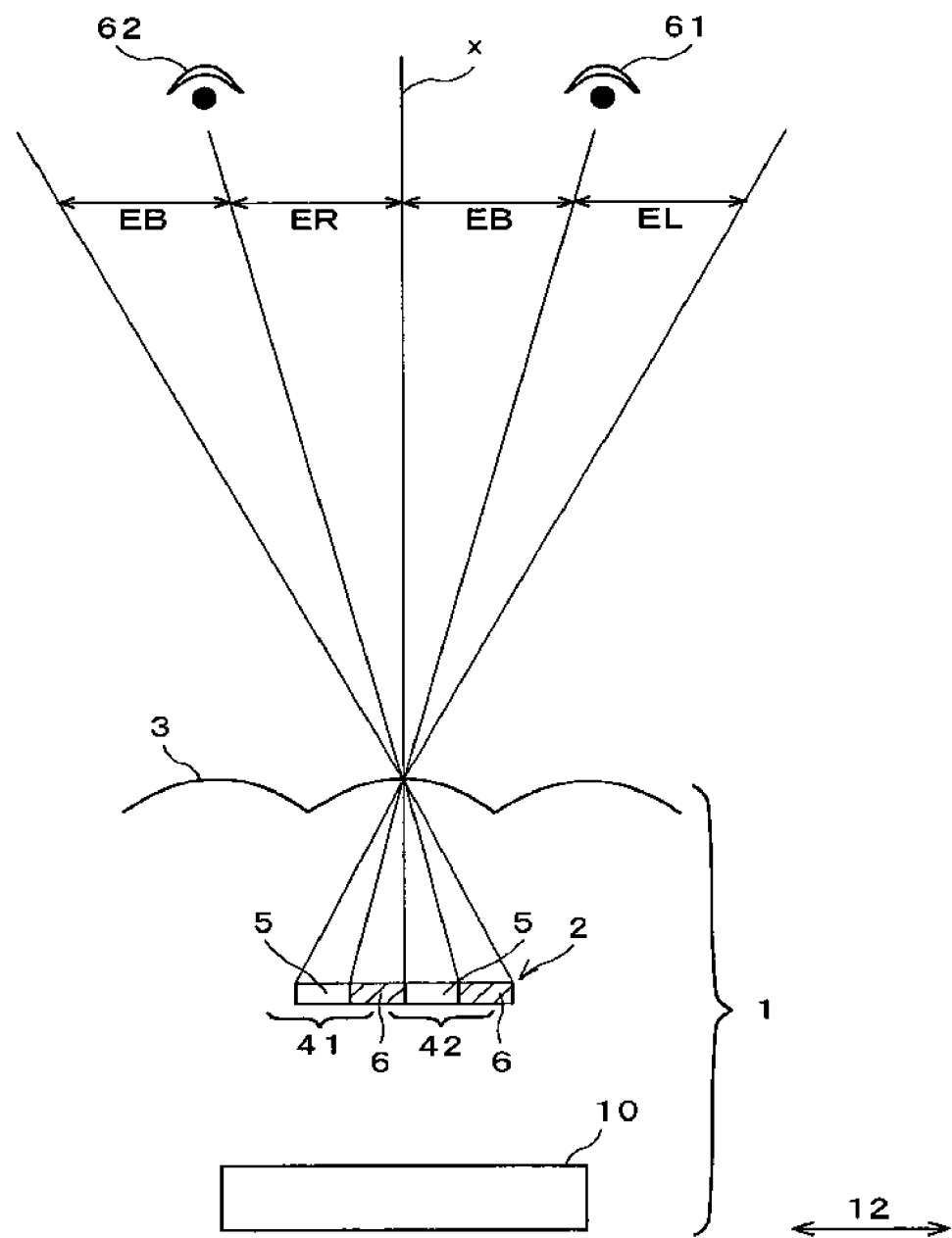
FIG. 14 is an optical model diagram of a section along a line C-C shown in FIG. 10.

Furthermore, FIG. 14 is an optical model diagram of a section along a line C-C shown in FIG. 10. As shown in FIG. 14, in a section along the line C-C, position of the openings 5 of the first viewpoint pixel 41 and second viewpoint pixel 42 is provided at a more left side in the drawing than in the section along the line A-A shown in FIG. 10. Therefore, in the section along the line C-C, non-display areas EB are one-sided to a left side in the drawing with respect to a centerline x of a view plane. Here, operations other than the above are the same as those with the section along the line A-A as described above.

Figure 15:
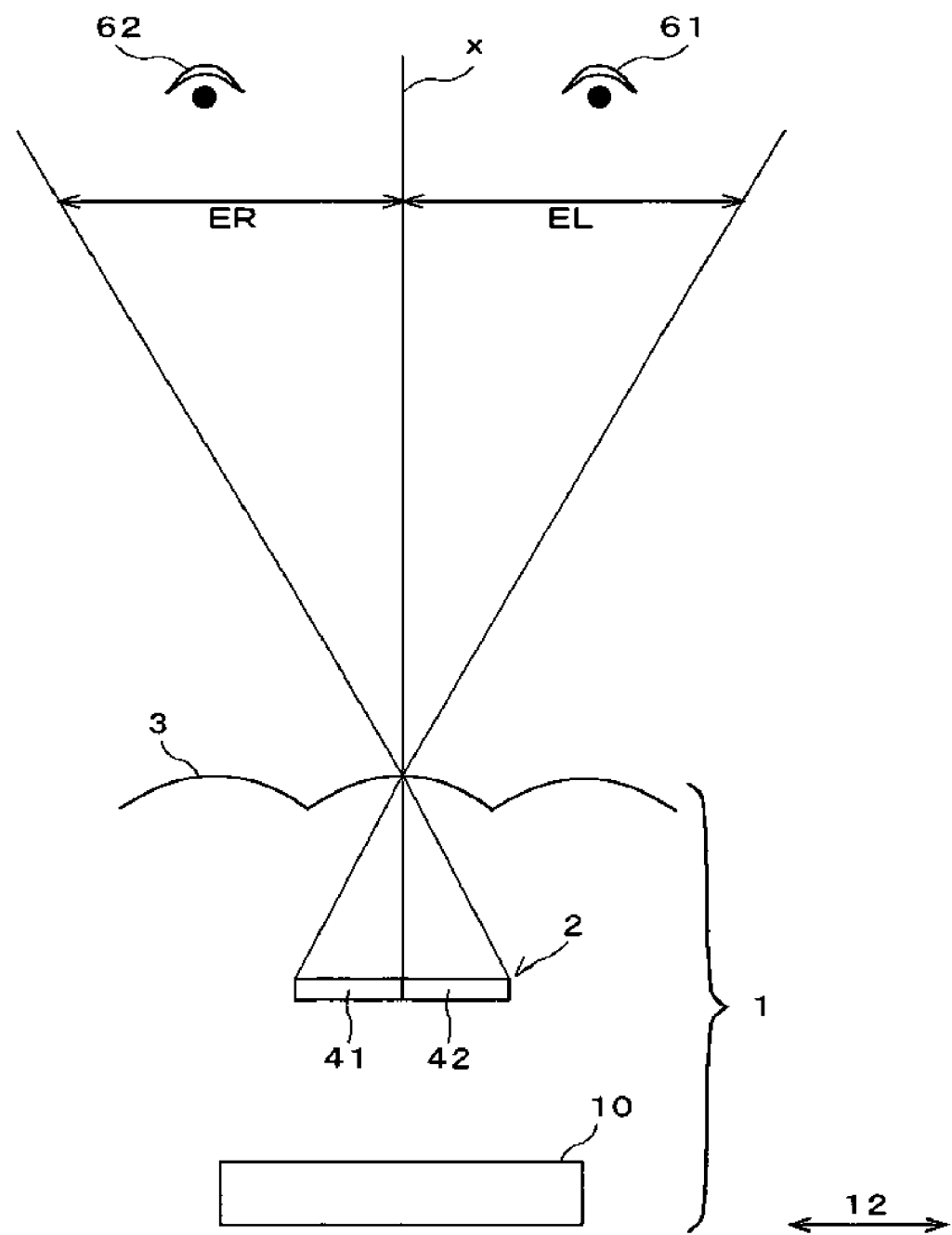
FIG. 15 is an optical model diagram showing operations of the image display device of the first embodiment of the present invention.

FIG. 15 is an optical model diagram showing operations of the image display device 1 of the present embodiment. The cylindrical lenses 3a to compose the lenticular lens 3 are lenses wherein lens elements are one-dimensionally successive and have no lens effect in the vertical direction 11, which is a successive direction thereof. Therefore, in actuality, the display areas EL and ER in the section along the line A-A (FIG. 12), section along the line B-B (FIG. 13), and section along the line C-C (FIG. 14) are synthesized and made into display areas EL and ER shown in FIG. 15. As a result, in the image display device 1 of the present embodiment, since the non-display area EB is eliminated, deterioration in display quality caused by the shading portion 6 can be suppressed.

Figure 16:
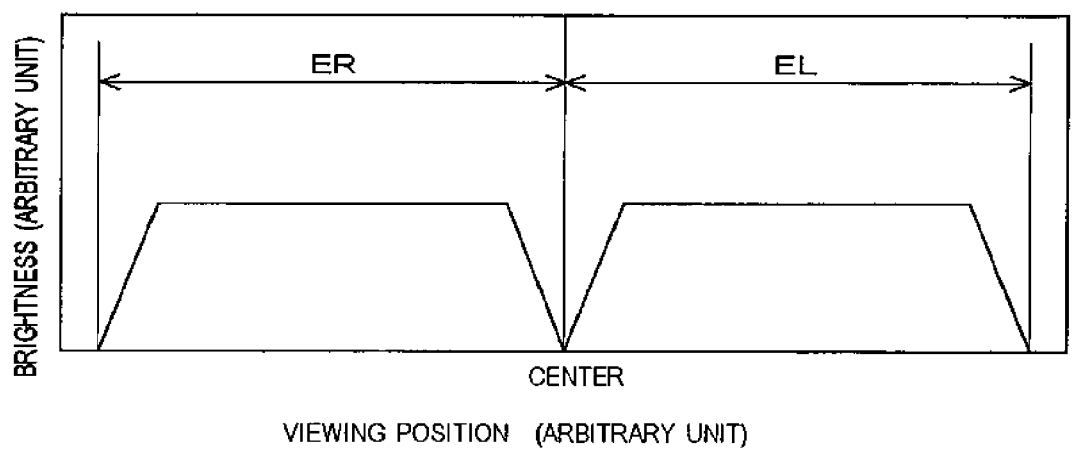
FIG. 16 is a graph showing distribution of brightness on a view plane of the image display device 1 of the first embodiment of the present invention while taking a viewing position on the horizontal axis and brightness on the vertical axis.

FIG. 16 is a graph showing distribution of brightness on a view plane of the image display device 1 of the first embodiment of the present invention while taking a view position on the horizontal axis and brightness on the vertical axis. As shown in FIG. 16, for the image display device 1 of the present embodiment, since an influence of the shading portion 6 is relieved by the foregoing effect, no non-display area EB where no light reaches from each pixel occurs.

In general, when the array direction of the first viewpoint pixel 41 and second viewpoint pixel 42 is not parallel to the longitudinal direction of the cylindrical lens 3a, display quality is deteriorated since images are observed in a superimposed manner. Therefore, in the image display device 1 of the present embodiment, of the openings 5 mutually adjacent in the horizontal direction 12, sides which are mutually opposed in the horizontal direction 12 are tilted in mutually opposite directions with respect to the vertical direction 11, and angles which are created between the direction in which these sides extend and vertical direction 11 are identical in absolute values. Namely, a shape of the openings 5 is line-symmetric with respect to edges of the pixels extending in the horizontal direction 12 as an axis. Accordingly, since the first viewpoint pixel 41 and second viewpoint pixel 42 are respectively arrayed along the vertical direction 11, the array direction of the first viewpoint pixel 41 and second viewpoint pixel 42 and the longitudinal direction of the cylindrical lens 3a can be made parallel to each other. Therefore, in the image display device 1 of the present embodiment, no problem such that images are observed in a superimposed manner occurs.

In addition, in the display device 1 of the present embodiment, since the shapes of the openings 5 surrounded by the shading portion 6 are approximately parallelogramic in a plan view, two of the four corners have obtuse angles. In general, when a light shading portion 6 is fabricated by a low-cost manufacturing method, the corners are rounded to lower the opening ratio, however, the image display device 1 of the present embodiment is small in the number of corners, and furthermore, half thereof can be constructed with obtuse angles, therefore, rounding of the corners can be suppressed to a minimum. As a result, lowering in the opening ratio caused by the manufacturing method can be suppressed. For this, in particular, a great effect can be obtained when the invention is applied to a high-definition image display device with a small pixel pitch.

Figure 17:
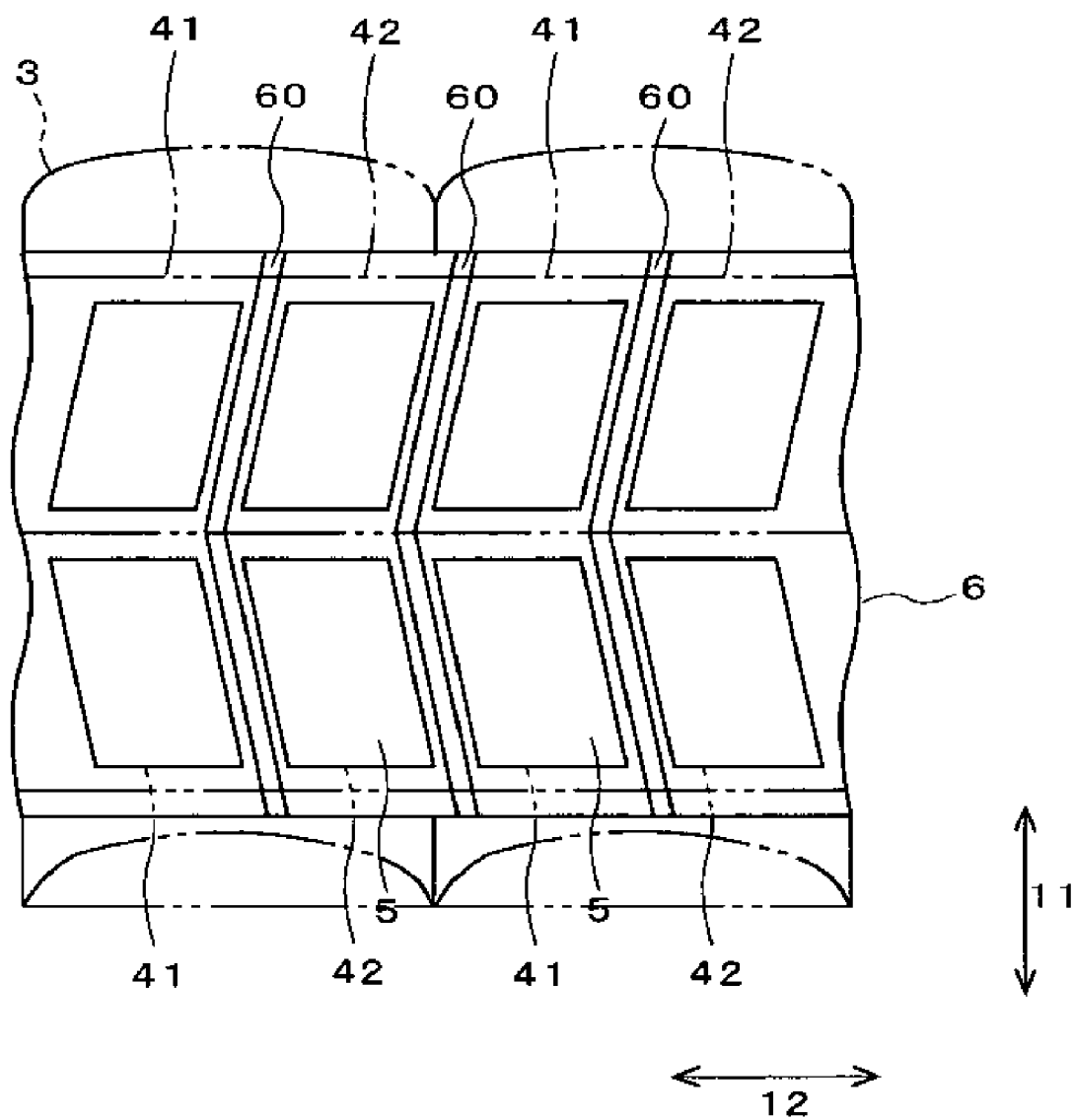
FIG. 17 is a plan view showing wiring positions in a display panel 2 shown in FIG. 9.

FIG. 17 is a plan view showing wiring positions in a display panel 2 shown in FIG. 9. In the image display device 1 of the present embodiment, although directions in which sides which are mutually opposed in the horizontal direction 12 extend are not parallel to the vertical direction 11, as shown in FIG. 17, it is preferable that the longitudinal direction of wiring 60 arranged between the openings 5 adjacent in the horizontal direction 12 is also not parallel to the vertical direction 11. Thereby, since an overlapping margin between the wiring 60 and shading portion 6 during assembly can be increased, the yield in manufacturing is improved.

Furthermore, since the image display device 1 of the present embodiment uses the lenticular lens 3 as an image sorting component, no such black striped pattern caused by a barrier as in an image display using a parallax barrier occurs, thus light loss is small. Here, in the foregoing, although a description has been given for a case with two viewpoints, the present invention is not limited hereto, and similar effects can also be obtained when an image display device is provided with multiple viewpoints of three viewpoints or more.

In addition, the image display device 1 of the present embodiment can be favorably applied to a portable apparatus such as a portable telephone, which can display an excellent image. In particular, when a three-dimensional image is displayed on this image display device 1, unlike when this is applied to a large-size display device, since a viewer can arbitrarily adjust a positional relationship between both his/her eyes and a display screen, he/she can swiftly find out an optimal visible range. Furthermore, when a planar image of different contents is displayed on the image display device 1 of the present embodiment, unlike when this is applied to a large-size display device, since a viewer can view the planar image of different contents by only changing angles of the image display device, convenience is greatly improved. Still furthermore, the image display device 1 of the present embodiment can be applied not only to portable telephones but also to various types of portable terminal devices such as portable terminals, PDAs (Personal Digital Assistant), game machines, digital cameras, and digital video cameras.

Here, in the image display device 1 of the present embodiment, although a transmissive liquid crystal display panel has been used as a display panel, the present invention is not limited hereto, and a reflective liquid crystal display panel or a semi-transmissive liquid crystal display panel where a transmitting area and a reflecting area are provided in each pixel may be used. In addition, a driving method for a liquid crystal display panel may be of an active matrix system such as a TFT (Thin Film Transistor) system, a TFD (Thin Film Diode) system and the like, or it may be of a passive matrix system such as an STN (Super Twisted Nematic liquid crystal) system and the like. Furthermore, for the display panel, a display panel other than a liquid crystal display panel, for example, an organic electroluminescent display panel, a plasma display panel, a CRT (Cathode-Ray Tube) display panel, an LED (Light Emitting Diode) display panel, a field emission display panel, or a PALC (Plasma Address Liquid Crystal) display may be used. Still furthermore, in the image display device 1 of the present embodiment, a color image may be displayed by a time-sharing system.

Figure 18:
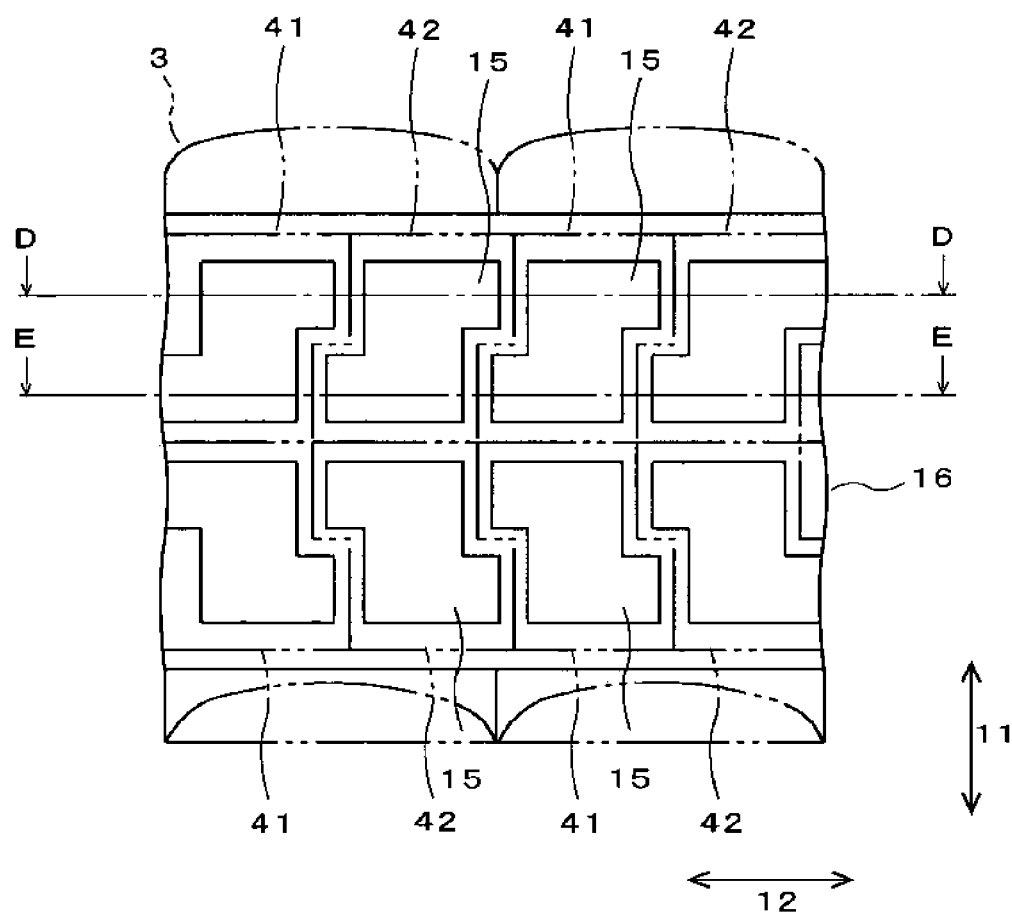
FIG. 18 is a plan view showing a display panel of an image display device of a second embodiment of the present invention.

Next, description is given of an image display device according to a second embodiment of the present invention. FIG. 18 is a plan view showing a display panel of an image display device of the present embodiment. As shown in FIG.

18, in an image display device 13 of the present embodiment, of respective openings 15 of first viewpoint pixels 41 and second viewpoint pixel 42, sides which intersect with straight lines extending in a horizontal direction 12 are composed of straight lines parallel to a vertical direction 11 and straight lines vertical to the same, and the openings 15 have shapes with a dislocation in the horizontal direction 12 in the vicinities of center portions. Accordingly, position of the openings in this display panel 14 varies depending on the position in the vertical direction 11.

Figure 19:
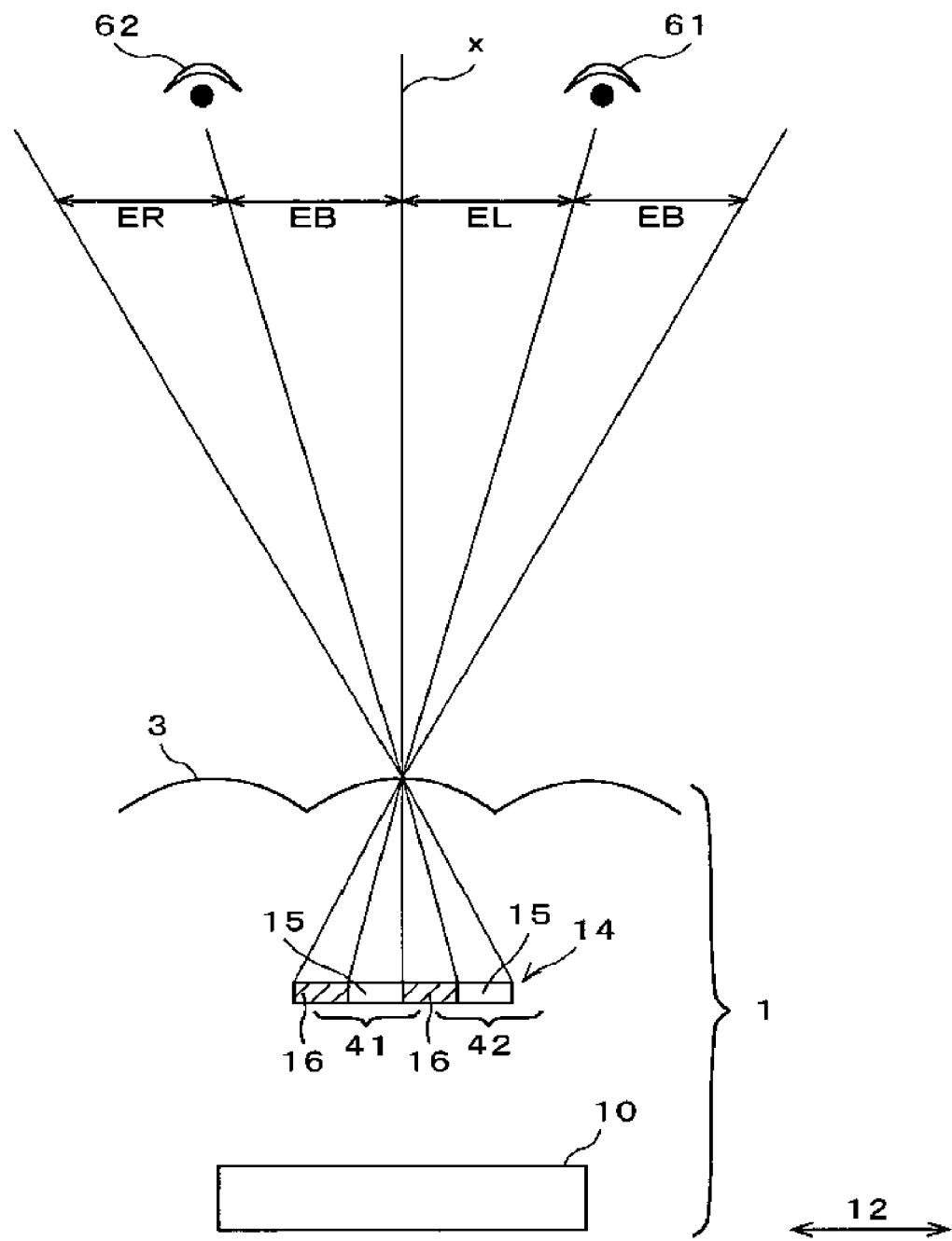
FIG. 19 is an optical model diagram of a section along a line D-D shown in FIG. 18.
Figure 20:
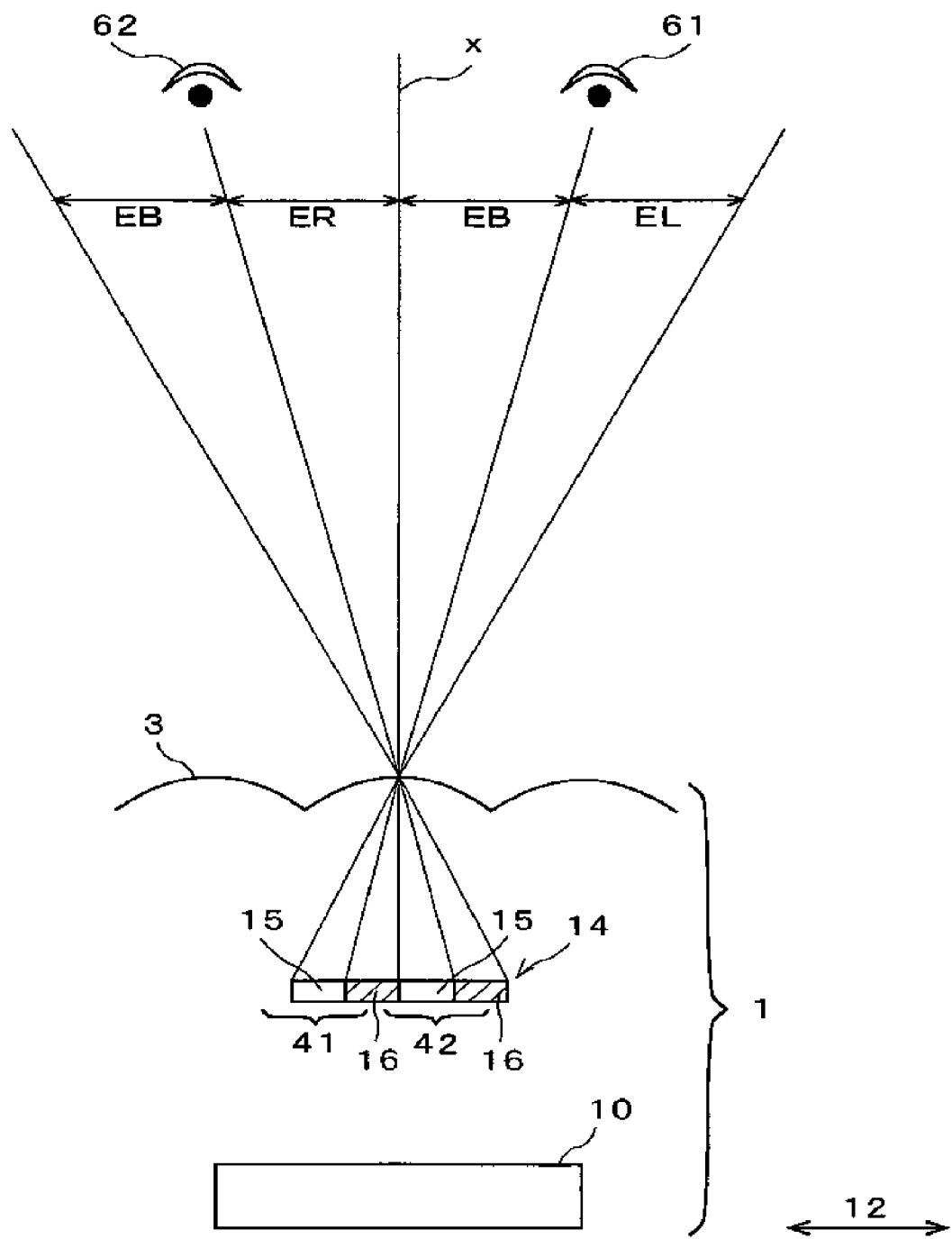
FIG. 20 is an optical model diagram of a section along a line E-E shown in FIG. 18.

FIG. 19 is an optical model diagram of a section along a line D-D shown in FIG. 18. As shown in FIG. 19, in the section along the line D-D, position of the openings 15 of the first viewpoint pixel 41 and second viewpoint pixel 42 is provided rightward in the drawing. Therefore, in the section along the line D-D, non-display areas ES are one-sided to the right side in the drawing with respect to a centerline x of a view plane. In addition, FIG. 20 is an optical model diagram of a section along a line E-E shown in FIG. 18. As shown in FIG. 20, in the section along the line E-E, position of the openings 15 of the first viewpoint pixel 41 and second viewpoint pixel 42 is provided leftward in the drawing. Therefore, in the section along the line E-E, unlike the aforementioned section along the line D-D, non-display areas EB are one-sided to the left side in the drawing with respect to a centerline x of a view plane.

Figure 21:
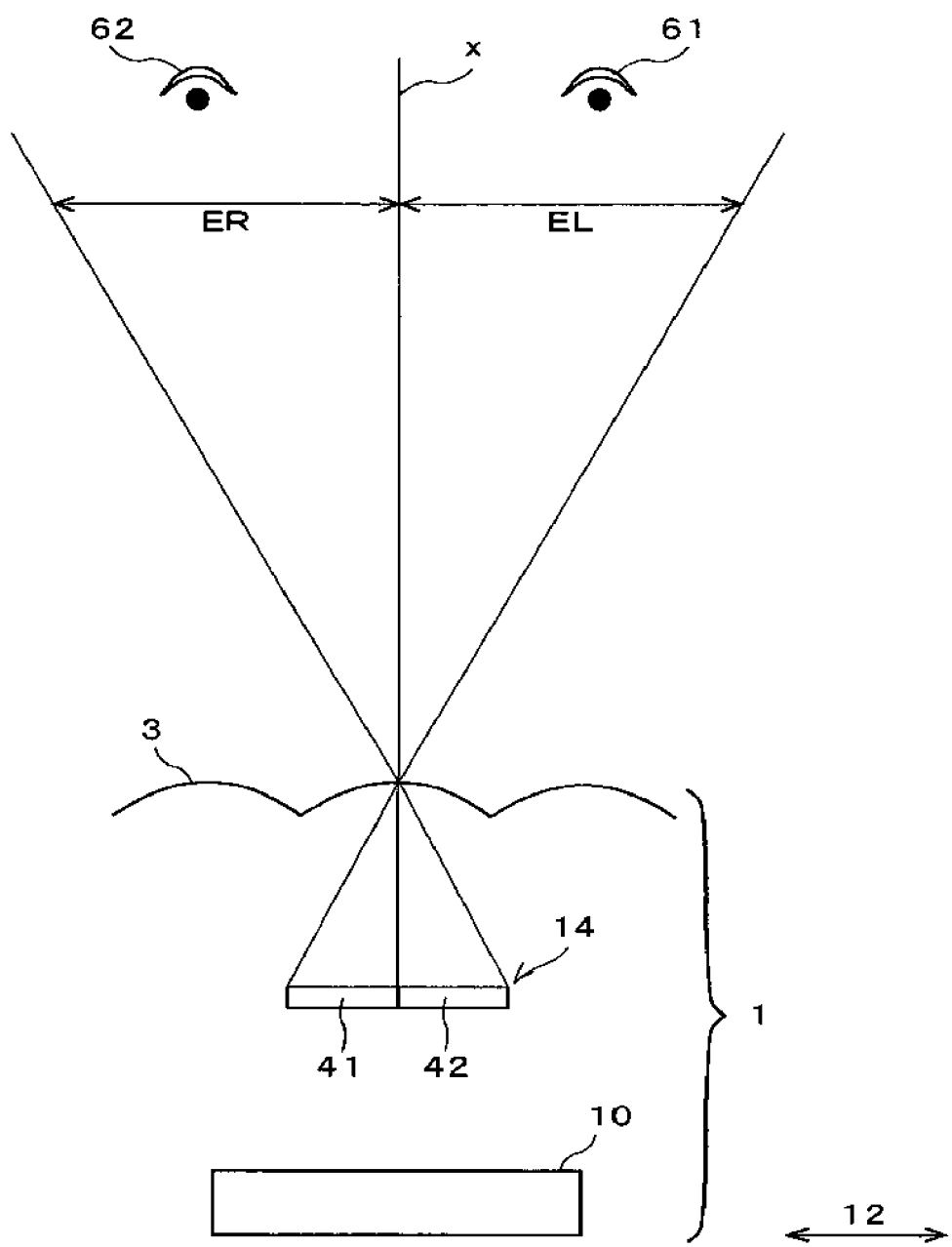
FIG. 21 is an optical model diagram showing operations of the image display device of the second embodiment of the present invention.

FIG. 21 is an optical model diagram showing operations of the image display device 13 of the present embodiment. In this image display device 13, similar to the aforementioned first embodiment, since a lenticular lens is used, the display areas EL and ER in the section along the line D-D (FIG. 19) and the section along the line E-E (FIG. 20) are synthesized and made into display areas EL and ER shown in FIG. 21. As a result, in the image display device 13 of the present embodiment, since the non-display areas EB are eliminated, deterioration in display quality caused by a shading portion 16 can be suppressed.

Figure 22:
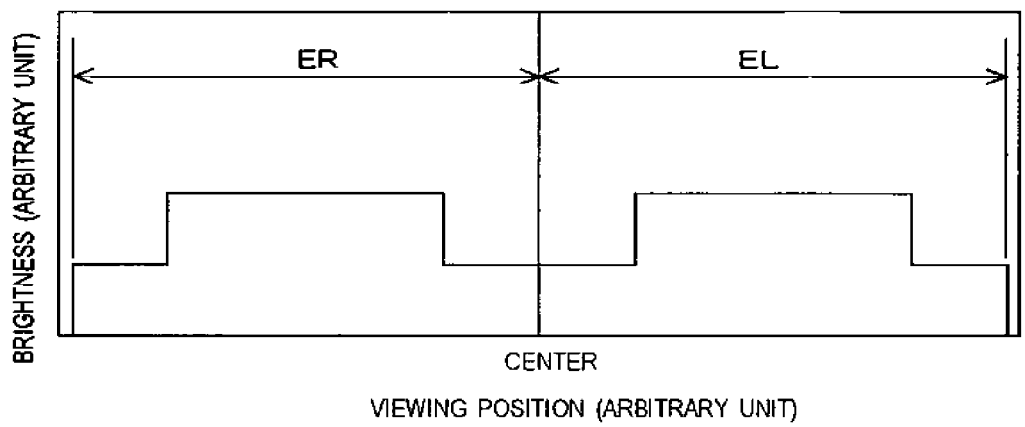
FIG. 22 is a graph showing distribution of brightness on a view plane of the image display device of the second embodiment of the present invention while taking a viewing position on the horizontal axis and brightness on the vertical axis.

FIG. 22 is a graph showing distribution of brightness on a view plane of the image display device of the second embodiment of the present invention while taking a viewing position on the horizontal axis and brightness on the vertical axis. As shown in FIG. 22, for the image display device 13 of the present embodiment, since an influence of the shading portion 16 is relieved by the foregoing effect, no non-display areas EB where no light reaches from each pixel occur. In addition, since brightness in the vicinity of an image boundary can be made greater than that of the image display device 1 of the aforementioned embodiment, an effect to suppress deterioration in display quality caused by the shading portion 16 is greater.

In addition, in the image display device 13 of the present embodiment, since sides of the openings 15 which intersect with straight lines extending in the horizontal direction 12 are composed of straight lines parallel to a vertical direction 11 and straight lines vertical to the same, the respective openings 15 of the first viewpoint pixel 41 and second viewpoint pixel 42 can be made larger than those of the image display device 1 of the aforementioned first embodiment. As a result, since illuminance at the boundary between the respective viewpoint images can be heightened, in comparison with the image display device 1 of the aforementioned first embodiment, an effect to suppress deterioration in display quality caused by the shading portion 16 is great.

However, for the image display device 13 of the present embodiment, since wiring must be arranged on the shading portion 16 formed between the openings 15 mutually adjacent in the horizontal direction 12 so as to become parallel and vertical to the vertical direction 11, the wiring length is made longer than that of the image display device of the aforementioned first embodiment, and a wiring time constant caused by wiring resistance and capacity is increased. Therefore, as regards driving the display panel, the image display device 1 of the aforementioned first embodiment is more advantageous than the image display device 13 of the present embodiment. Here, in the image display device 13 of the present embodiment, aspects of the construction and operations other than the above are the same as those of the image display device 1 of the aforementioned first embodiment.

Figure 23:
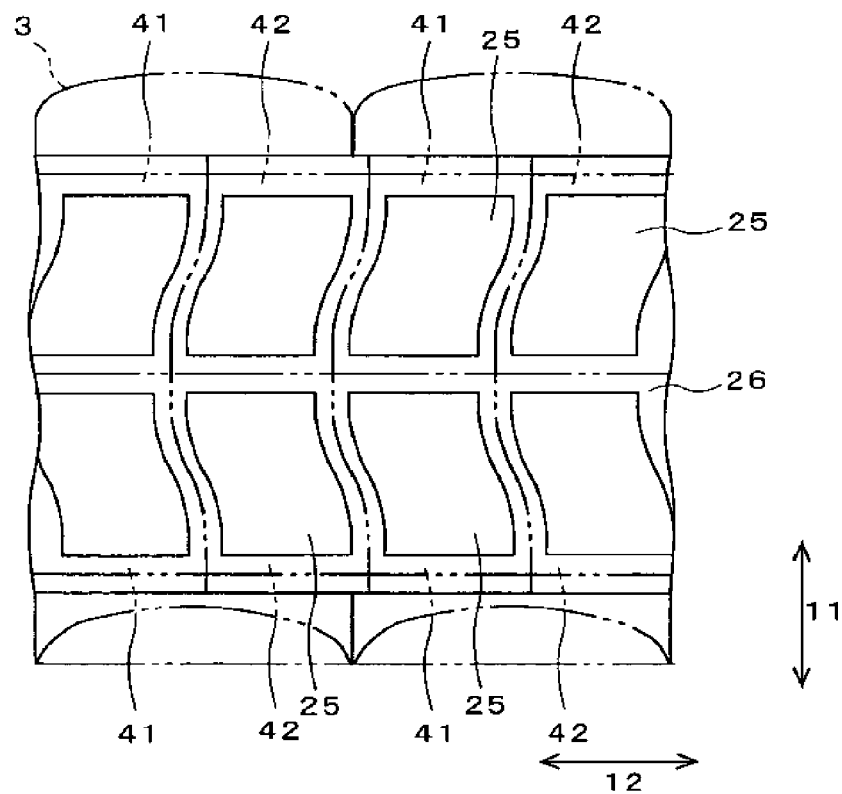
FIG. 23 is a plan view showing a display panel of an image display device of a third embodiment of the present invention.

Next, description is given of an image display device according to a third embodiment of the present invention. FIG. 23 is a plan view showing a display panel of an image display device of the third embodiment of the present invention. As shown in FIG. 23, in the image display device of the present embodiment, sides of openings 25 of the display panel which intersect with straight lines extending in a horizontal direction 12 are composed of curved lines. Namely, sides of openings 25 opposed in a horizontal direction 12 are composed of curved lines.

Figure 24:
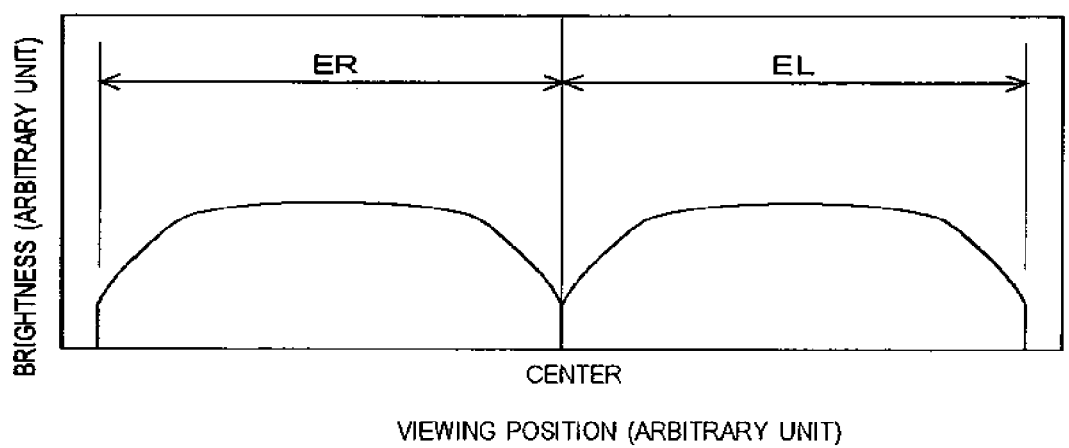
FIG. 24 is a graph showing distribution of brightness on a view plane of the image display device of the third embodiment of the present invention while taking a viewing position on the horizontal axis and brightness on the vertical axis.

FIG. 24 is a graph showing distribution of brightness on a view plane of the image display device of the third embodiment of the present invention while taking a viewing position on the horizontal axis and brightness on the vertical axis. In the image display device of the present embodiment, since the sides of the openings 25 of the display panel which intersect with straight lines extending in the horizontal direction 12 are composed of curved lines, distribution of brightness on a view plane can be made into an arbitrary shape, and for example, into a shape of distribution as shown in FIG. 24, setting with a higher degree of freedom according to desirable optical characteristics becomes possible.

In addition, in the image display device of the present embodiment, the number of corners of each opening 25 surrounded by a shading portion 26 can be minimized to four, and furthermore, all corners can be made into right angles. Namely, no such acute-angled corners are formed as in the image display device 1 of the aforementioned first embodiment. Thereby, in comparison with the image display devices of the aforementioned first and second embodiments, a decline in the opening ratio caused by the manufacturing method can be suppressed. Here, aspects of the construction and operations of the image display device of the present embodiment other than the above are the same as those of the image display device 1 of the aforementioned first embodiment.

Figure 25:
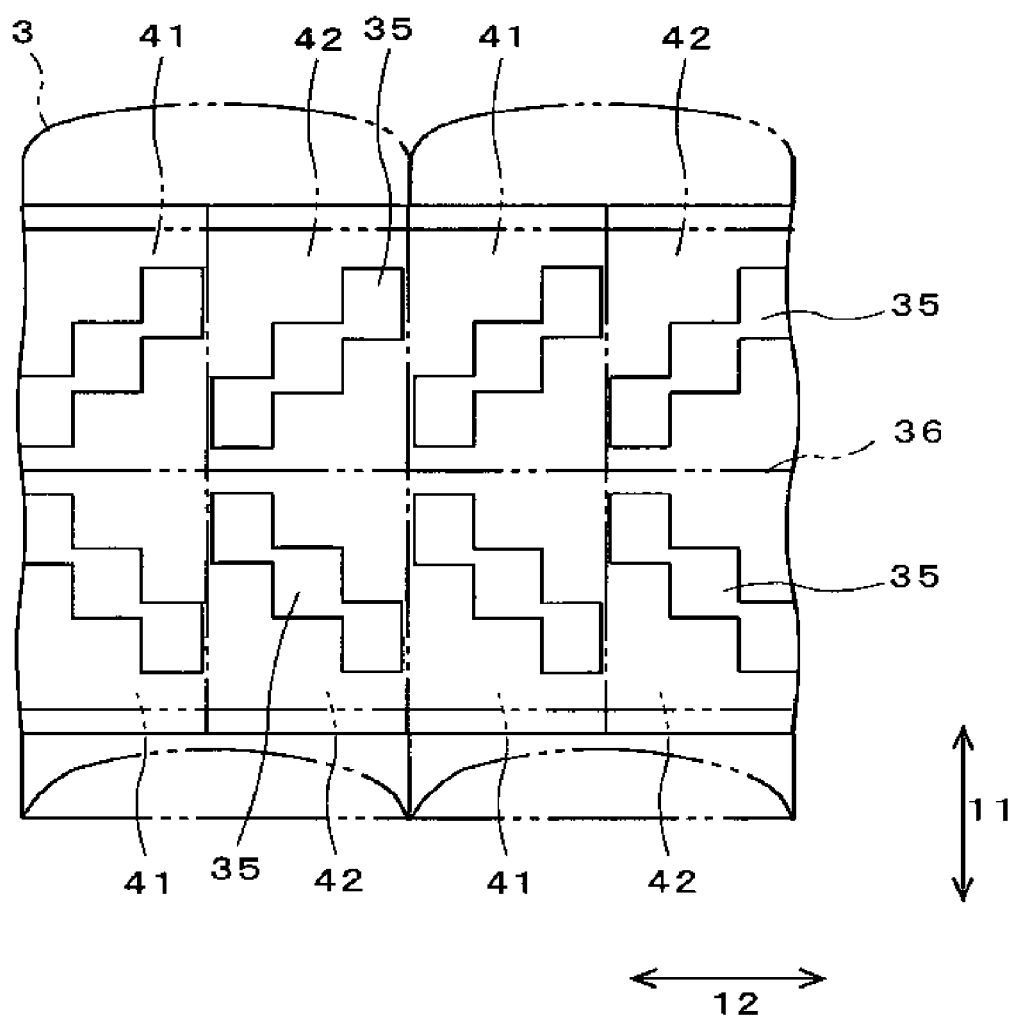
FIG. 25 is a plan view showing a display panel of an image display device of a fourth embodiment of the present invention.

Next, description is given of an image display device according to a fourth embodiment of the present invention. FIG. 25 is a plan view showing a display panel of an image display device of the fourth embodiment of the present invention. As shown in FIG. 25, in the image display device of the present embodiment, provided are openings 35 in a shape where three rectangles having equal areas in a plan view have been staggered in a vertical direction 11 and connected in a horizontal direction 12. These openings 35 have been formed so that shapes of pixels that are mutually adjacent in the horizontal direction 12 become identical and a form of pixels that are mutually adjacent in the vertical direction 11 becomes line-symmetric. Accordingly, the respective pixels have a fixed opening ratio in the vertical direction 11 at an arbitrary position in the horizontal direction 12.

Figure 26:
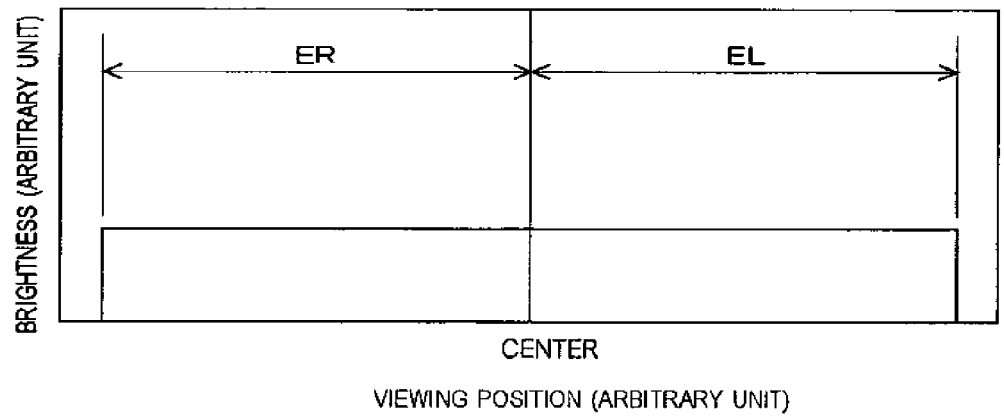
FIG. 26 is a graph showing distribution of brightness on a view plane of the image display device of the fourth embodiment of the present invention while taking a viewing position on the horizontal axis and brightness on the vertical axis.

FIG. 26 is a graph showing distribution of brightness on a view plane of the image display device of the fourth embodiment of the present invention while taking a viewing position on the horizontal axis and brightness on the vertical axis. As shown in FIG. 26, in the image display device of the present embodiment, since the opening ratio in the vertical direction 11 of the respective pixels is fixed at an arbitrary position in the horizontal direction, brightness distribution with respect to the viewing position can be fixed, thus deterioration in display quality caused by a shading portion 36 can be completely eliminated. Here, aspects of the construction and operations of the image display device of the present embodiment other than the above are the same as those of the image display device 13 of the aforementioned second embodiment. This display panel can also be applied to the image display device of the aforementioned third embodiment.

Figure 27:
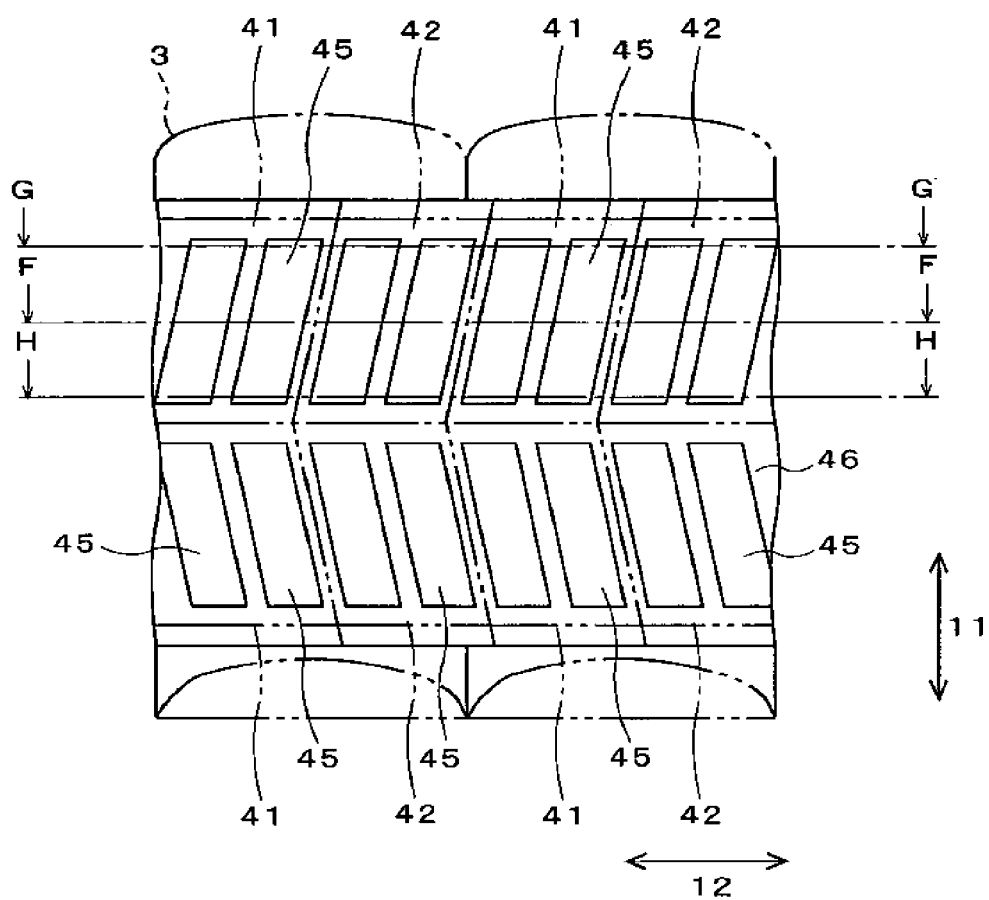
FIG. 27 is a plan view showing a display panel of an image display device of a fifth embodiment of the present invention.

Next, description is given of an image display device according to a fifth embodiment of the present invention. FIG. 27 is a plan view showing a display panel of an image display device of the fifth embodiment of the present invention. As shown in FIG. 27, in an image display device 43 of the present embodiment, the openings in the display panel of the image display device of the aforementioned first embodiment are each divided into two in a horizontal direction 12 by a shading portion. Namely, in the first viewpoint pixel 41 and second viewpoint pixel 42, two mutually parallel openings 45 are provided, respectively. Moreover, sides of openings 45 which intersect with straight lines extending in the horizontal direction 12 are not parallel to a vertical direction 11 but are tilted with respect to the vertical direction 11.

Figure 28:
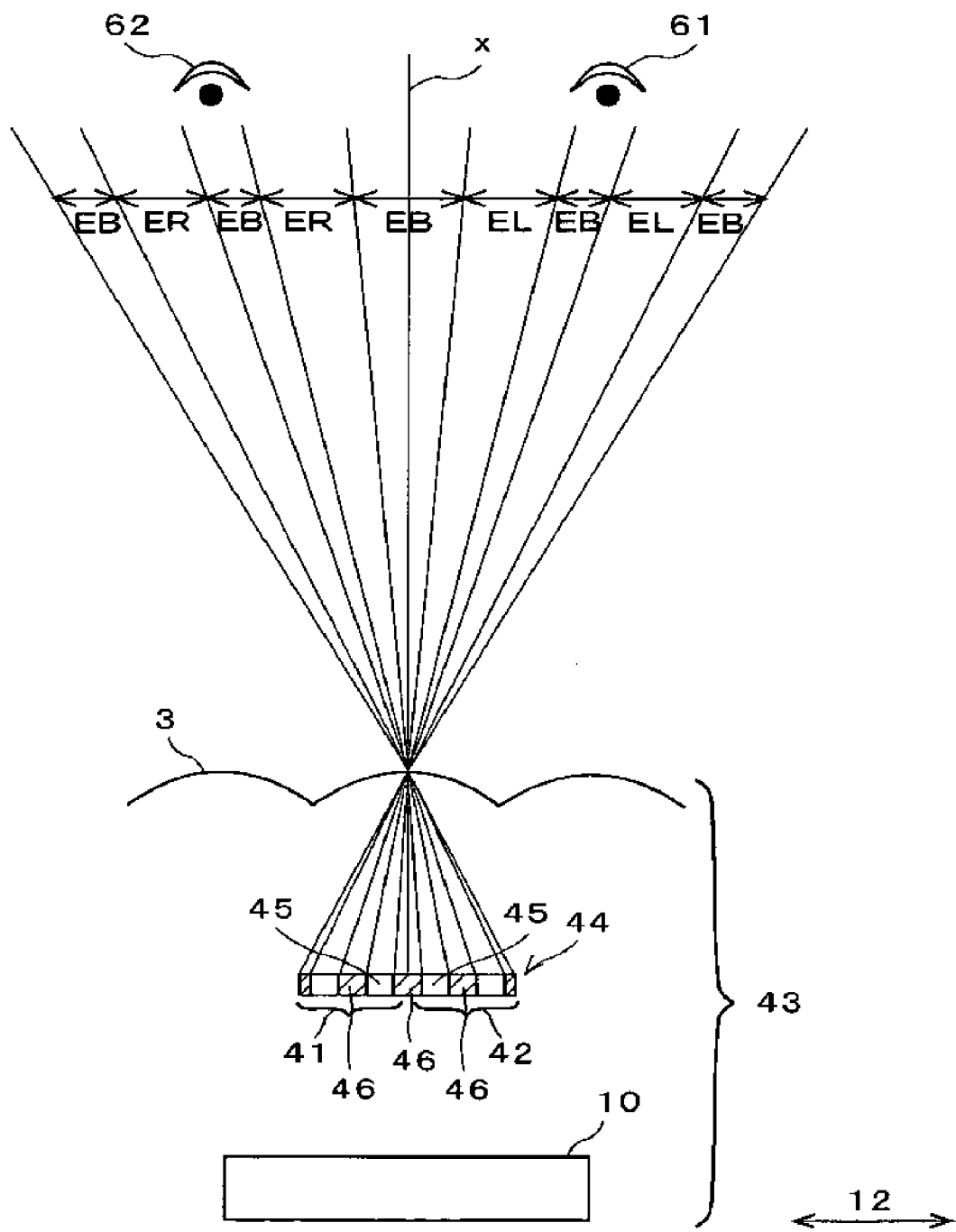
FIG. 28 is an optical model diagram of a section along a line F-F shown in FIG. 27.
Figure 29:
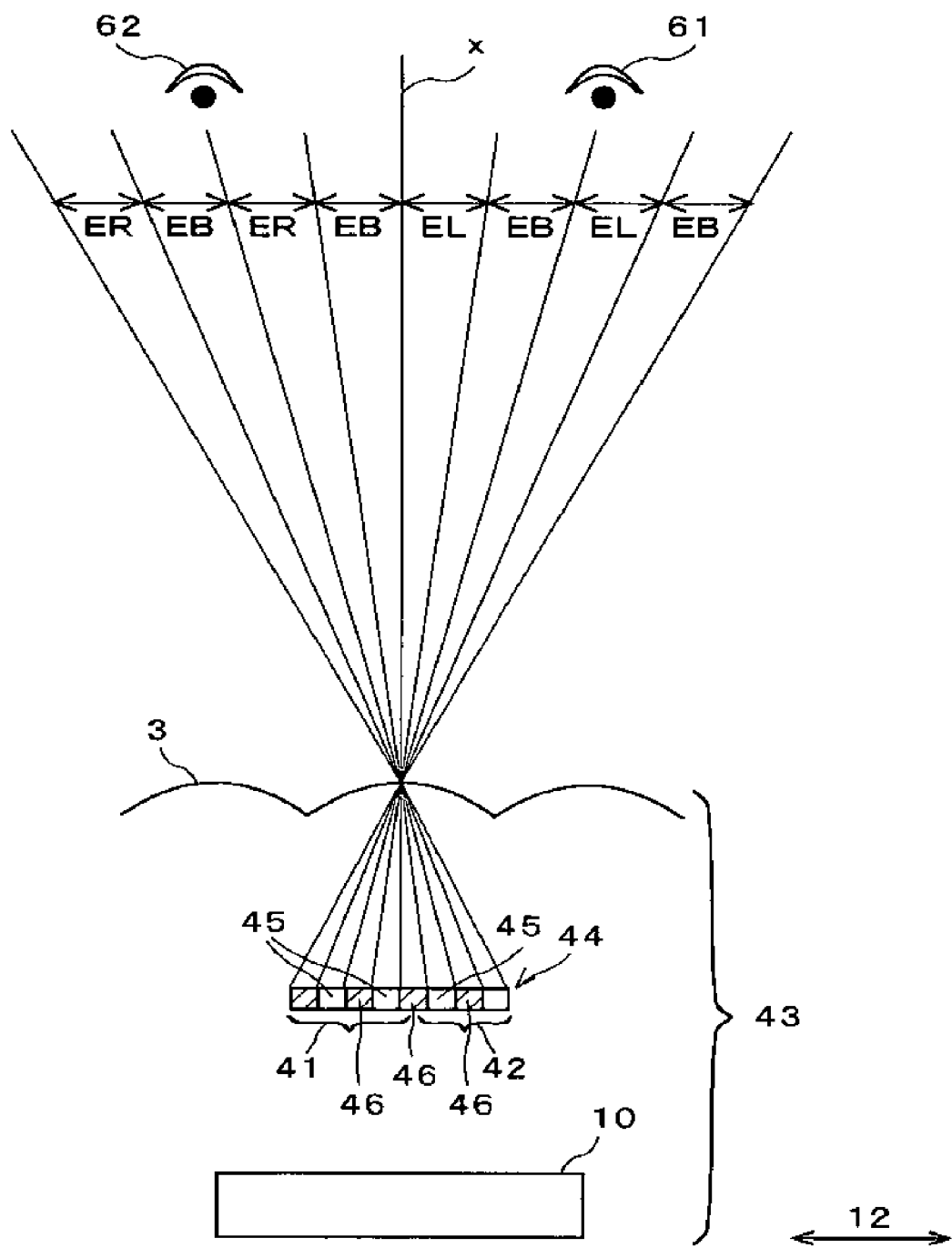
FIG. 29 is an optical model diagram of a section along a line G-G shown in FIG. 27.
Figure 30:
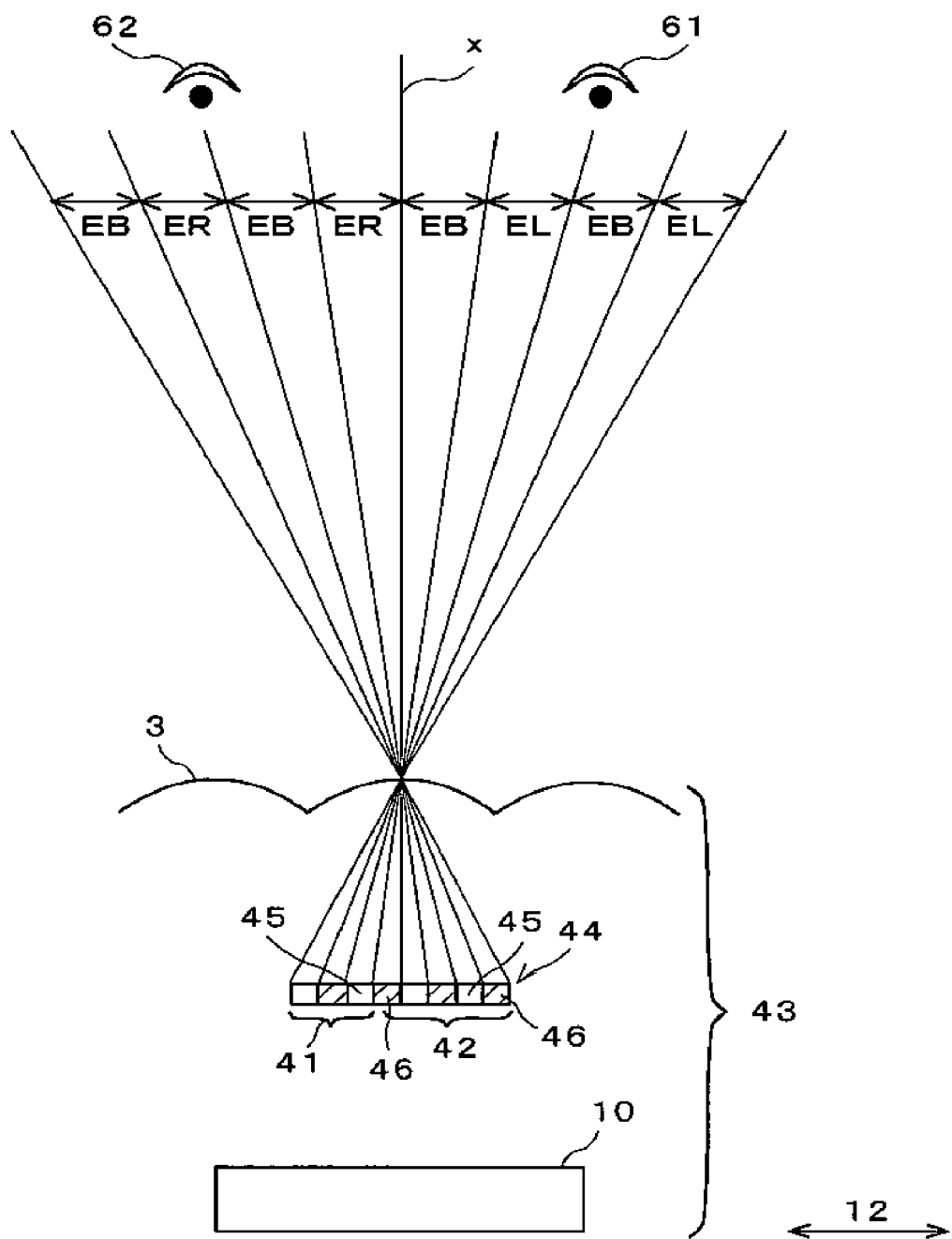
FIG. 30 is an optical model diagram of a section along a line H-H shown in FIG. 27.

Next, description will be given of operations of the image display device 43 constructed as described above, namely, an image display method in the image display device 43. FIG. 28 is an optical model diagram of a section along a line F-F shown in FIG. 27. As shown in FIG. 28, in the section along the line F-F of a display panel 44, a shading portion 46 is provided at a center portion of each pixel. Therefore, non-display areas EB caused by the shading portion 46 occur at both sides and center of display areas EL and ER. In addition, FIG. 29 is an optical model diagram of a section along a line G-G shown in FIG. 27. As shown in FIG. 29, in the section along the line G-G, shading portions 46 are provided rightward in the pixels. Therefore, non-display areas EB occur at right sides of display areas EL and ER. Furthermore, FIG. 30 is an optical model diagram of a section along a line H-H shown in FIG. 27. As shown in FIG. 30, in the section along the line H-H, shading portions 46 are provided leftward in the pixels. Therefore, non-display areas EB occur at left sides of display areas EL and ER.

Figure 31:
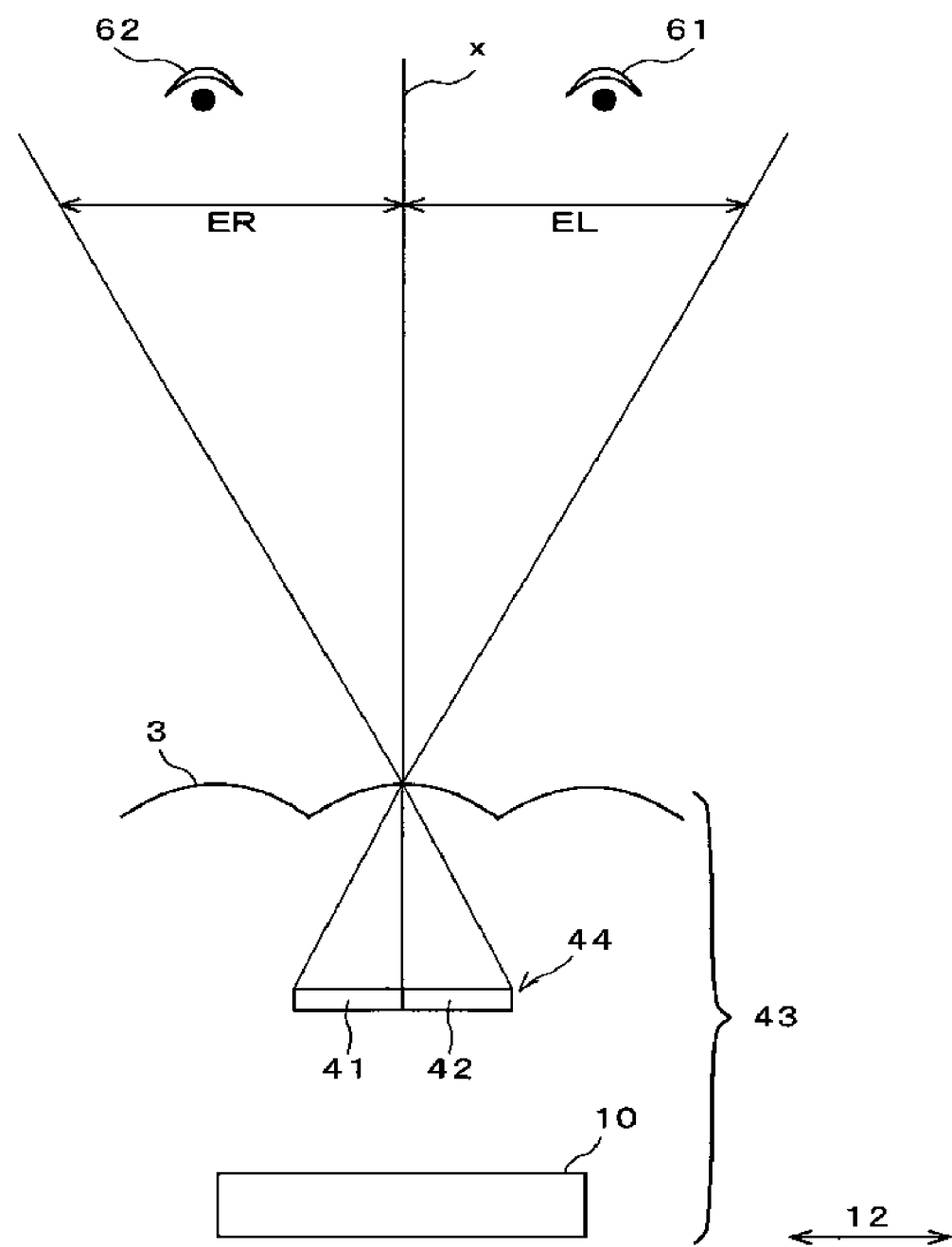
FIG. 31 is an optical model diagram showing operations of the image display device of the fifth embodiment of the present invention.

FIG. 31 is an optical model diagram showing operations of the image display device 43 of the present embodiment. In this image display device 43, similar to the aforementioned first embodiment, since a lenticular lens is used, the display areas EL and ER in the section along the line F-F (FIG. 28), section along the line G-G (FIG. 29), and section along the line H-H (FIG. 30) are synthesized and made into display areas EL and ER shown in FIG. 31. As a result, in the image display device 43 of the present embodiment, since the non-display areas ES are eliminated, deterioration in display quality caused by the shading portion 46 can be suppressed.

Figure 32:
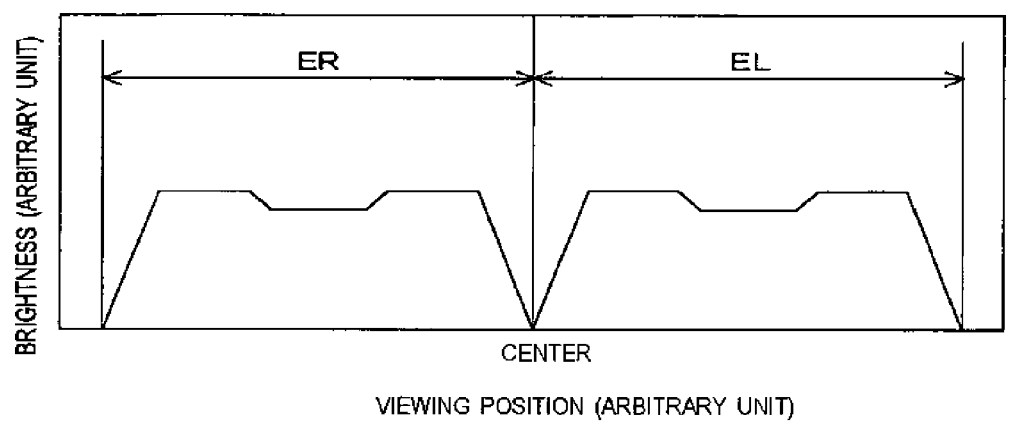
FIG. 32 is a graph showing distribution of brightness on a view plane of the image display device of the fifth embodiment of the present invention while taking a viewing position on the horizontal axis and brightness on the vertical axis.

FIG. 32 is a graph showing distribution of brightness on a view plane of the image display device of the fifth embodiment of the present invention while taking a viewing position on the horizontal axis and brightness on the vertical axis. As shown in FIG. 32, in such a case where, at a center portion of each pixel, provided is a shading portion 46 to divide the pixel in the horizontal direction 12 as in the image display device 43 of the present embodiment, as well, deterioration in display quality caused by the shading portion 46 can be suppressed.

Here, under the shading portion 46 to split pixels provided at the center portions of pixels, storage capacitance provided for each of the pixels and wiring to connect the storage capacitance can be arranged. In addition, aspects of the construction and operations other than the above of the image display device 43 of the present embodiment are the same as those of the image display device 1 of the aforementioned first embodiment. Furthermore, this display panel 44 can be applied to the image display devices of the aforementioned first through fourth embodiments.

Figure 33:
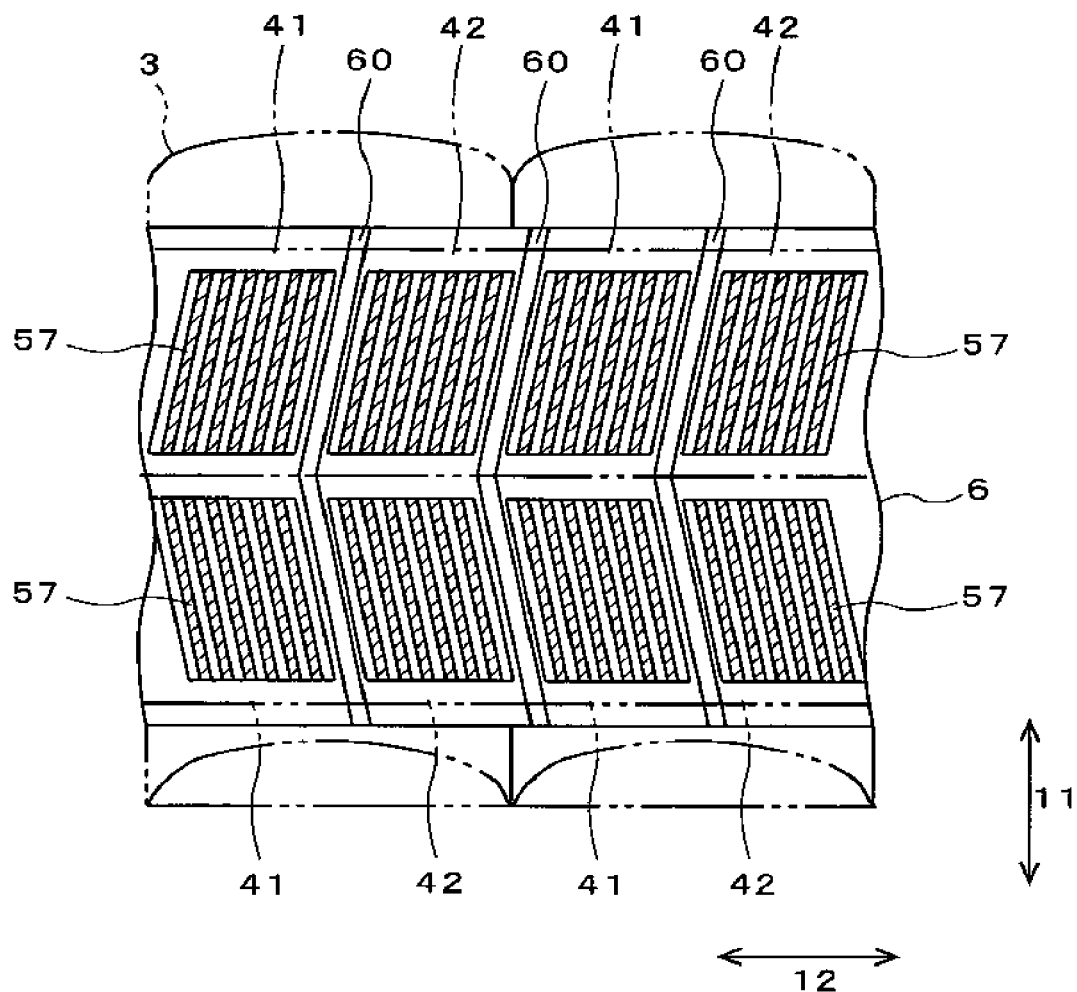
FIG. 33 is a plan view showing a display panel of an Image display device of a sixth embodiment of the present invention.

Next, description is given of an image display device according to a sixth embodiment of the present invention. FIG. 33 is a plan view showing a display panel of an image display device of the sixth embodiment of the present invention. As shown in FIG. 33, in the image display device of the present embodiment, the openings 5 in the display panel 2 of the image display device 1 of the aforementioned first embodiment shown in FIG. 17 are each divided by a plurality of mutually parallel comb electrodes 57. These comb electrodes 57 are formed parallel to sides of a shading portion 6 extending between openings adjacent in a horizontal direction 12, not parallel to a vertical direction 11, and with a predetermined angle with respect to the vertical direction 11. And, directions of pixels adjacent in the horizontal direction 12 in which the comb electrodes 57 extend are mutually parallel, and the comb electrodes 57 in pixels adjacent in the vertical direction 11 are symmetric with respect to sides of the shading portion 6 extending in the horizontal direction 12 as an axis. Here, in. FIG. 33, for the sake of improvement in visibility of the drawing, the comb electrodes 57 have been shown with hatching.

Figure 34:
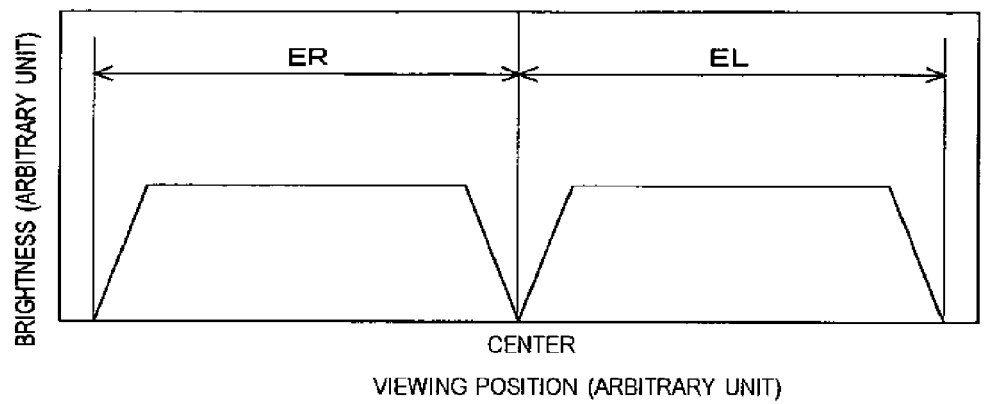
FIG. 34 is a graph showing distribution of brightness on a view plane of the image display device of the sixth embodiment of the present invention while taking a viewing position on the horizontal axis and brightness on the vertical axis.

FIG. 34 is a graph showing distribution of brightness on a view plane of the image display device of the sixth embodiment of the present invention while taking a viewing position on the horizontal axis and brightness on the vertical axis. As shown in FIG. 34, in such a case where the openings of respective pixels in the display panel have been divided in the horizontal direction 12 by the comb electrodes 57 as in the image display device of the present embodiment, as well, effects similar to those in the image display device 1 of the first embodiment can be obtained, thus deterioration in display quality caused by the comb electrodes 57 can be suppressed.

In the image display device of the present embodiment, since the comb electrodes 57 have been provided at openings of the respective pixels, electric fields can be generated in the horizontal direction 12 of the display panel, and this can be appropriately applied for driving a liquid crystal panel in an In-Plane Switching mode. In addition, the comb electrodes 57 of this image display device can be either non-transparent electrodes formed of a metallic material such as aluminum or transparent electrodes formed of ITO (indium tin oxide) or the like, and in either case, similar effects can be obtained. In a case where the comb electrodes 57 are provided at openings of the respective electrodes, even when these comb electrodes 57 are transparent electrodes, on the comb electrodes 57, areas where, since horizontal electric fields are not sufficiently applied, liquid crystals cannot be driven by horizontal electric fields and light is not sufficiently penetrated occur, however, as in the image display device of the present embodiment, by making directions in which the comb electrodes 57 extend are made mutually parallel in pixels adjacent in the horizontal direction 12 and making comb electrodes 57 in pixels adjacent in the vertical direction 11 symmetric with respect to sides of the shading portion 6 extending in the horizontal direction 12 as an axis, the non-display areas are eliminated, thus deterioration in display quality caused by the comb electrodes 57 can be suppressed.

As mentioned above, the image display device of the present embodiment is effective when the display panel is a liquid crystal display panel and this liquid crystal display panel is driven in a mode where, as in the above-described In-Plane Switching mode, areas which do not sufficiently penetrate light, namely, non-display areas occur at openings of the respective pixels. As liquid crystal driving modes where non-display areas occur as such, for example, a Fringe Field Switching mode and an Advanced Fringe Field Switching mode, which are horizontal electric field modes similar to the In-Plane Switching mode, a Multi-Domain Vertical Alignment mode, a Patterned Vertical Alignment mode and an Advanced Super View mode, which are a multi-domained vertical orientation mode, and the like can be mentioned. With this multi-domained vertical orientation mode, areas that do not penetrate light occur at boundary between the domains. Here, aspects of the construction and operations of the image display device of the present embodiment other than the above are the same as those of the image display device of the aforementioned fifth embodiment.

Figure 35:
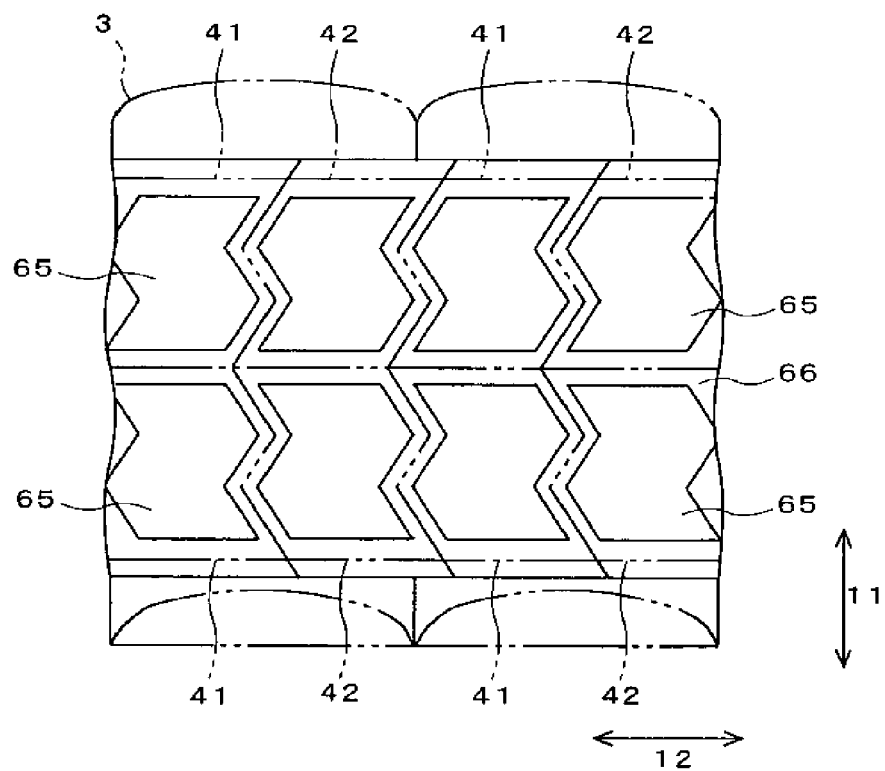
FIG. 35 is a plan view showing a display panel of an image display device of a seventh embodiment of the present invention.

Next, description is given of an image display device according to a seventh embodiment of the present invention. FIG. 35 is a plan view showing a display panel of an image display device of the seventh embodiment of the present invention. As shown in FIG. 35, in the image display device of the present embodiment, sides of openings 65 which intersect with straight lines extending in a horizontal direction 12 are bent multiple times.

In the image display device of the present embodiment, since the sides of the openings 65 which intersect with straight lines extending in the horizontal direction 12 are bent multiple times, angles of these sides become less conspicuous than in the image display device of the aforementioned first embodiment, thus display quality can further be improved. Such shapes of the openings 65 are particularly effective when the pixel pitch is great. Here, aspects of the construction and operations of the image display device of the present embodiment other than the above are the same as those of the image display device 1 of the aforementioned first embodiment. Moreover, this display panel can also be applied to the image display devices of the aforementioned first through sixth embodiments.

Figure 36:
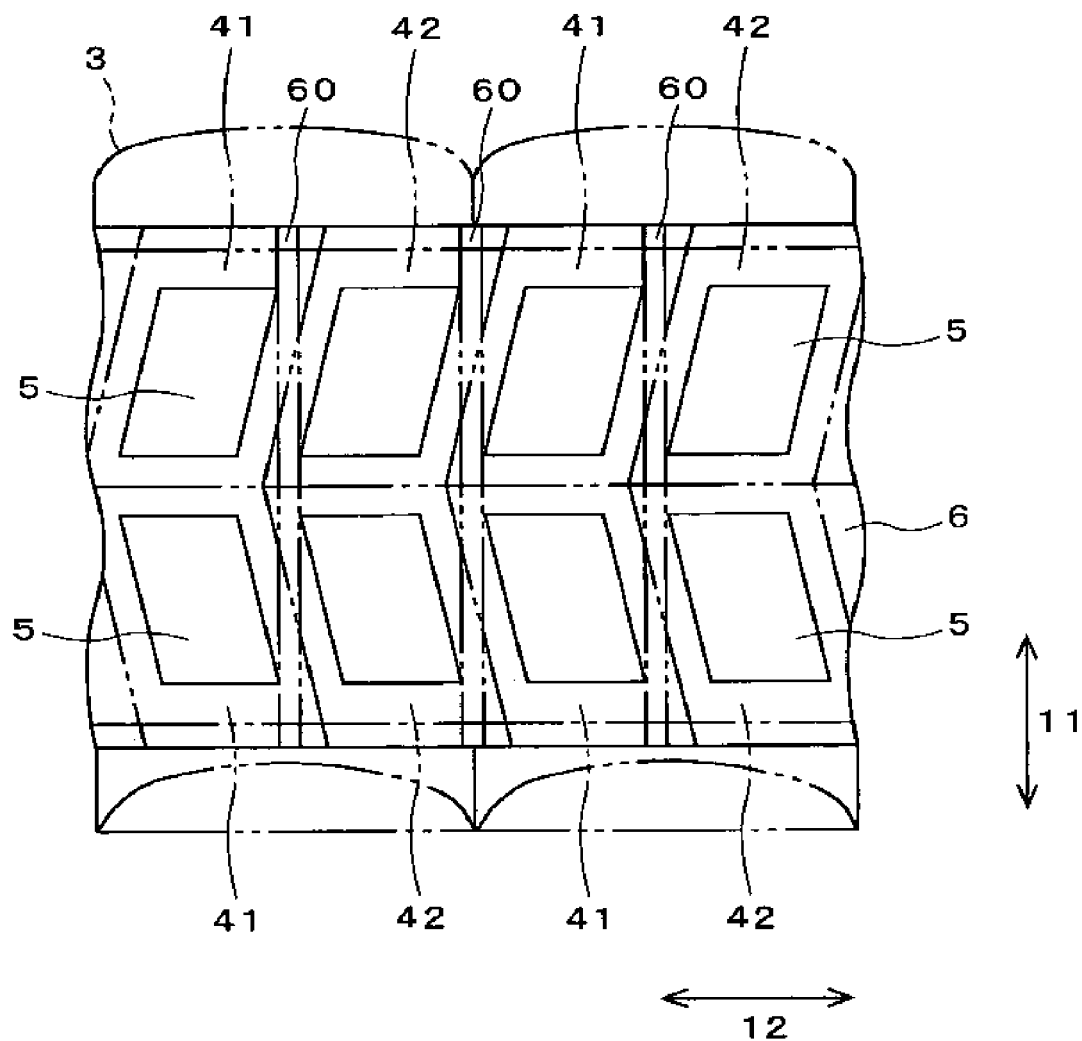
FIG. 36 is a plan view showing a display panel of an image display device of an eighth embodiment of the present invention.

Next, description is given of an image display device according to an eighth embodiment of the present invention. FIG. 36 is a plan view showing a display panel of an image display device of the eighth embodiment of the present invention. As shown in FIG. 36, the image display device of the present embodiment is the same as the image display device 1 of the aforementioned first embodiment except for that wiring 60 is provided to extend in a direction parallel to a vertical direction 11.

In the image display device of the present embodiment, although non-display areas caused by the wiring 60 occur, since sides of openings 5 which are mutually opposed in a horizontal direction 12 have been made not parallel to the vertical direction 11 and the openings of each pixel in the vertical direction 11 have been varied, deterioration in display quality caused by sharing portions 6 can be suppressed than in a conventional image display device. On the other hand, since the wiring 60 is made parallel to the vertical direction 11, in comparison with the image display device 1 of the aforementioned first embodiment, the wiring 60 length can be shortened, and a wiring time constant caused by wiring resistance and capacity can be lowered. This is advantageous in driving the display panel. Here, aspects of the construction and operations of the image display device of the present embodiment other than the above are the same as those of the image display device 1 of the aforementioned first embodiment. In addition, this display panel can also be applied to the image display devices of the aforementioned first through seventh embodiment.

Figure 1:
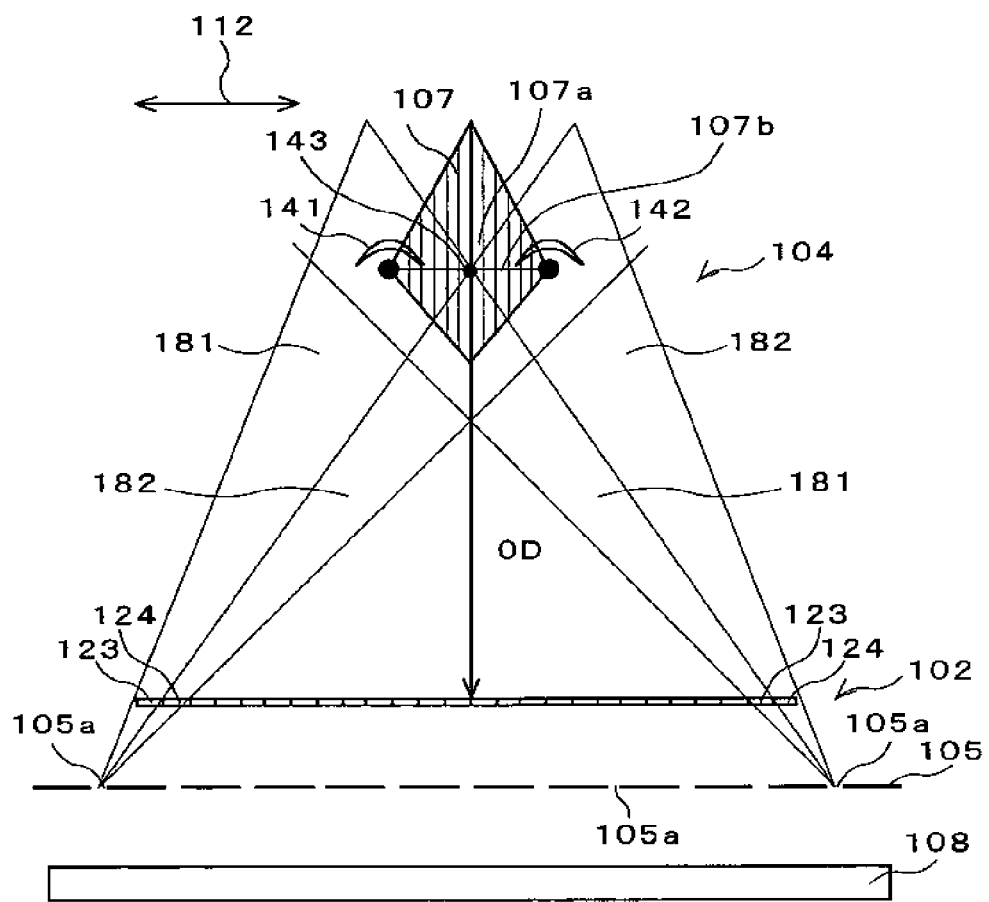
FIG. 1 is an optical model diagram showing a method that displays three-dimensional image by a parallax barrier system.
Figure 2:
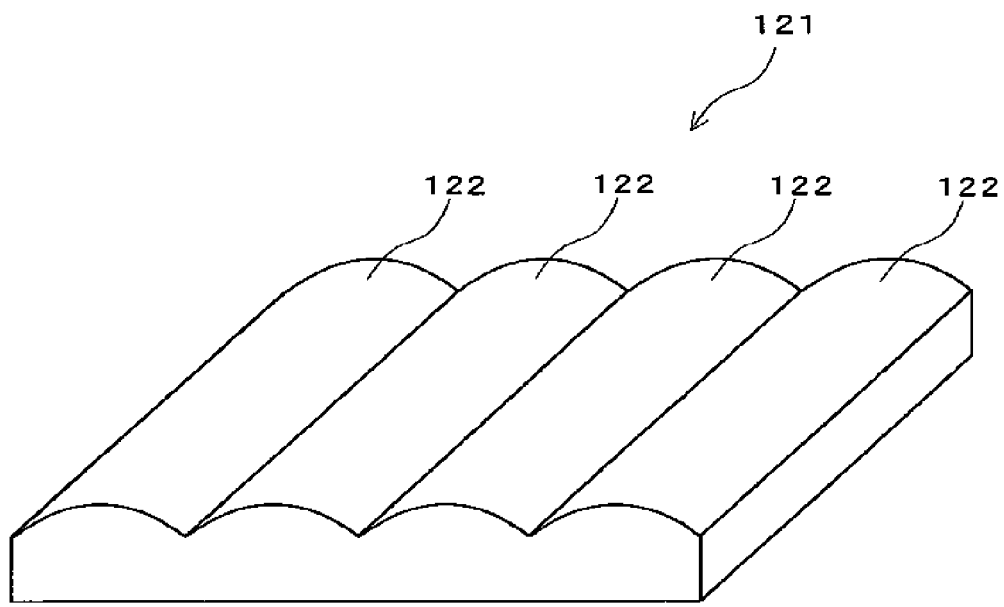
FIG. 2 is a perspective view showing a lenticular lens.
Figure 3:
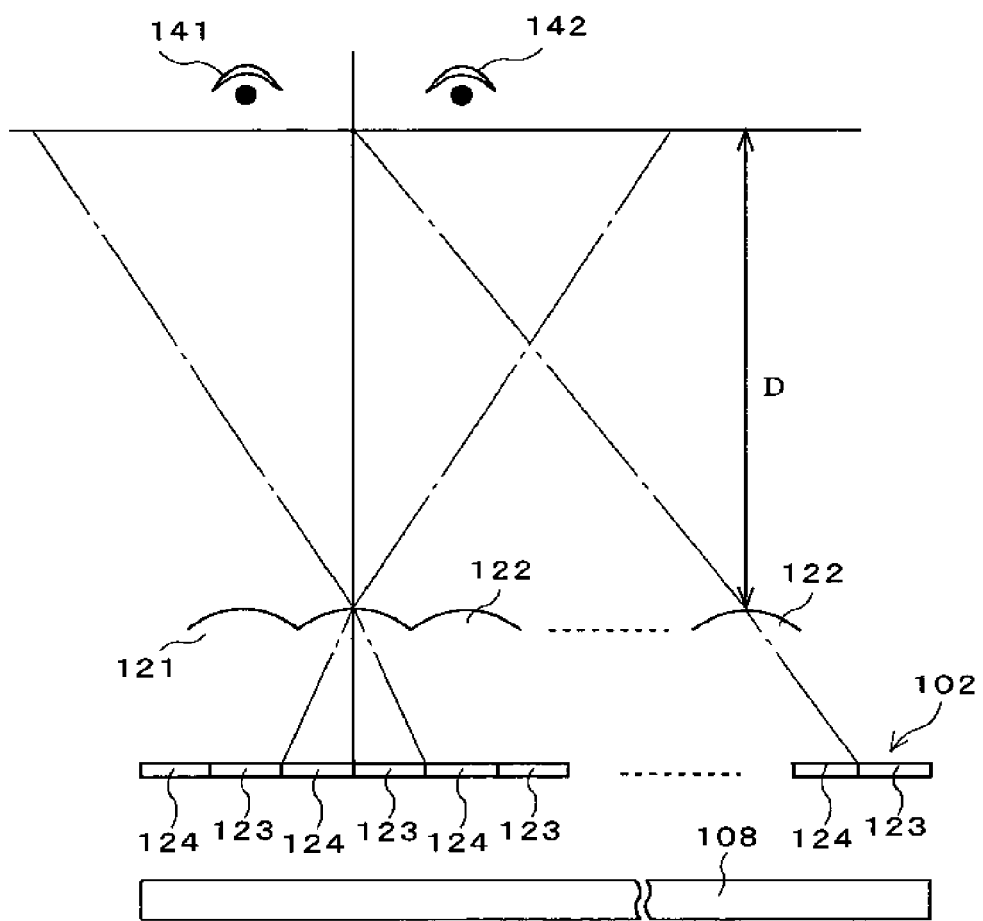
FIG. 3 is an optical model diagram showing a method that displays three-dimensional image by a lenticular lens system.
Figure 4:
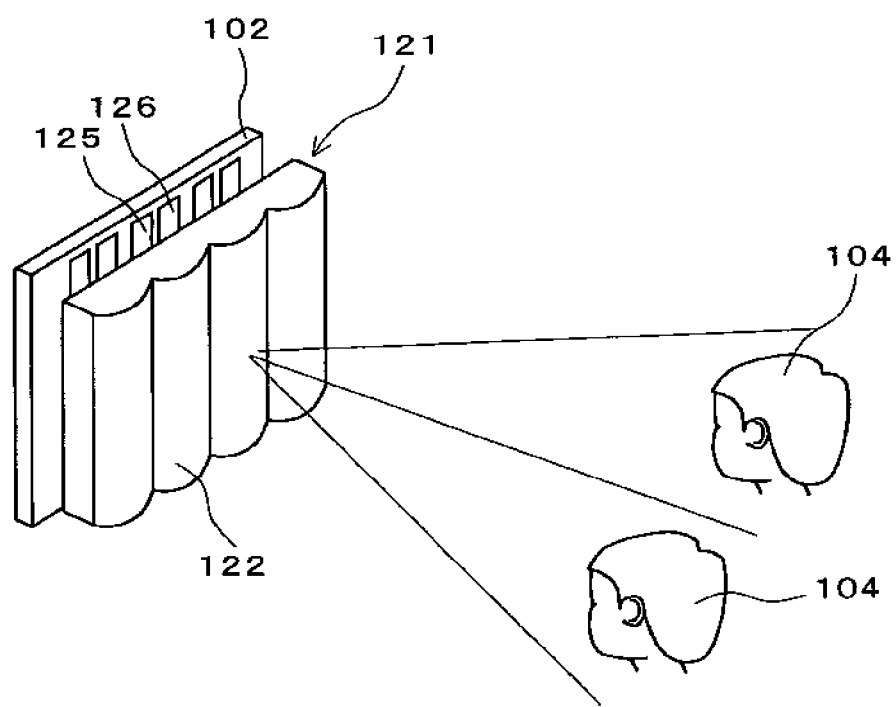
FIG. 4 is a perspective view showing a display for simultaneously displaying multiple images as set forth in Japanese Published Unexamined Patent Application No. 332354/1994.
Figure 5:
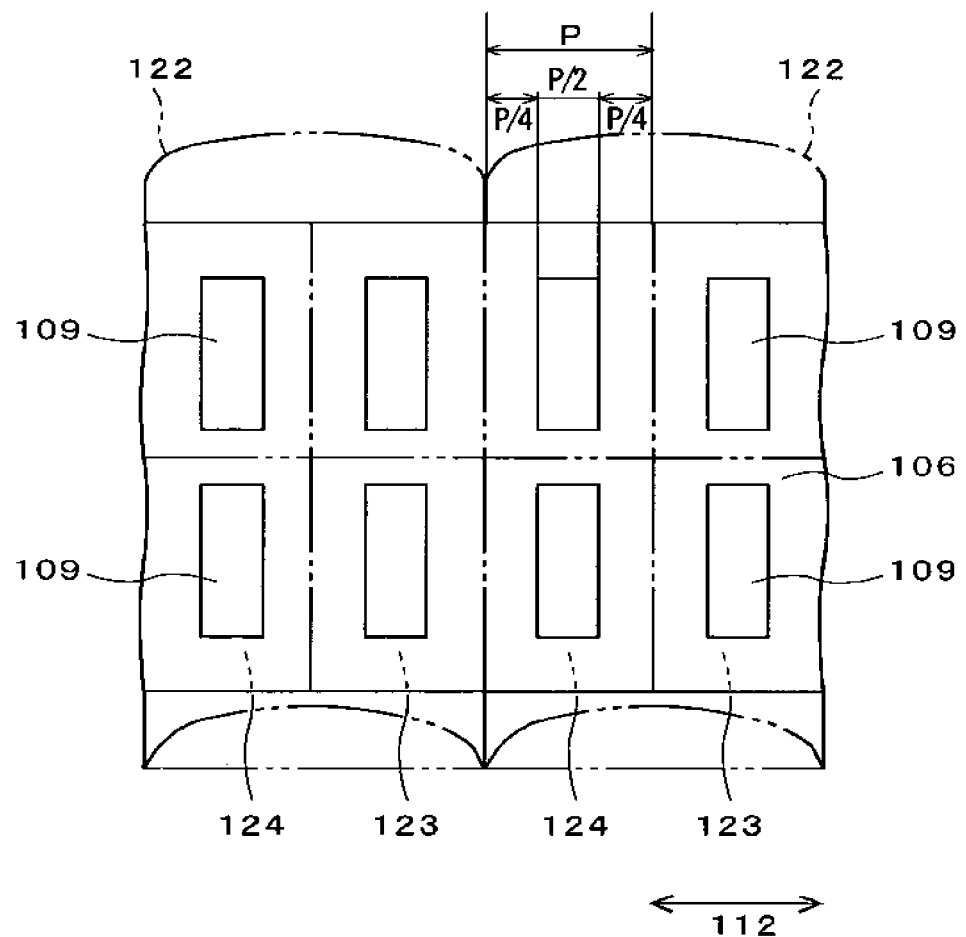
FIG. 5 is a plan view showing a conventional display panel whose pixel opening ratio in a lens array direction is 50%.
Figure 6:
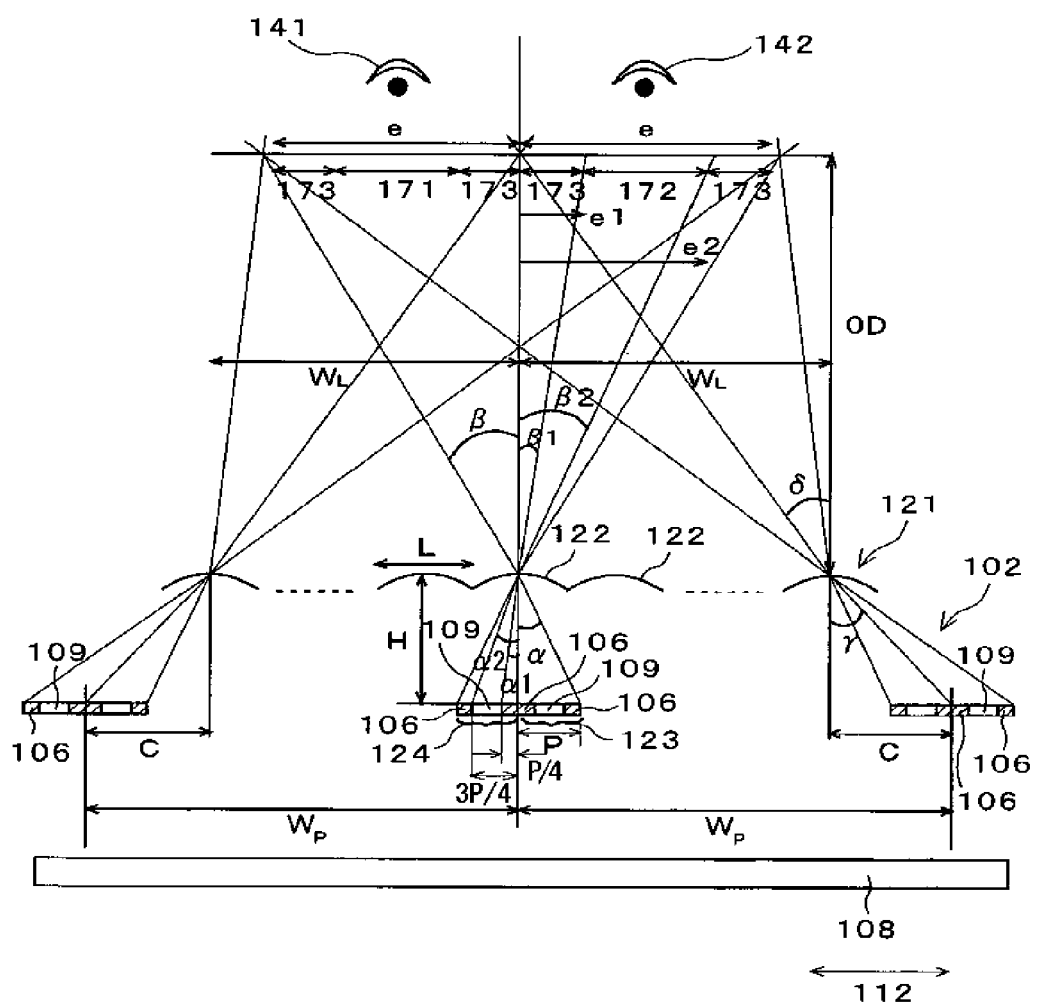
FIG. 6 is an optical model diagram of a three-dimensional image display device by a lenticular lens system using the display panel shown in FIG. 5.
Figure 7:
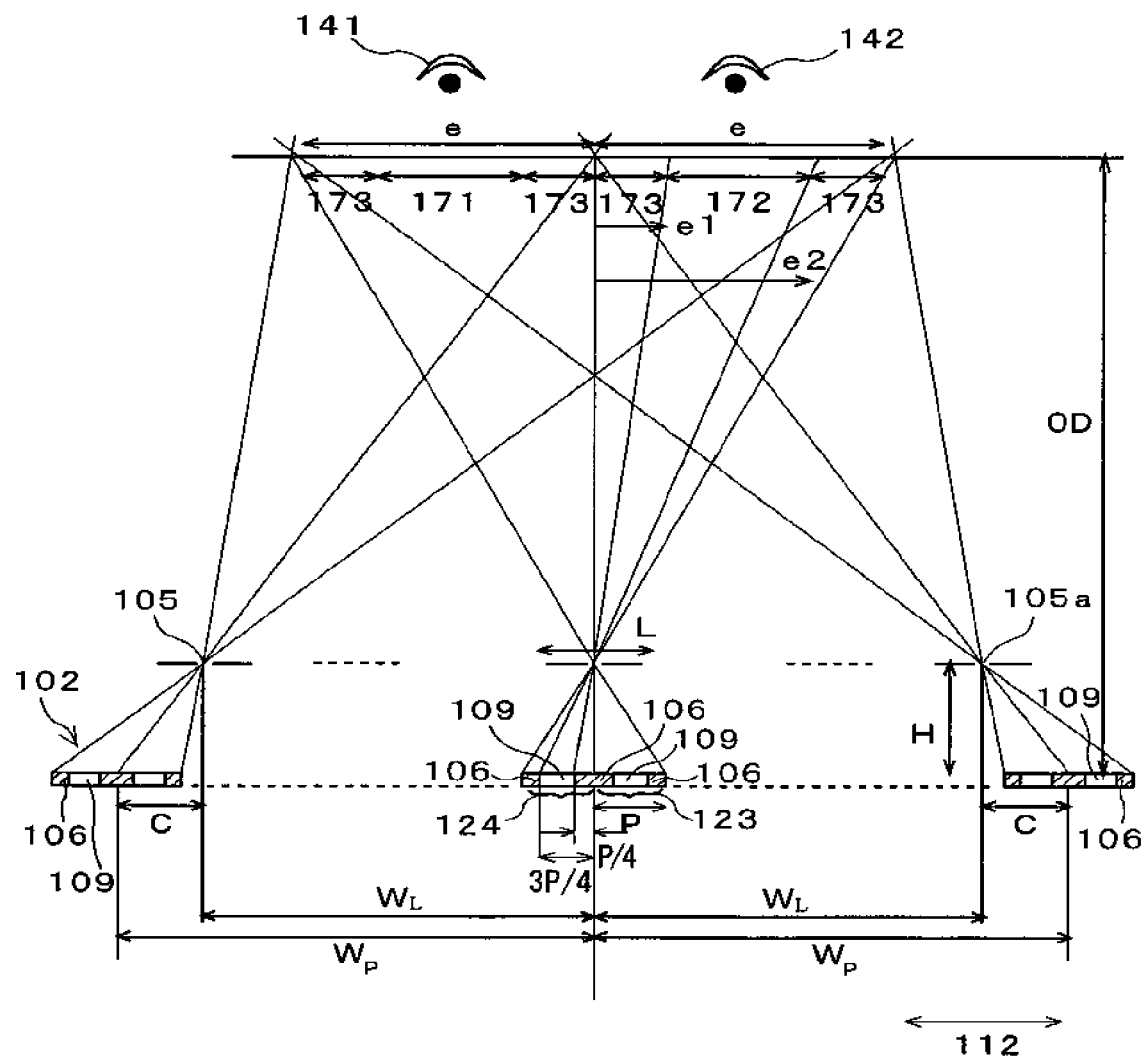
FIG. 7 is an optical model diagram showing a three-dimensional image display device by a conventional parallax barrier system wherein a parallax barrier has been provided at a viewer's side.
Figure 8:
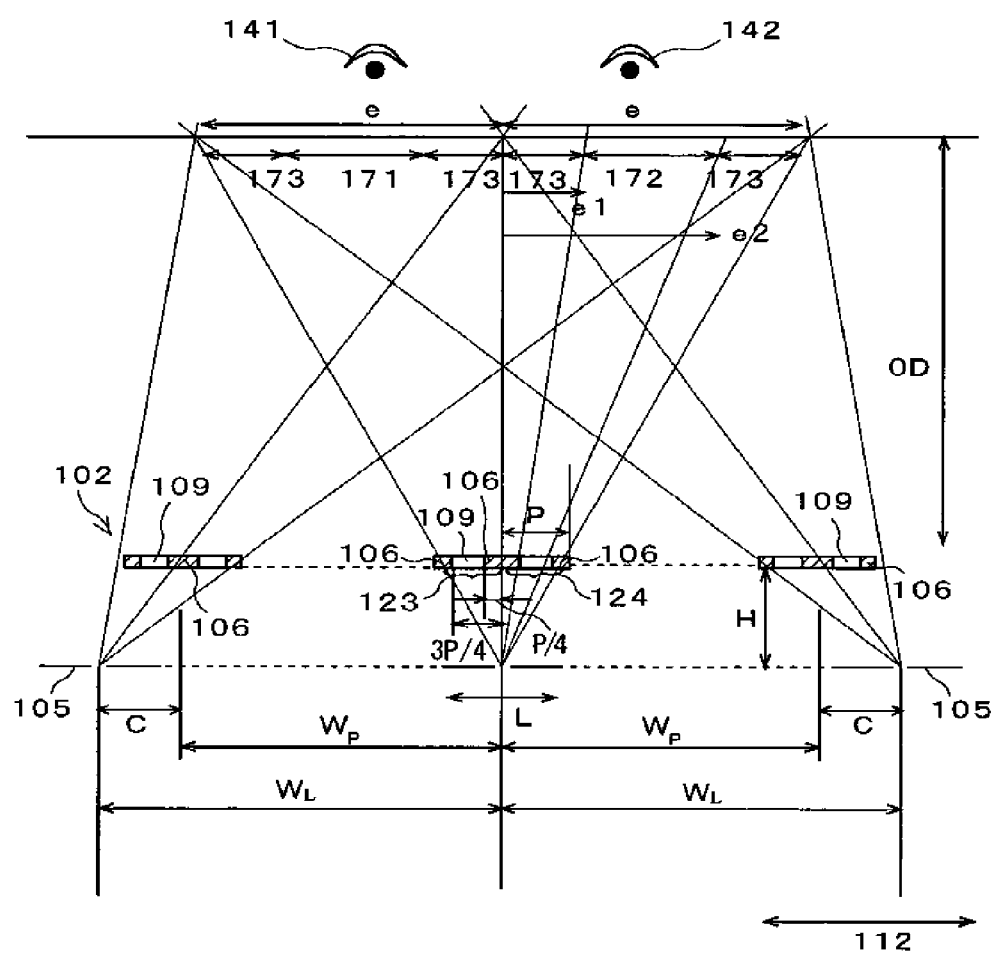
FIG. 8 is an optical model diagram showing a three-dimensional image display device by a conventional parallax barrier system wherein a parallax barrier has been provided in the rear of a display panel.
Figure 37:
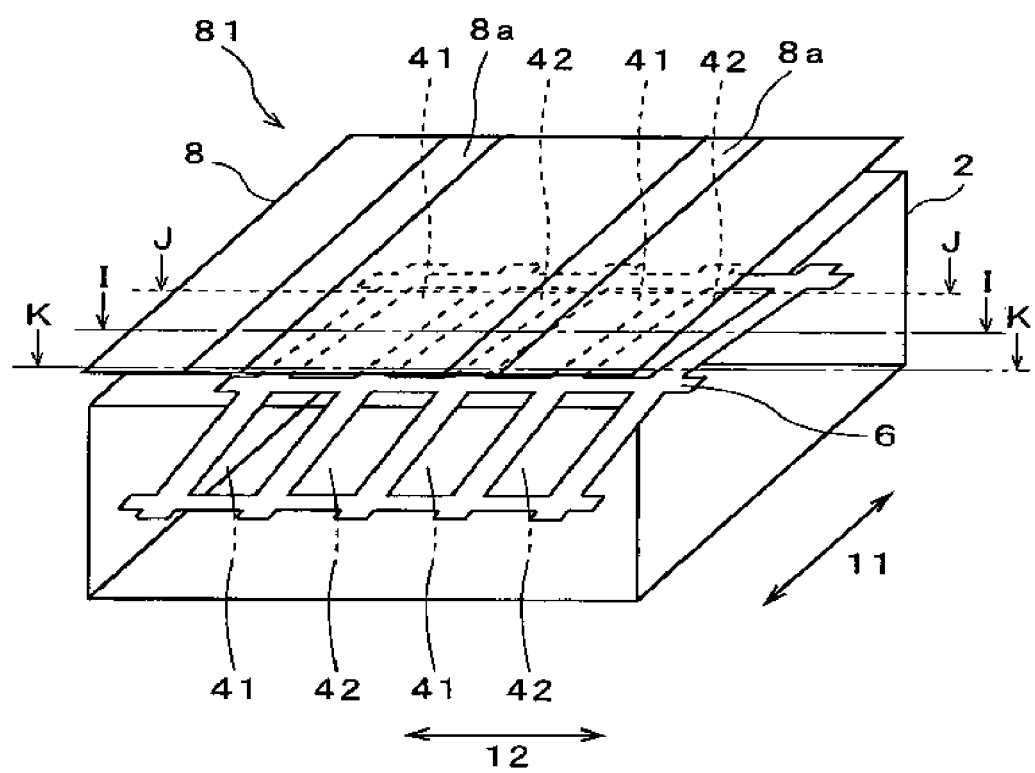
FIG. 37 is a plan view showing a display panel of an image display device of a ninth embodiment of the present invention.

Next, description is given of an image display device according to a ninth embodiment of the present invention. FIG. 37 is a plan view showing a display panel of an image display device of the ninth embodiment of the present invention. As shown in FIG. 37, for an image display device 81 of the present embodiment, a parallax barrier 8 is provided in place of a lenticular lens. Here, the shape of the respective pixels are the same as that of the image display device of the first embodiment shown in FIG. 2, and in the present embodiment, aspects of the construction other than the above are the same as those of the image display device 1 of the aforementioned first embodiment.

Figure 38:
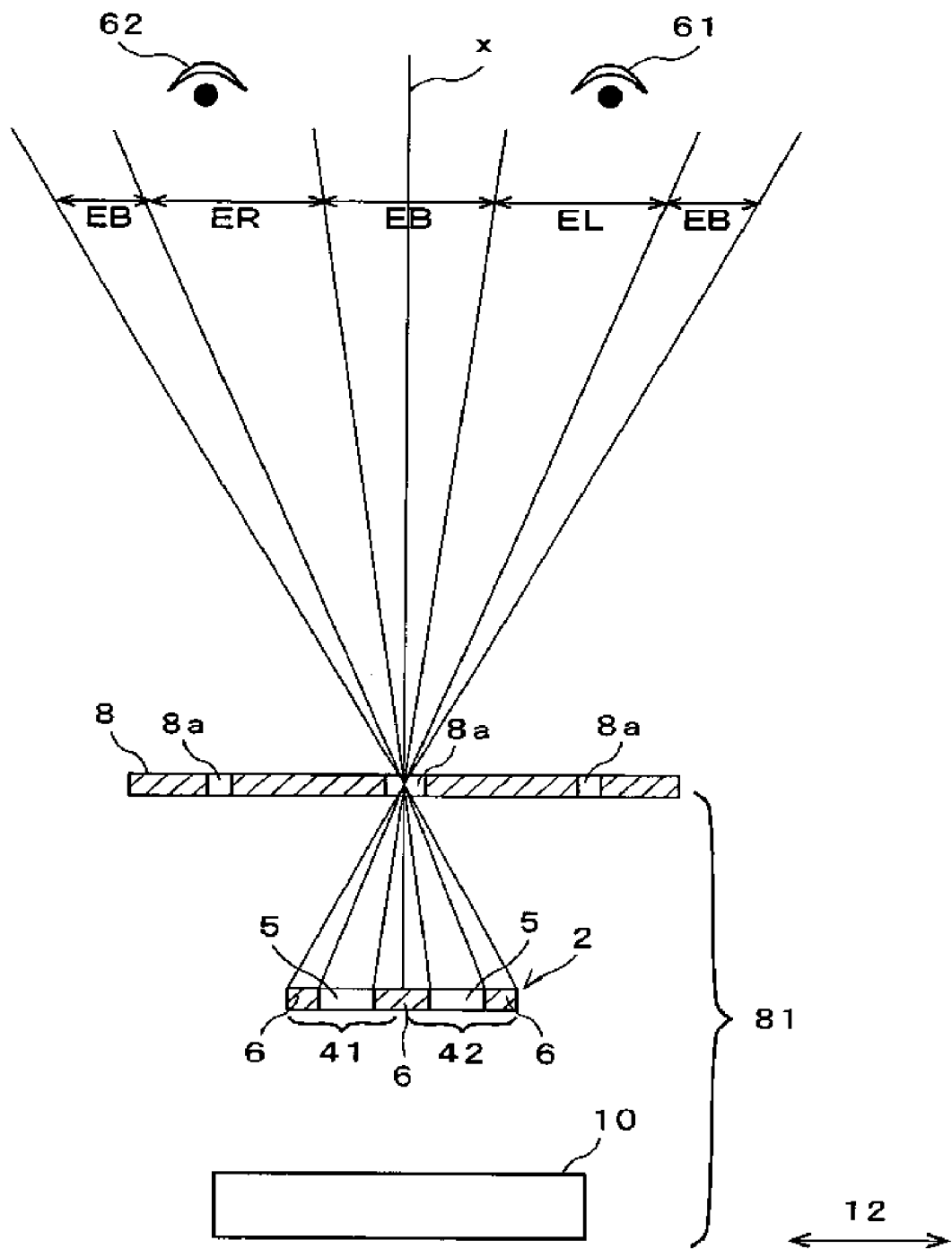
FIG. 38 is an optical model diagram of a section along a line I-I shown in FIG. 37.

Next, description will be given of operations of the image display device of the present embodiment constructed as described above. FIG. 38 is an optical model diagram of a section along a line I-I shown in FIG. 37. As shown in FIG. 38, in the image display device 81 of the present embodiment, when a light source 10 is lit, light emitted from the light source 10 is made incident into a display panel 2. In addition, on the other hand, the display panel 2 is driven by a control device (unillustrated), and a first viewpoint image and a second viewpoint image are displayed, respectively, on a first viewpoint pixel 41 and a second viewpoint pixel 42 of each display pixel. And, lights made incident into the first viewpoint pixel 41 and second viewpoint pixel 42 of the display panel 2 penetrate through the openings 5 of these pixels, and after penetrating through these pixels, proceeds to the parallax barrier 8. Furthermore, these lights penetrate through slits 8a of the parallax barrier 8, and are emitted toward areas EL and ER, respectively. At this time, by a viewer positioning his/her left eye 61 at the area EL and positioning his/her right eye 62 at the area ER, the first viewpoint image is inputted into the left eye 61, and also the second viewpoint image is inputted into the right eye 62. For example, when the first viewpoint image and second viewpoint image are parallax images to compose a three-dimensional image, the first image is an image for the left eye 61, and the second image is an image for the right eye 62, the viewer can recognize a three-dimensional image. However, on both sides of the display areas EL and ER, non-display areas EB caused by a shading portion 6 occur.

Figure 39:
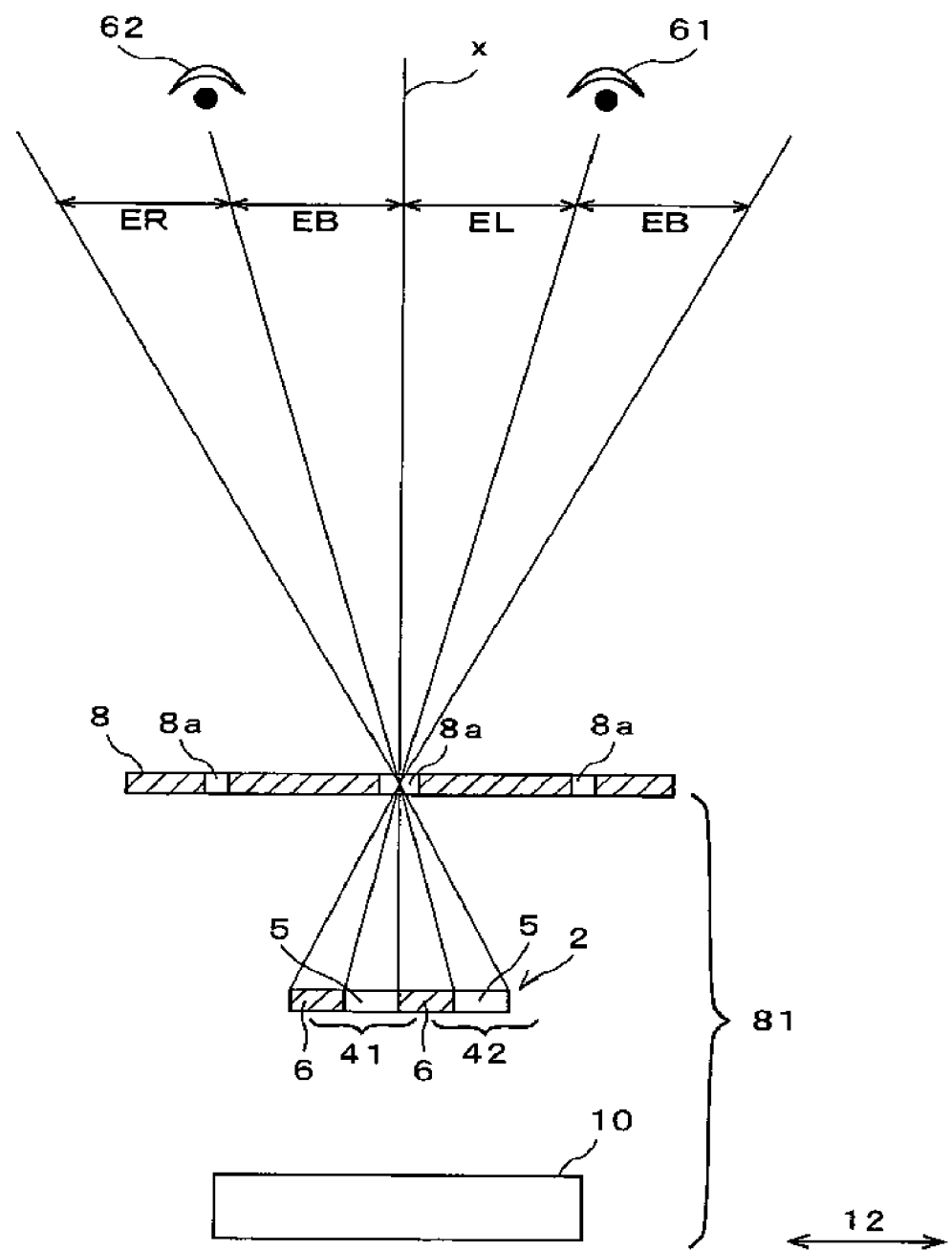
FIG. 39 is an optical model diagram of a section along a line J-J shown in FIG. 37.

In addition, FIG. 39 is an optical model diagram of a section along a line J-J shown in FIG. 37. As shown in FIG. 39, in the section along the line J-J, positions of openings 5 of the first viewpoint pixel 41 and second viewpoint pixel 42 are provided at a more right side in the drawing than in the section along the line I-I shown in FIG. 38. Therefore, in the section along the line J-J, non-display areas EB are one-sided to a right side in the drawing with respect to a centerline x of a view plane. Here, operations other than the above are the same as those with the section along the line I-I as described above.

Figure 40:
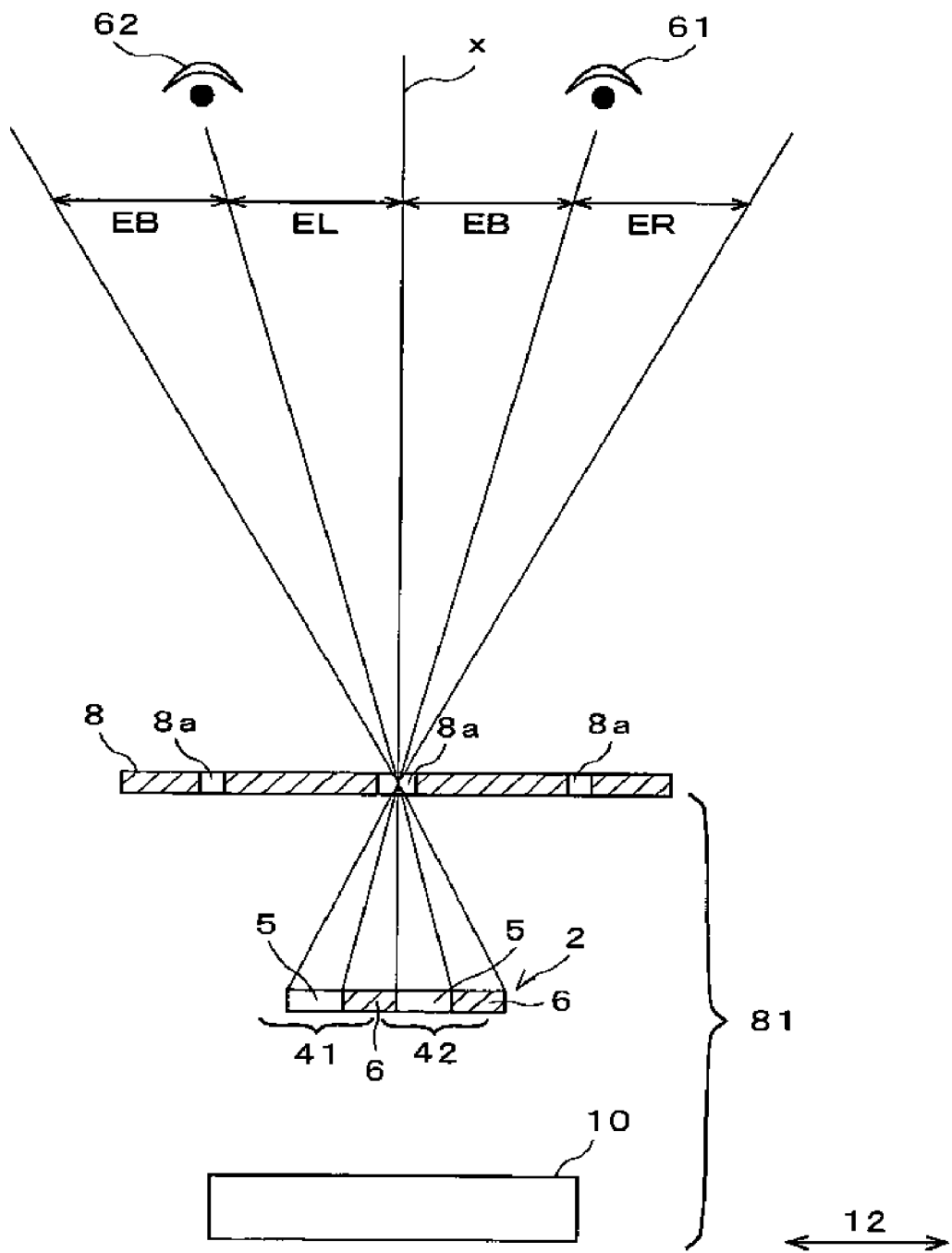
FIG. 40 is an optical model diagram of a section along a line K-K shown in FIG. 37.

Furthermore, FIG. 40 is an optical model diagram of a section along a line K-K shown in FIG. 37. As shown in FIG. 40, in a section along the line K-K, positions of openings 5 of the first viewpoint pixel 41 and second viewpoint pixel 42 are provided at a more left side in the drawing than in the section along the line I-I shown in FIG. 38. Therefore, in the section along the line K-K, non-display areas EB are one-sided to a left side in the drawing with respect to a centerline x of a view plane. Here, operations other than the above are the same as those with the section along the line I-I as described above.

Figure 41:
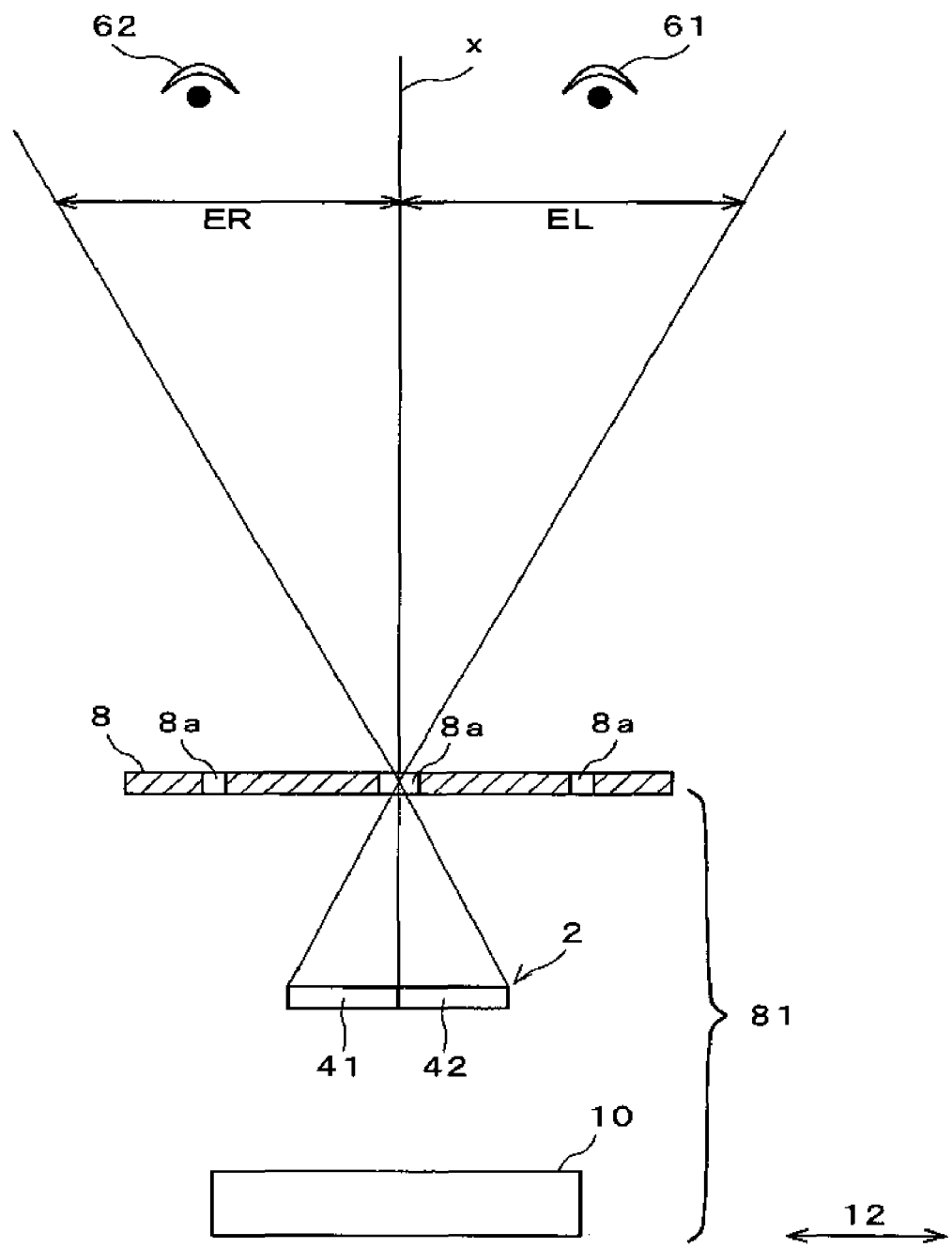
FIG. 41 is an optical model diagram showing operations of the image display device of the ninth embodiment of the present invention.

FIG. 41 is an optical model diagram showing operations of the image display device of the ninth embodiment of the present invention. In the image display device of the present embodiment, opening of the slits 8a of the parallax barrier 8 are one-dimensionally successive and have no shading effect in a vertical direction, which is a successive direction thereof. Therefore, in actuality, the display areas EL and ER in the section along the line I-I (FIG. 38), section along the line J-J (FIG. 39), and section along the line K-K (FIG. 40) are synthesized and made into display areas EL and ER shown in FIG. 41. As a result, in the image display device of the present embodiment, since the non-display areas EH are eliminated, deterioration in display quality caused by the shading portion 6 can be suppressed.

In the image display device of the present embodiment, by use of the parallax barrier, provided is an advantage in that deterioration in quality of a display image owing to a lens pattern does not occur in comparison with the case where a lenticular lens is used. Effects of the image display device of the present embodiment other than the above are the same as those of the image display device 1 of the aforementioned first embodiment. Here, in the image display devices of the aforementioned second through eighth embodiments, as well, a parallax barrier can be used in place of a lenticular lens.

Figure 42:
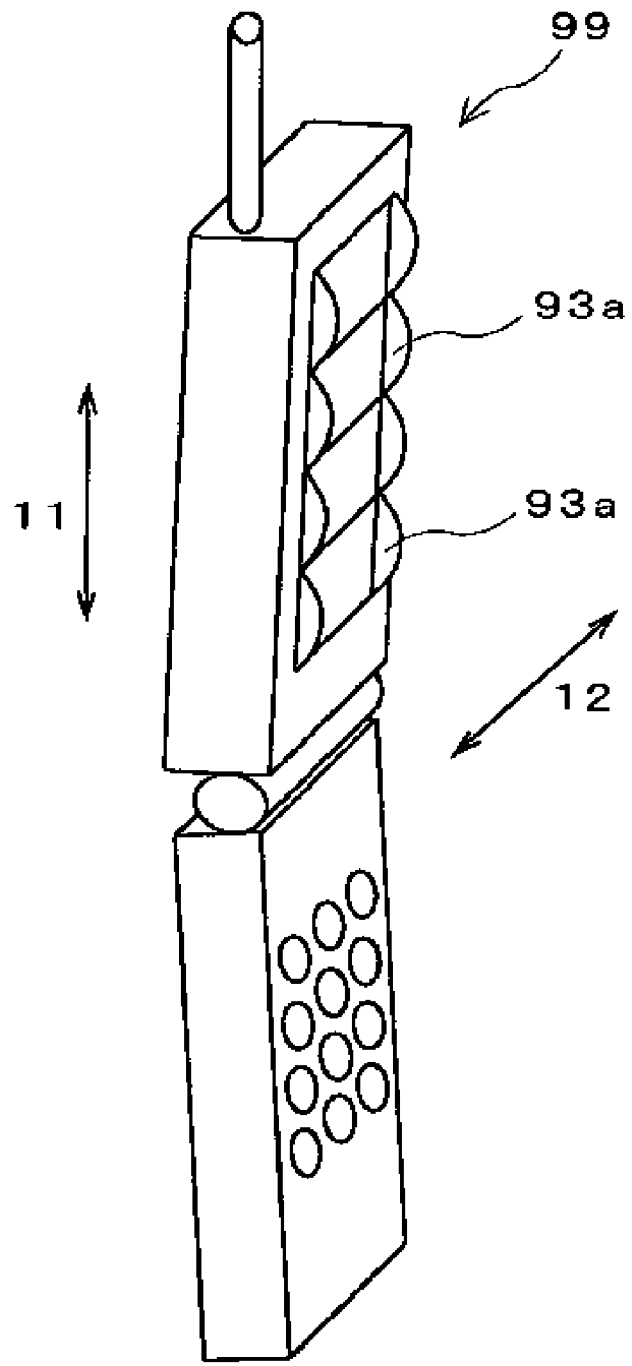
FIG. 42 is a perspective view showing a portable terminal of a tenth embodiment of the present invention.

Next, description is given of a portable terminal device according to a tenth embodiment of the present invention. FIG. 42 is a perspective view showing a portable terminal of the present embodiment. As shown in FIG. 42, for a portable terminal device 99 of the present embodiment, cylindrical lenses 93a to compose a lenticular lens of an image display device 91 have been arrayed in a vertical direction 11. Namely, the longitudinal direction of the cylindrical lenses 93a is a horizontal direction 12. Here, in the image display device of the portable terminal device 99 of the present embodiment, aspects of the construction other than the above are the same as those of the image display device of the aforementioned first embodiment.

Figure 43:
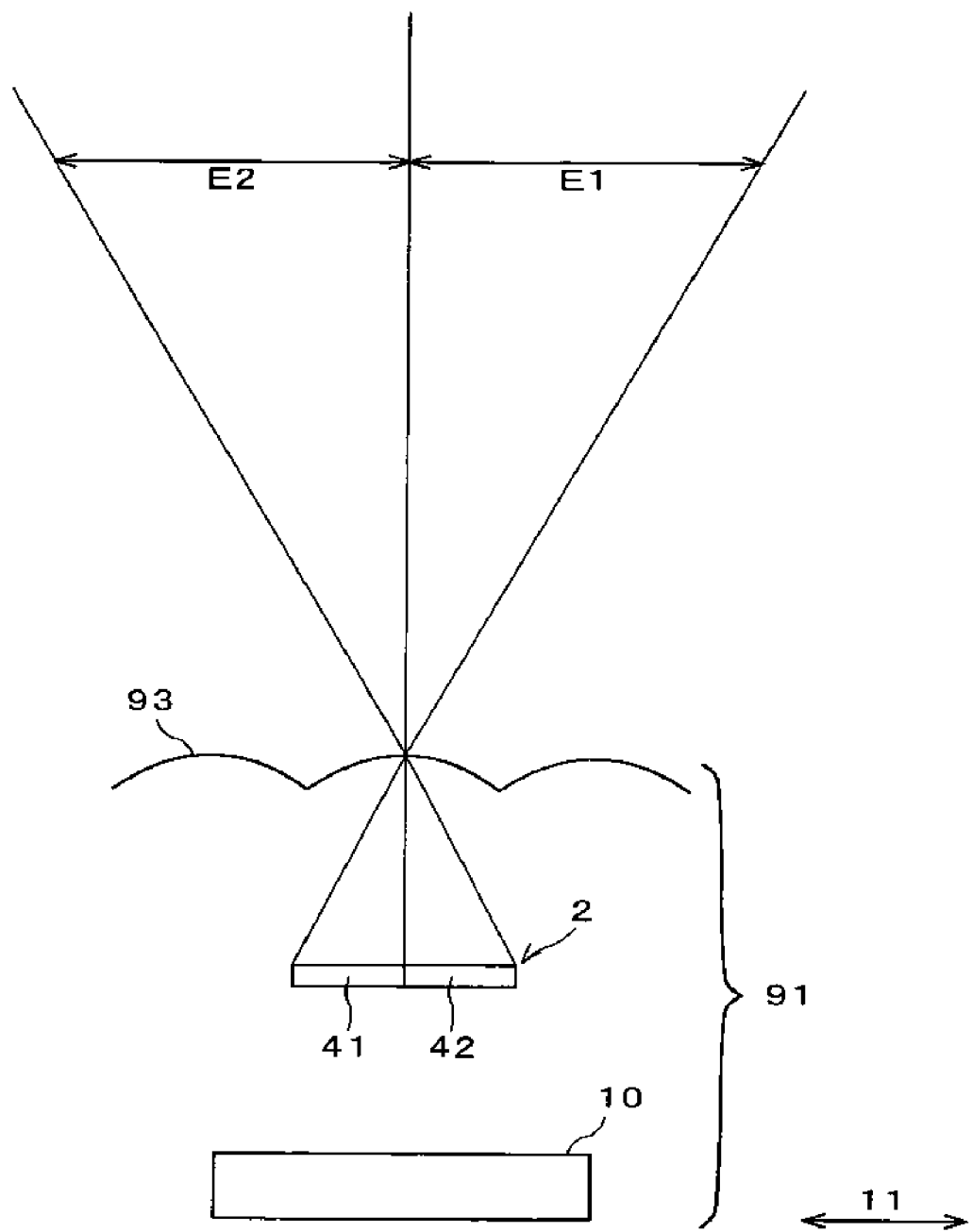
FIG. 43 is an optical model diagram showing operations of the image display device of the tenth embodiment of the present invention.

Next, description is given of operations of the image display device 91 of the portable terminal device 99 according to the present embodiment. FIG. 43 is an optical model diagram showing operations of this image display device. As shown in FIG. 43, in the image display device 91 of the portable terminal device 99 of the present embodiment, when a light source 10 is lit, light emitted from the light source 10 is made incident into a display panel 2. At this time, the display panel 2 is driven by a control device (unillustrated), whereby a first viewpoint image and a second viewpoint image are displayed, respectively, on a first viewpoint pixel 41 and a second viewpoint pixel 42 of each display pixel. And, lights made incident into the first viewpoint pixel 41 and second viewpoint pixel 42 of the display panel 2 penetrate through these pixels, are refracted by the cylindrical lenses 3a of the lenticular lens 3, and are emitted toward areas E1 and E2, respectively. At this time, when a viewer positions both his/her eyes at the area E1, he/she can observe the first viewpoint image, and when he/she positions both his/her eyes at the area E2, he/she can view the second viewpoint image.

In the portable terminal device 99 of the present embodiment, since the cylindrical lenses 93a to compose the lenticular lens 93 of the image display device 91 have been arrayed in the vertical direction 11, a viewer can view the first viewpoint image or second viewpoint image by only changing angles of the portable terminal device 99. In particular, when a first viewpoint image and a second viewpoint image have a relationship to each other, since the respective images can be compared by a simple operation of changing viewing angles, convenience is greatly improved. For example, when images for a plurality of viewpoints are arrayed in the horizontal direction 12, since positions to view images at different viewpoints occur for the right eye and left eye, there may be a case where the viewer is confused and fails to recognize images at the respective viewpoints. However, as in the portable telephone device 99 of the present embodiment, when images for a plurality of viewpoints are arrayed in the vertical direction 11, since the viewer can always view images for respective viewpoints with both eyes, images at the respective viewpoints can be recognized without confusion. Here, effects of the portable terminal device 99 of the present embodiment other than the above are the same as those of the aforementioned first embodiment. Here, in the aforementioned second through ninth embodiments, as well, the present embodiment can be applied.

Figure 44:
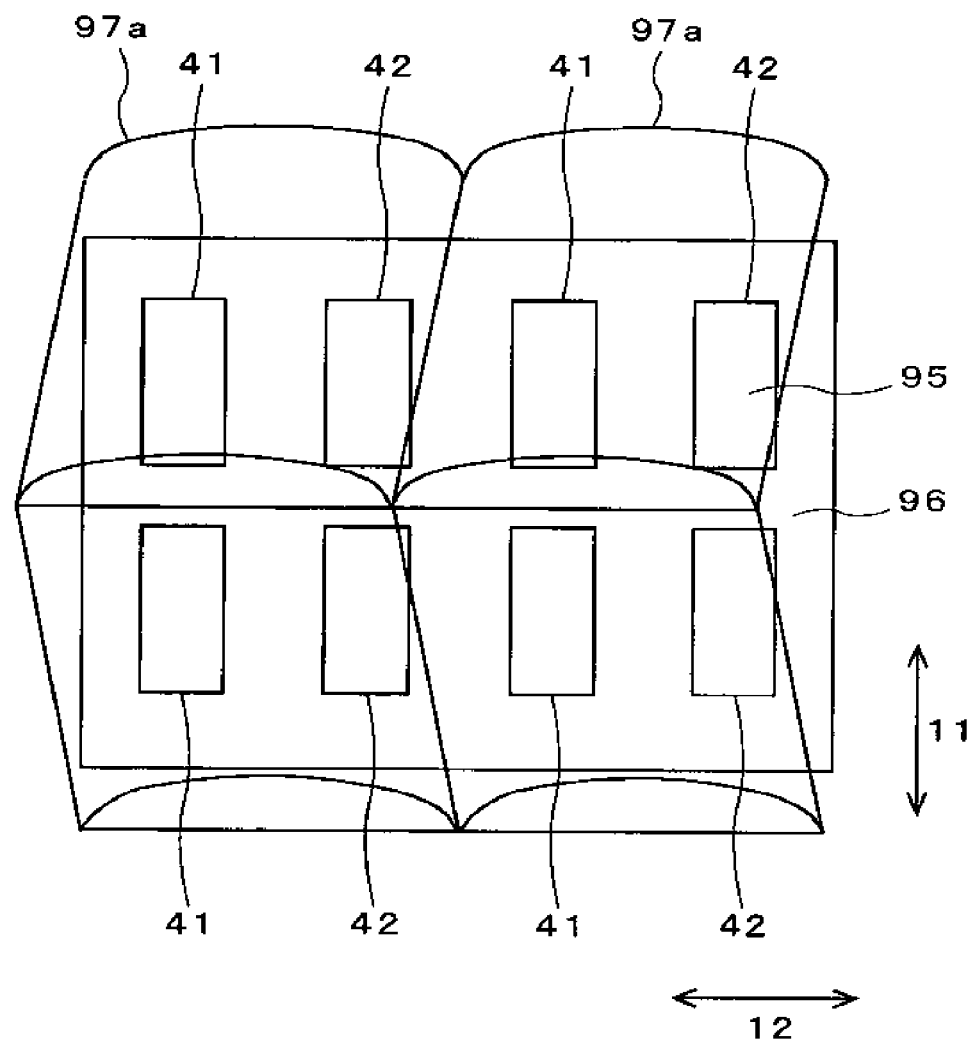
FIG. 44 is a plan view showing a lens and a display panel of an image display device of an eleventh embodiment of the present invention.

Next, description is given of an image display device according to an eleventh embodiment of the present invention. FIG. 44 is a plan view showing a lens and a display panel of an image display device of the present embodiment. As shown in FIG. 44, the image display device of the present embodiment is, unlike the image display device of the aforementioned first embodiment, in a conventional shape wherein directions in which sides of openings 95 of pixels mutually opposed in a horizontal direction 12 are parallel to a vertical direction 11, and moreover, position of the openings 95 does not vary depending on the position in the vertical direction 11. And, directions in which optical axes of cylindrical lenses 97a extend vary depending on the position in the vertical direction 11.

In the image display device of the present embodiment, since the positions of middle points between both ends in the horizontal direction 12 of the pixel openings 95 with respect to the directions in which the optical axes of the lenses extend vary according to the vertical direction 11, deterioration in display quality caused by a shading portion 96 can further be suppressed than in a conventional image display device. In addition, since a general-purpose display panel can be used, a reduction in cost is possible. Here, aspects of the construction and operations of the image display device of the present embodiment other than the above are the same as those of the image display device 1 of the aforementioned embodiment. In addition, this lens can also be applied to the image display devices of the aforementioned first through ninth embodiments.

Figure 45:
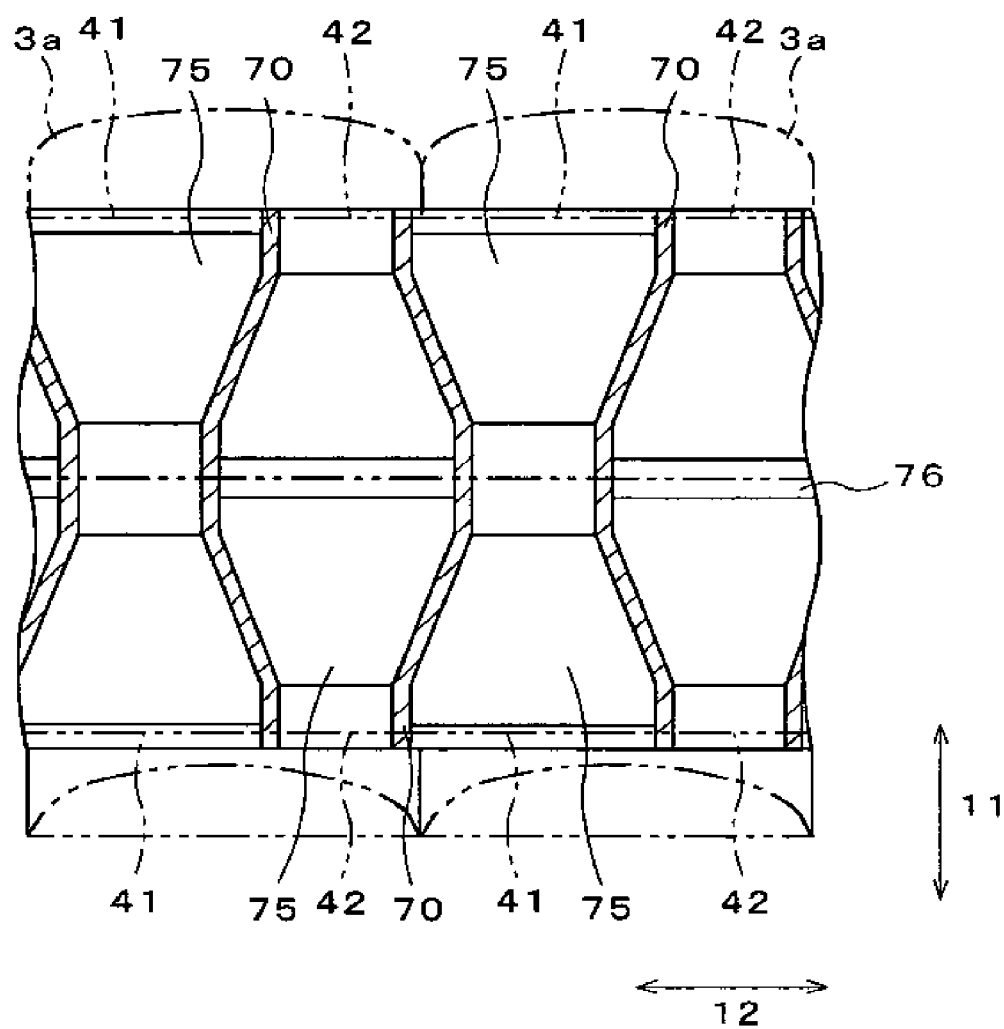
FIG. 45 is a plan view showing a display panel of an image display device of a twelfth embodiment of the present invention.

Next, description is given of an image display device according to a twelfth embodiment of the present invention. FIG. 45 is a plan view showing a display panel of an image display device of the embodiment. Here, in FIG. 45, for the sake of improvement in visibility of the drawing, wiring 70 has been shown with hatching. In the image display device 1 of the first embodiment shown in FIG. 17, the openings 5 of the display panel 2 are approximately parallelogramic in terms of a plan view, whereas in the image display device of the present embodiment, as shown in FIG. 45, openings 75 have shapes including trapezoids in a plan view. Concretely, the openings 75 have hexagonal shapes each formed by arranging a left-right symmetric trapezoid and a rectangle whose long side length is equal to a length of the lower base of this trapezoid so that the lower base of the trapezoid and the long side of the rectangle mutually make contact. Namely, a shape of the openings 75 is left-right symmetric with respect to a line segment extending in a vertical direction 11, and as sides to form this openings 75, this is provided with a pair of sides which are tilted in mutually opposite directions with respect to the vertical direction 11 and are identical in the size of angles produced between directions of extension thereof and the vertical direction 11.

Accordingly, in a area between the pair of sides tilted with respect to the vertical direction 11, although end portions in a horizontal direction 12 of the openings 75 vary in their positions in the horizontal direction 12 depending on the position in the vertical direction 11, middle points between both ends in the horizontal direction 12 do not vary in their positions in the horizontal direction 12 irrespective of the position in the vertical direction 11. And, since the longitudinal direction of cylindrical lenses 3a to compose a lenticular lens is parallel to the vertical direction 11, although the distance between the end in the horizontal direction 12 of the openings 75 of the display panel and optical axes of the cylindrical lenses 3a varies depending on the position in the vertical direction 11, the distance between line segments joining middle points between the both ends in the horizontal direction 12 of the openings 75 of the display panel and optical axes of the cylindrical lenses 3a is relatively fixed irrespective of the position in the vertical direction 11. Namely, the positions of end in the horizontal direction 12 of openings 75 of the display panel and the positions of optical axes of the cylindrical lenses 3a are relatively different in the vertical direction 11, and the positions of middle points between both ends in the horizontal direction 12 of the openings 75 of the display panel and the positions of optical axes of the cylindrical lenses 3a are relatively invariable.

Furthermore, the openings 75 mutually adjacent in the vertical direction 11 of this display panel are arranged so as to be line-symmetric with respect to line segments extending in the horizontal direction 12. In addition, the openings 75 mutually adjacent in the horizontal direction are arranged so as to be point-symmetric with respect to a middle point between intersection points between a line segment joining middle points between the both ends in the vertical direction 11 thereof and a line segment joining middle points between the both ends in the horizontal direction 12. Therefore, the widths of the openings 75 in the vertical direction 11 are, when those of the openings 75 mutually adjacent in the horizontal direction 12 are also added, almost fixed irrespective of the position in the horizontal direction 12.

Here, a shading portion 76 is not provided at areas between the sides tilted with respect to the vertical direction 11 of areas between the openings 75 mutually adjacent in the horizontal direction 12, that are, at edges of pixels tilted with respect to the vertical direction 11 of pixels, but is provided only at areas between the sides extending in a direction parallel to the horizontal direction 12 of areas between the openings 75 mutually adjacent in the vertical direction 11, that are, at edges of pixels extending in the horizontal direction 12. And, the openings 75 mutually adjacent in the horizontal direction 12 are sectioned by the wiring 70, and are shaded by this wiring 70.

Figure 46:
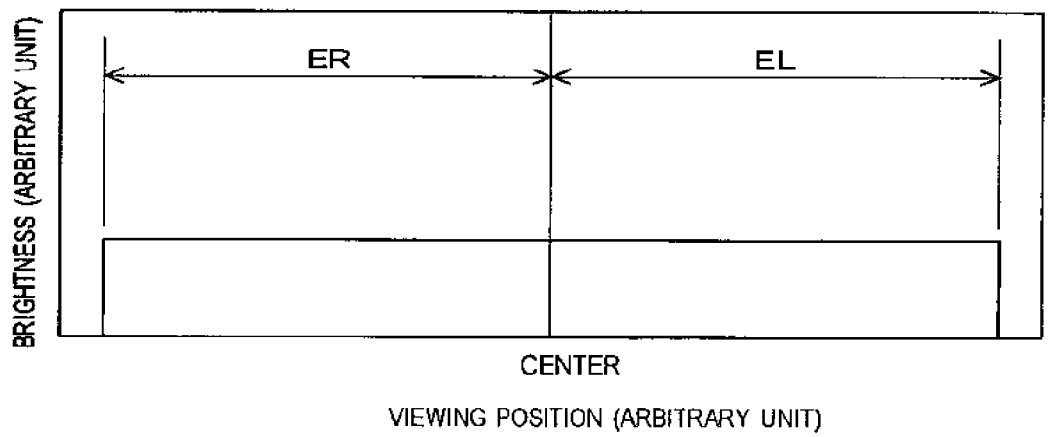
FIG. 46 is a graph showing distribution of brightness on a view plane of the image display device of the twelfth embodiment of the present invention while taking a viewing position on the horizontal axis and brightness on the vertical axis.

FIG. 46 is a graph showing distribution of brightness on a view plane of the image display device of the present embodiment while taking a viewing position on the horizontal axis and brightness on the vertical axis. As in the image display device of the present embodiment, by making the openings 75 of the respective pixels of the display panel in the shapes including trapezoids in a plan view, furthermore, arranging the openings 75 mutually adjacent in the vertical direction 11 so as to be line-symmetric with respect to line segments extending in the horizontal direction 12, and also arranging the openings 75 mutually adjacent in the horizontal direction 12 so as to be point-symmetric with respect to a middle point between the intersection points between the line segment joining middle points between the both ends in the vertical direction 11 thereof and line segment joining middle points between the both ends in the horizontal direction 12, the opening ratio in the vertical direction at an arbitrary position in the horizontal direction 12 of the respective pixels can be fixed, therefore, as shown in FIG. 46, brightness distribution with respect to the viewing position can be fixed. As a result, deterioration in display quality caused by the shading portion 76 can be completely eliminated.

Here, in the image display device of the present embodiment, since no shading portion 76 has been provided in an area between the pair of sides tilted with respect to the vertical direction, even when a positional error margin in the horizontal direction 12 when forming a shading portion 76 is great, influence exerted to the opening ratio is small. Namely, the positional margin in the horizontal direction 12 can be set great to realize a high opening ratio. Such a shape provides a great effect, in particular, when a shading portion 76 is formed on a substrate opposed to a substrate on which the wiring 70 has been formed.

Furthermore, in the image display device of the present embodiment, since the shapes of the openings 75 are hexagonal shapes each formed by arranging, in a plan view, a trapezoid and a rectangle whose long side length is equal to a length of the lower base of this trapezoid so that the lower base of the trapezoid and the long side of the rectangle mutually make contact, all corners are obtuse or right angles. Therefore, rounding of the corners of the shading portion 76 caused by the forming method can be suppressed to a minimum, thus a decline in the opening ratio caused by the manufacturing method can be suppressed.

Still furthermore, in the image display device of the present embodiment, when a striped color filter is provided on the display panel for a color display, the direction of a same-color sequence of the color filter is preferably made in the horizontal direction 12. Thereby, it becomes unnecessary to shade same-color areas of the color filter, and a rectangular form can be realized, therefore, the color filter manufacturing can be easily manufactured, a reduction in cost can be realized. Here, aspects of the construction and operations other than the above are the same as those of the image display device 1 of the aforementioned first embodiment.

What is claimed is:
1. An image display device comprising:
a display panel which has a plurality of pixel sections each of which includes n (n is a natural number equal to or more than two) types of pixels to display images for n viewpoints, said pixel sections being arrayed in a matrix in a first direction and in a second direction orthogonal to said first direction;
an optical unit for sorting lights emitted from pixels arrayed in said first direction into mutually different directions along said first direction; and
a display area provided in each of said pixels, wherein each display area includes a shape comprising a combination of a trapezoid and a rectangle, said trapezoid having two first sides substantially parallel in said first direction and two second sides, each which intersects both of said two first sides, wherein a longer side of said two first sides and a first longer side of said rectangle mutually make contact, wherein neither of said two second sides are parallel to said second direction and wherein each display area is substantially symmetric with respect to a line parallel to said second direction;
wherein in said each display area, the direction orthogonal to said two first sides accord with said second direction, said each display area mutually adjacent in said second direction is arranged in mutually opposite directions so that each area is opposed to shorter side of said two first sides of said trapezoid or a second longer side of said rectangle, each display area of said pixels mutually adjacent in said first direction are point-symmetric with respect to a symmetry point defined as a middle point of a line segment connecting middle points of lines of symmetry, parallel to said second direction, in each of the pixels mutually adjacent in said first direction, in an interface between each display area mutually adjacent in said direction, a first shading portion having a width in the second direction is formed in a part where the shorter sides of said two first sides of said trapezoids are opposed to, and a second shading portion whose width in said second direction is narrower than the first shading portion is formed in a part where the second longer sides of said rectangles are opposed to, in each said display area mutually adjacent in said first direction, the shorter side of said two first sides of said trapezoid of a display area and the second longer side of said rectangle of an adjacent display area are not aligned in said first direction.

2. The image display device according to claim 1, wherein a position of middle point between said two second sides and a position of an optical axes of said optical unit are relatively invariable in said second direction.

3. The image display device according to claim 2, wherein said two second sides are tilted in mutually opposite directions and identical angles with respect to said second direction.

4. The image display device according to claim 3, wherein each display area is a hexagon.

5. The image display device according to claim 2, wherein a distance between said first sides in said second direction of each pixel mutually adjacent in said first direction is fixed irrespective of a position of each pixel in said first direction.

6. The image display device according to claim 2, wherein said display panel has a first substrate on which wiring has been formed and a second substrate which is arranged so as to be opposed to said first substrate and on which said first shading portion and said second shading portion have been formed.

7. The image display device according to claim 6, wherein said display panel has a color filter where an identical color has been successively arranged along said first direction and respective colors have been arranged in stripes along said second direction.

8. The image display device according to claim 2, wherein said image display device is a three-dimensional image display device, and whose horizontal direction is said first direction.

9. The image display device according to claim 2, wherein said image display device is a planar image display device, and whose vertical direction is said first direction.

10. The image display device according to claim 2 wherein said optical unit is a lenticular lens.

11. The image display device according to claim 2, wherein said optical unit is a parallax barrier.

12. A portable terminal device, comprising the image display device according to claim 1.

13. The portable terminal device according to claim 12, which is a portable telephone, Personal Digital Assistant, a game machine, a digital camera, or a digital video camera.

14. The image display device according to claim 1, wherein wiring has been formed along said second sides of said trapezoid and shorter sides of said rectangle between each display area adjacent in said first direction.

* * * * *